(12) United States Patent
Roush et al.

(10) Patent No.: US 7,789,453 B2
(45) Date of Patent: Sep. 7, 2010

(54) TRAILER KEEL

(75) Inventors: Mark A. Roush, Lafayette, IN (US); Keith Wallace, Lafayette, IN (US)

(73) Assignee: Vanguard National Trailer Corporation, Monon, IN (US)

( * ) Notice: Subject to any disclaimer, the term of this patent is extended or adjusted under 35 U.S.C. 154(b) by 166 days.

(21) Appl. No.: 12/128,809

(22) Filed: May 29, 2008

(65) Prior Publication Data

US 2008/0296930 A1 Dec. 4, 2008

Related U.S. Application Data

(60) Provisional application No. 60/932,245, filed on May 30, 2007, provisional application No. 61/070,670, filed on Mar. 25, 2008.

(51) Int. Cl.
*B62D 37/02* (2006.01)

(52) U.S. Cl. ............... 296/180.1; 280/763.1; 296/180.4

(58) Field of Classification Search .............. 296/180.1, 296/180.2, 180.4, 181.3, 181.5; 280/6.153, 280/407.1, 763.1
See application file for complete search history.

(56) References Cited

U.S. PATENT DOCUMENTS

| | | | |
|---|---|---|---|
| 3,743,343 A | 7/1973 | Grote | |
| 4,060,268 A | 11/1977 | Page | |
| 4,262,953 A | 4/1981 | Mcerlane | |
| 4,486,046 A | 12/1984 | Whitney | |
| 4,640,541 A | 2/1987 | Fitzgerald | |
| 4,938,524 A | 7/1990 | Straub | |
| 5,242,185 A | 9/1993 | Carr | |
| 5,280,990 A * | 1/1994 | Rinard | 296/180.1 |
| 5,375,882 A | 12/1994 | Koch | |
| 5,735,560 A | 4/1998 | Bowen | |
| 5,788,321 A | 8/1998 | Mchorse | |
| 5,839,760 A | 11/1998 | Johnson | |
| 5,921,617 A | 7/1999 | Loewen | |
| 6,644,720 B2 | 11/2003 | Long | |
| 6,837,536 B1 * | 1/2005 | Schwartz | 296/180.4 |
| 6,974,178 B2 * | 12/2005 | Ortega et al. | 296/180.1 |
| 7,093,889 B2 * | 8/2006 | Graham | 296/180.4 |
| 7,188,875 B2 | 3/2007 | Norelius | |
| 7,578,541 B2 * | 8/2009 | Layfield et al. | 296/180.2 |
| 2005/0146161 A1 * | 7/2005 | Uland | 296/180.1 |
| 2008/0093887 A1 | 4/2008 | Wood | |

* cited by examiner

*Primary Examiner*—Patricia L Engle
*Assistant Examiner*—Pinel E Romain
(74) *Attorney, Agent, or Firm*—Dowell Baker, P.C.

(57) ABSTRACT

A trailer fairing for reducing aerodynamic drag from trailer landing gear and/or wheel assembly is disclosed. The fairing may be directly connected to the forward facing structural supports of the landing gear, and an air tank may be located between the fairing and the cargo storage area. A single fairing may be used to reduce the drag from both the trailer landing gear and wheel assembly. The fairing may include a tapered front section and/or a rear section. The fairing may have rounded, oval, angled, and/or tapered sections. A plurality of fairings may also be used.

23 Claims, 48 Drawing Sheets

FIG. 4
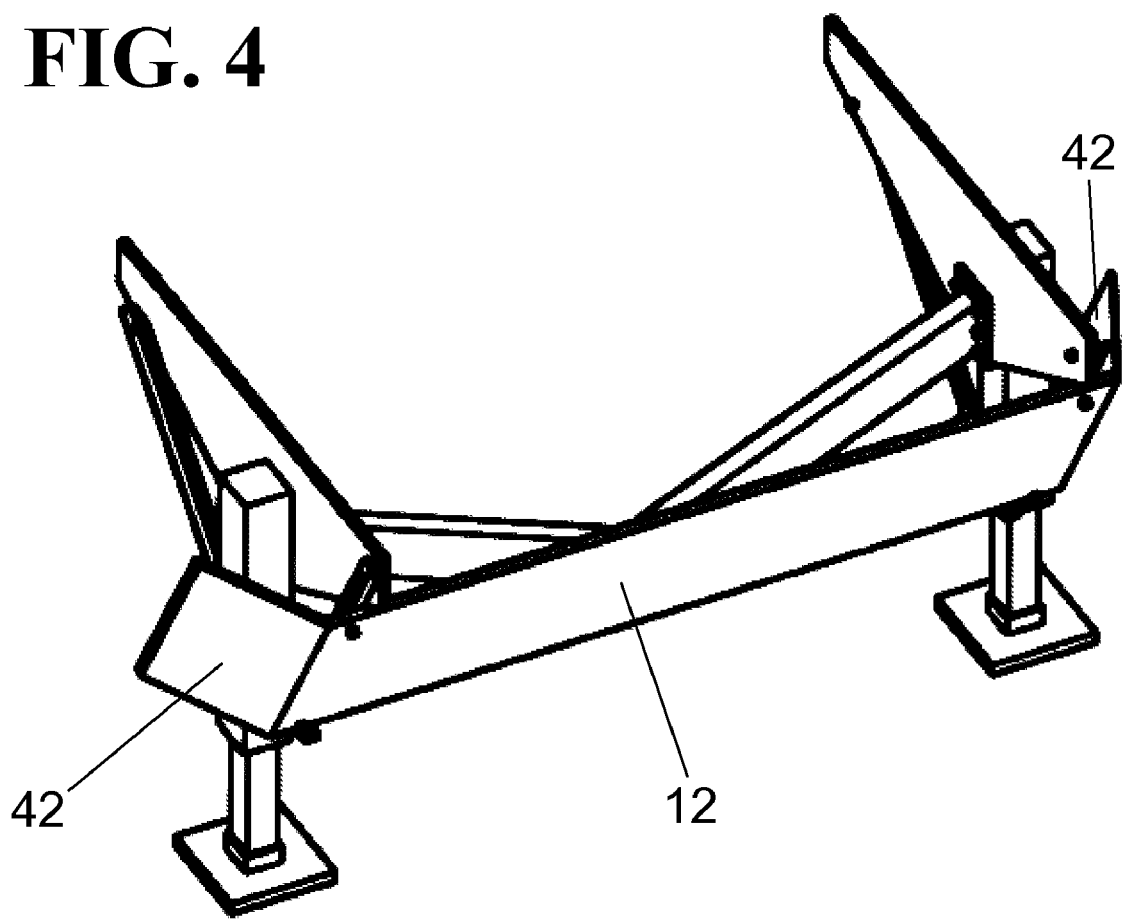
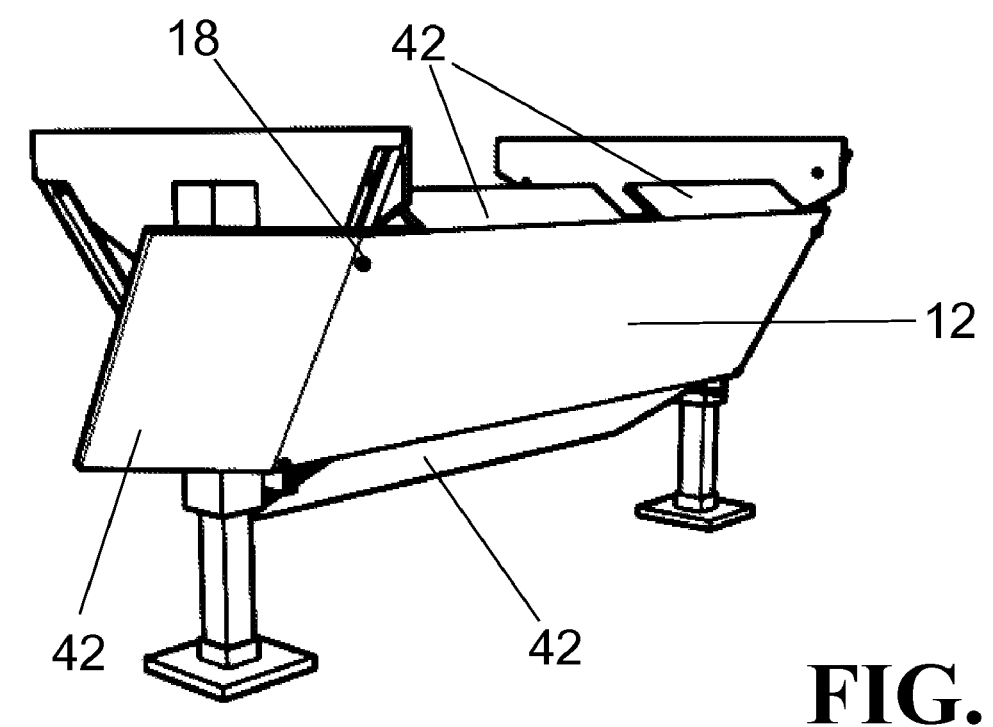
FIG. 5

FIG. 39
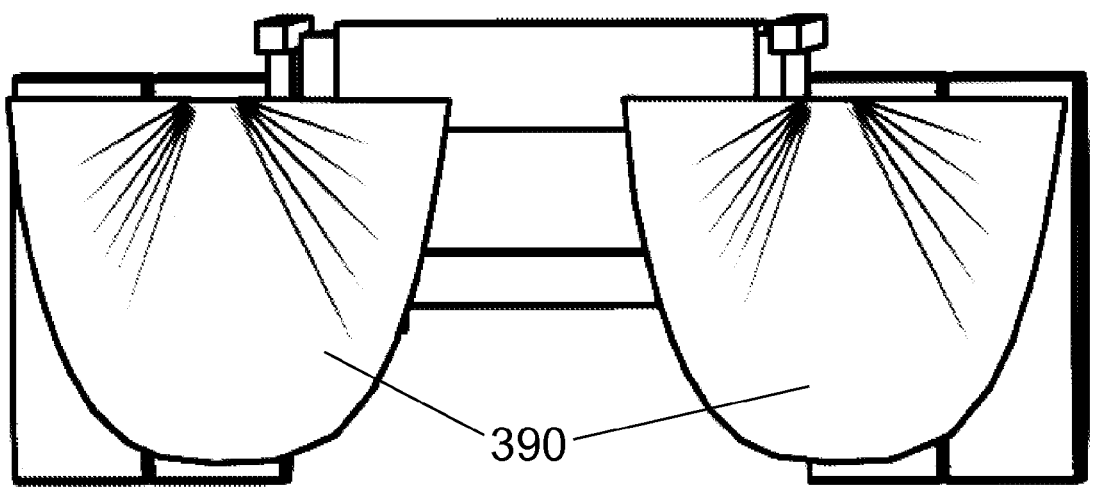
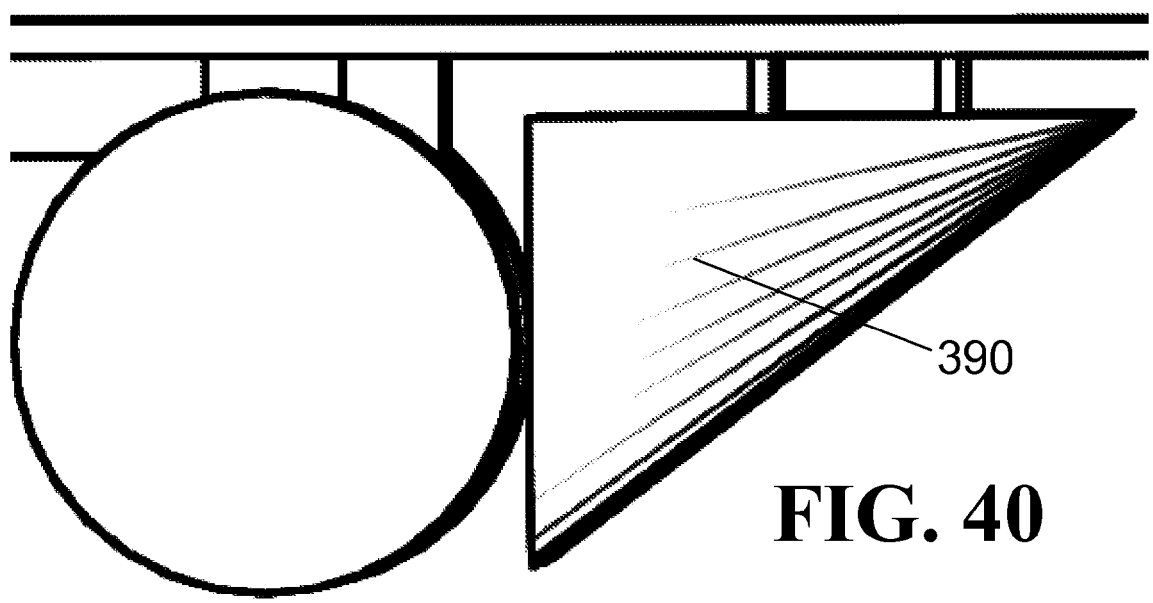
FIG. 40

460

460

FIG. 54
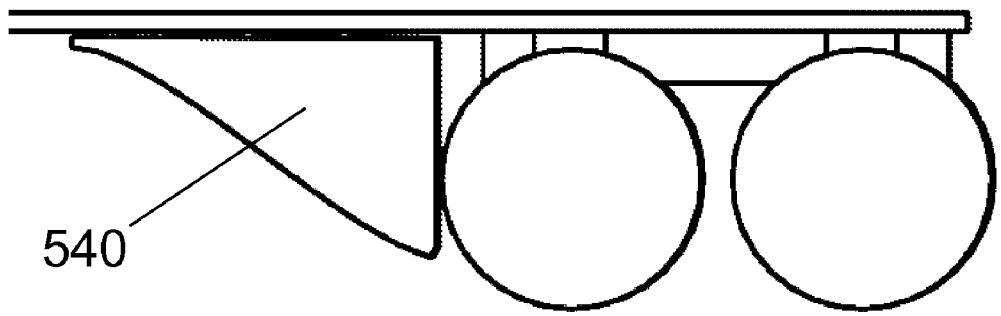
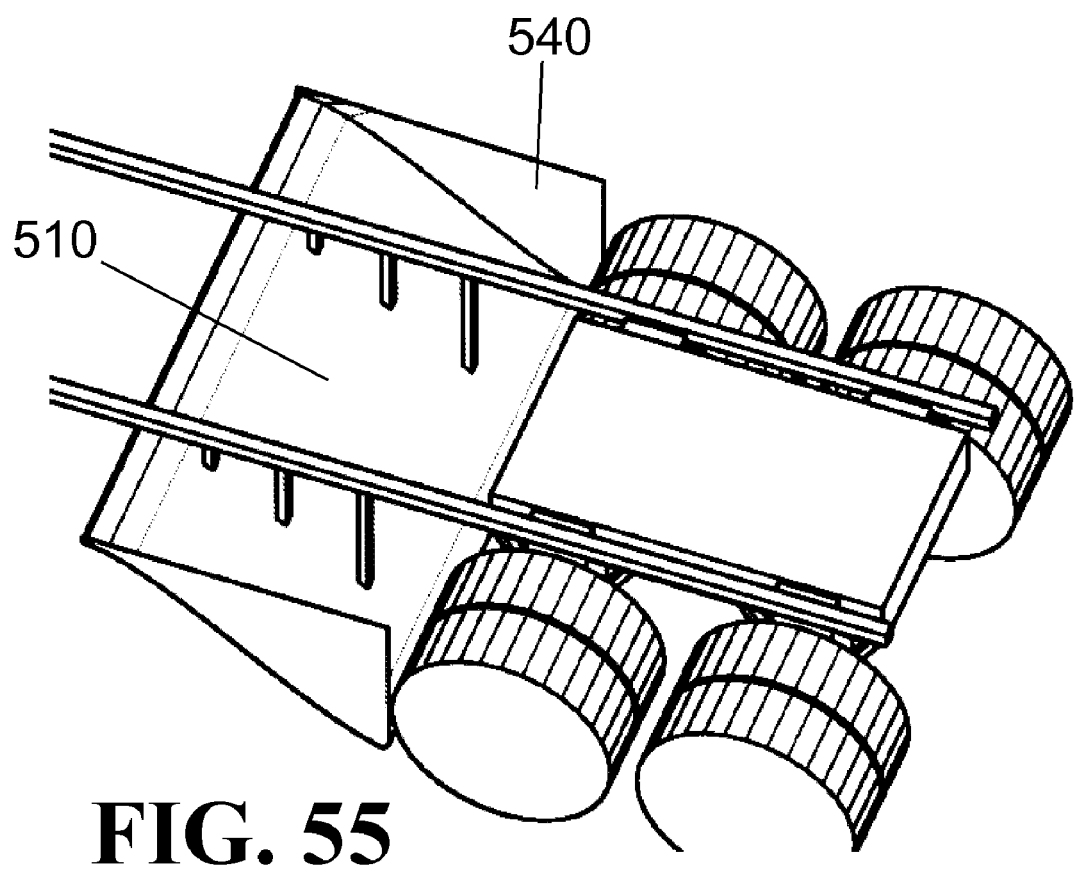
FIG. 55

FIG. 58
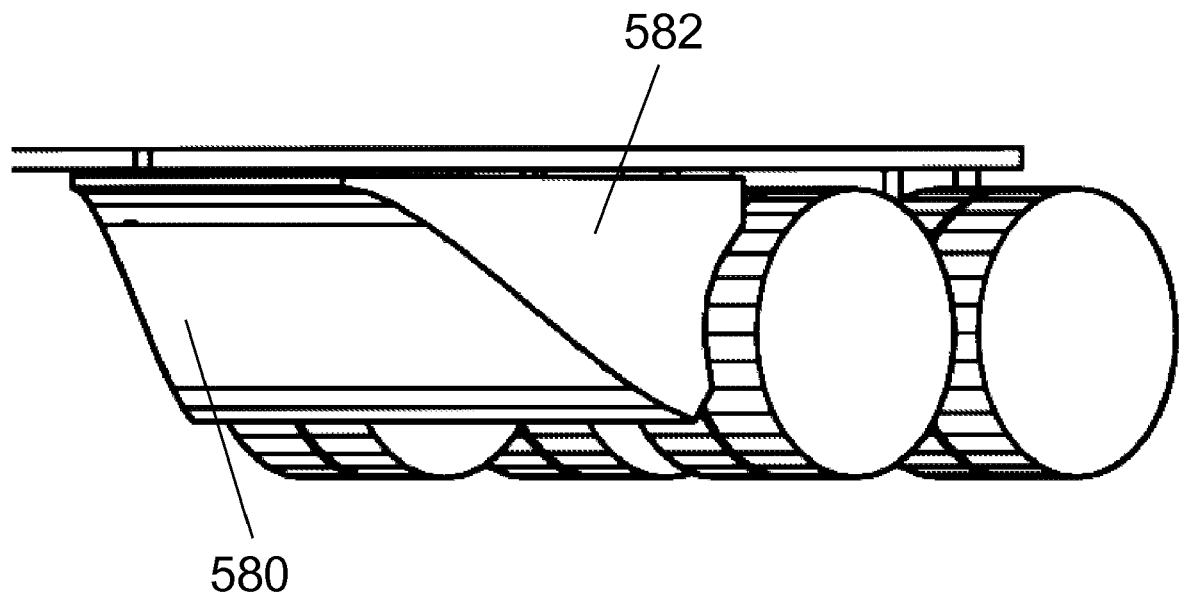
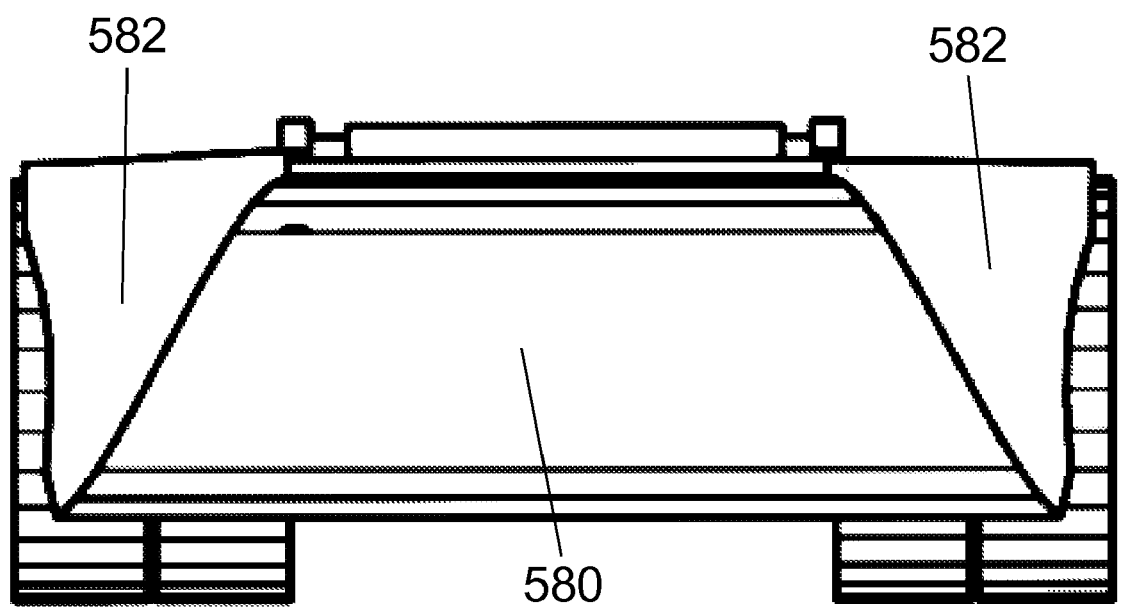
FIG. 59

TRAILER KEEL

CROSS-REFERENCE TO RELATED APPLICATIONS

This application is claims priority to provisional application Ser. No. 60/932,245, entitled "Trailer Keel" filed May 30, 2007 and provisional application Ser. No. 61/070,670 filed Mar. 25, 2008 entitled "Drag Reduction Arrangement for Cargo Trucks and Trailers" both to Mark Roush, the contents of which are all incorporated herein by reference.

FIELD OF THE INVENTION

This invention relates to aerodynamic fairings for cargo containers. More specifically, it relates to aerodynamic fairings for the underside of a truck pulled trailer.

BACKGROUND OF THE INVENTION

Fairings are used to improve the aerodynamics of a vehicle. Fairings are typically added to the exterior of an existing vehicle to reduce drag on the vehicle when it is driven. Fairings may be added at many locations on tractors and trailers to improve the aerodynamics of these large vehicles. Fairings have been attached to the front and back of tractors as well as the front, top, bottom, and rear of the trailer. Fairings have also been placed in front of and behind the tires of a trailer to improve the aerodynamics of the trailer.

The landing gear of a trailer supports the trailer in the absence of a tractor, but also must be transported with the trailer when it is moved. Trailer landing gear has many non-aerodynamic features such as the structural supports for the landing gear. These non-aerodynamic features on the landing gear increase drag which increases the cost of transporting the trailer. Thus, it is desirable to have fairings to reduce the drag caused by the landing gear.

The wheel assemblies of trailers are also not aerodynamic and can increase the drag on the trailer when it is driven. Road debris can further collect on the underside of the trailer during transportation and result in increased aerodynamic drag. Thus it is desirable to have fairings that improve the aerodynamics of the trailer wheel assembly and underside of the trailer.

A fairing adds weight to the trailer, which increases the fuel consumption of the tractor. Thus it is desirable to have a fairing that is as light as possible.

There have been attempts to solve some of these issues. For example, U.S. Pat. No. 4,262,953 that issued to McErlane teaches "an airfoil or deflector panel for being mounted ahead of the rearmost set of wheels of a vehicle such as a truck or tractor-drawn trailer to direct air flow in a manner which reduces the relatively negative air pressure normally occurring behind a moving vehicle. The surface of the deflector which is presented in the direction of vehicle motion has a bilateral or compound convex curve."

U.S. Pat. No. 4,640,541 that issued to FitzGerald teaches "an air deflector for the rear wheels of vehicles such as trucks and trailers is disclosed. The deflector consists of a fairing suspended beneath the truck or trailer body immediately in front of the rear wheels and extending completely across the width of the body. The surface of the fairing is curved in both a lateral and a vertical direction to deflect impinging air and entrained water or snow around or under the wheels . . . . The device is formed with a plurality of generally vertical grooves angled toward the center line of the vehicle. The grooves direct impinging air downwardly and between the rear wheels."

U.S. Pat. No. 4,938,524 that issued to Straub teaches "a semi-truck trailer gooseneck assembly comprises a single curved plate extending transversely between and beyond the twin parallel longitudinal girders to form a single lower flange. The curved plate extends from the assembly supporting the floor over the fifth wheel and connecting the king pin to the trailer. The rear portion of the curved plate extends to the horizontal flat lower flanges of the twin girders extending substantially the length of the trailer . . . . The rear corner post comprises a two piece welded assembly wherein the major section is substantially an elongated 'S' and the minor section 'L' shaped. The shapes are welded together to form a hollow center portion and a pocket portion. The 'L' section forms a contact for the rear door and the pocket engages the curtain to enable the curtain to be fully tightened when closed."

U.S. Pat. No. 6,837,536 that issued to Schwartz teaches "a belly pan, or membrane of rigid yet flexible material is of elongated shaped outline to be mounted along the bottom of tractor-trailer . . . . The belly pan is provided with a tapered front portion to be attached to the frontal portion of the trailer to the approximate location of the truck hitch. The belly pan extends rearward, under the trailer, between the rear wheels in a rectangular portion and the rearward edge is affixed to the ICC bumper of the trailer. An aerodynamic shaped deflector is attached to the frontal portion of the landing gear of the trailer and attaches to the belly pan for reducing drag between the underside of the trailer and the support beams of the landing gear. A similar aerodynamic shaped deflector is attached to the frontal portion of the ICC bumper and attached to the belly pan for reducing drag between the underside of the trailer and the beams of the ICC bumper."

U.S. Pat. No. 6,974,178 that issued to Ortega teaches "an apparatus for reducing the aerodynamic drag of a wheeled vehicle in a flow stream, the vehicle having a vehicle body and a wheel assembly supporting the vehicle body. The apparatus includes a baffle assembly adapted to be positioned upstream of the wheel assembly for deflecting airflow away from the wheel assembly so as to reduce the incident pressure on the wheel assembly."

U.S. Pat. No. 7,093,889 that issued to Graham teaches "a device for reducing vehicle aerodynamic resistance for vehicles having a generally rectangular body disposed above rear wheels, comprising a plurality of load bearing struts attached to the bottom of the rectangular body adjacent its sides, a plurality of opposing flat sheets attached to the load bearing struts, and angled flaps attached to the lower edge of the opposing sheets defining an obtuse angle with the opposing flat sheets extending inwardly with respect to the sides of the rectangular body to a predetermined height above the ground, which, stiffen the opposing flat sheets, bend to resist damage when struck by the ground, and guide airflow around the rear wheels of the vehicle to reduce its aerodynamic resistance when moving."

SUMMARY OF THE INVENTION

In accordance with the preferred embodiments of the present invention, some of the issues associated with trailer fairings are overcome. An aerodynamic trailer fairing is presented.

The trailer fairing includes a panel connected to a trailer structural support such as the trailer landing gear, the wheel assembly, the slide rail, the trailer underside, or a combination thereof. Other embodiments of the invention may be curved, s-curved, angled, dual-keeled, tapered, or a combination thereof. The fairing may substantially enclose the non-retractable portions of the trailer landing gear or be integrally formed as part of a trailer structural support. The trailer fairing may have a cross section similar to the cross section of the trailer landing gear or wheel assembly, and a plurality of fairings may also be used.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 4 is a perspective view of a trailer fairing with two side panels;
FIG. 5 is a front perspective view of a trailer fairing with five side panels;
FIG. 39 is a front view of a plurality of fairings connected to a slide rail;
FIG. 40 is a side view of a plurality of fairings connected to a landing gear assembly;
FIG. 54 is a side view of an s-curved fairing with sidewalls;
FIG. 55 is a top perspective view of an s-curved fairing with sidewalls;
FIG. 58 is a side perspective view of a tapered s-curved fairing with wheel contoured sidewalls;
FIG. 59 is a front perspective view of a tapered s-curved fairing with wheel contoured sidewalls.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to the figures.

Figure 1:
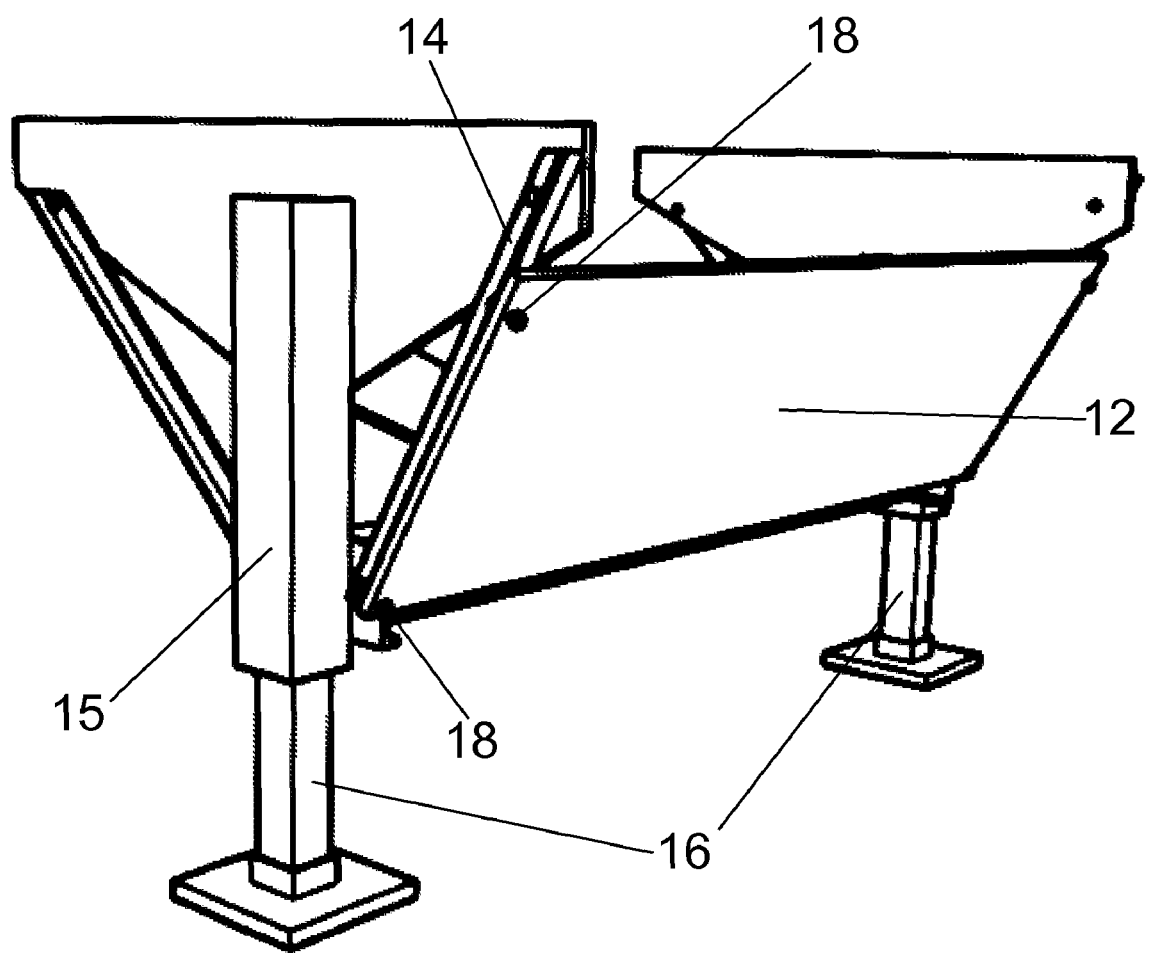
FIG. 1 is a perspective view of a trailer fairing.
Figure 2:
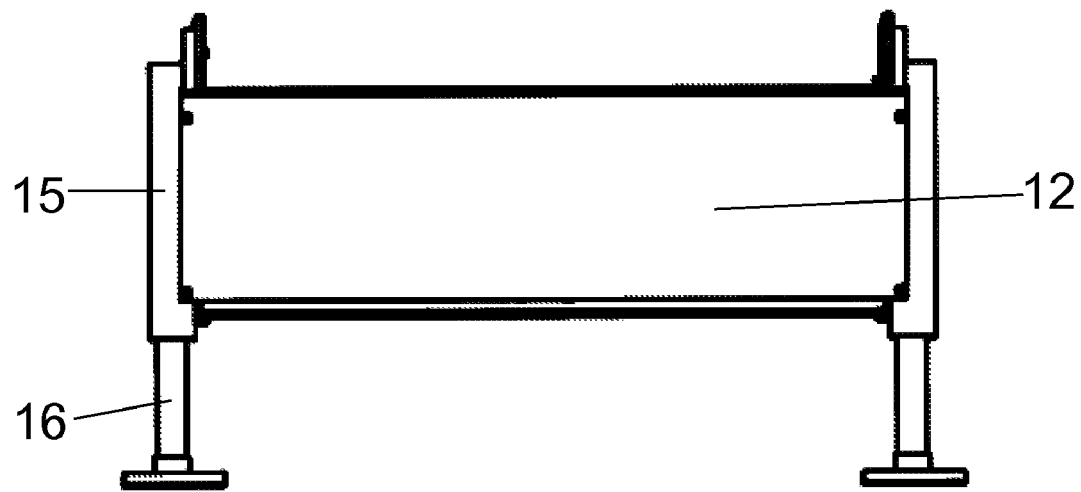
FIG. 2 is a front view of a trailer fairing.
Figure 3:
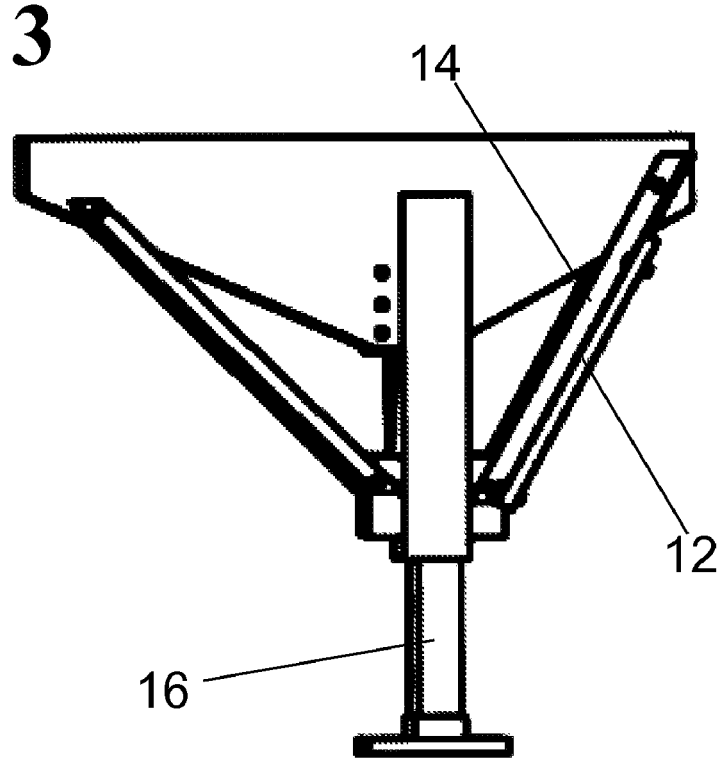
FIG. 3 is a side view of a trailer fairing.
Figure 6:
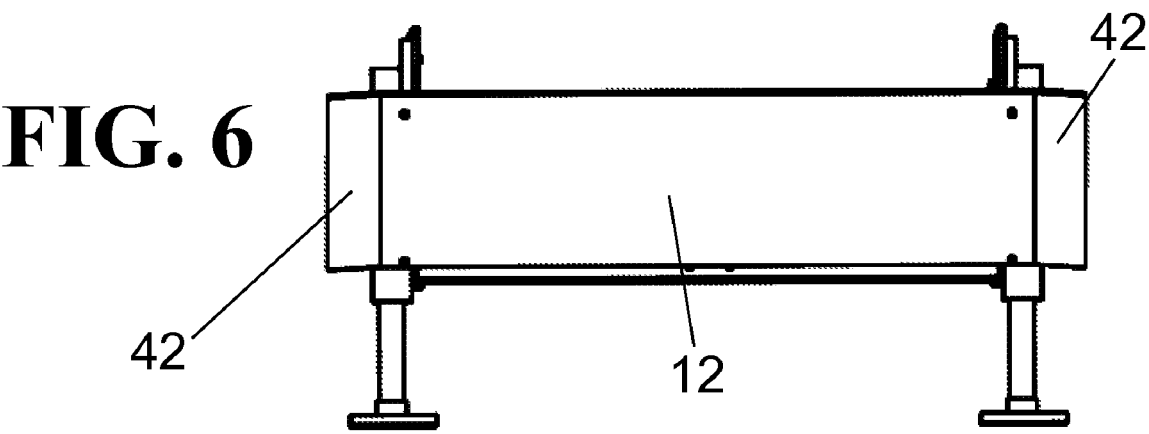
FIG. 6 is a front view of a trailer fairing with two side panels.
Figure 7:
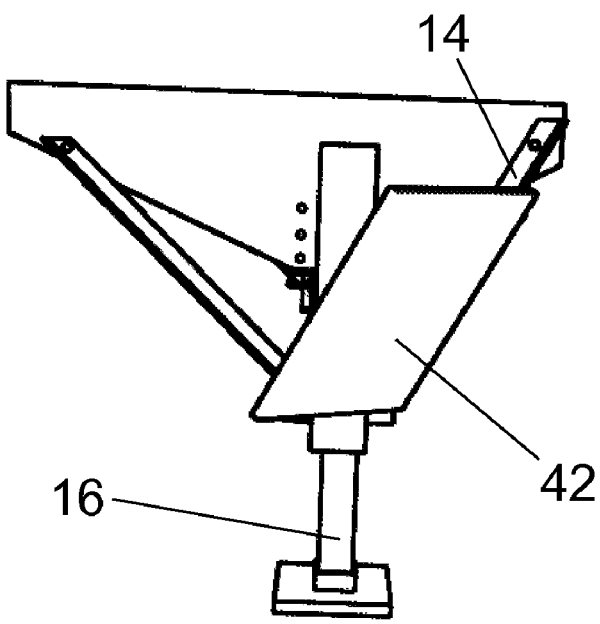
FIG. 7 is a side view of a trailer fairing with two side panels.
Figure 8:
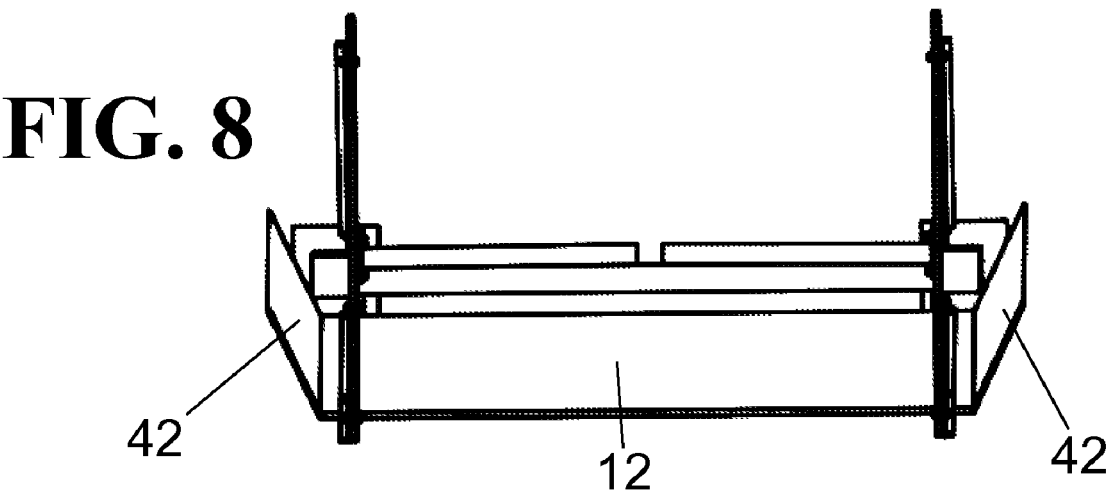
FIG. 8 is a top view of a trailer fairing with two side panels.
Figure 9:
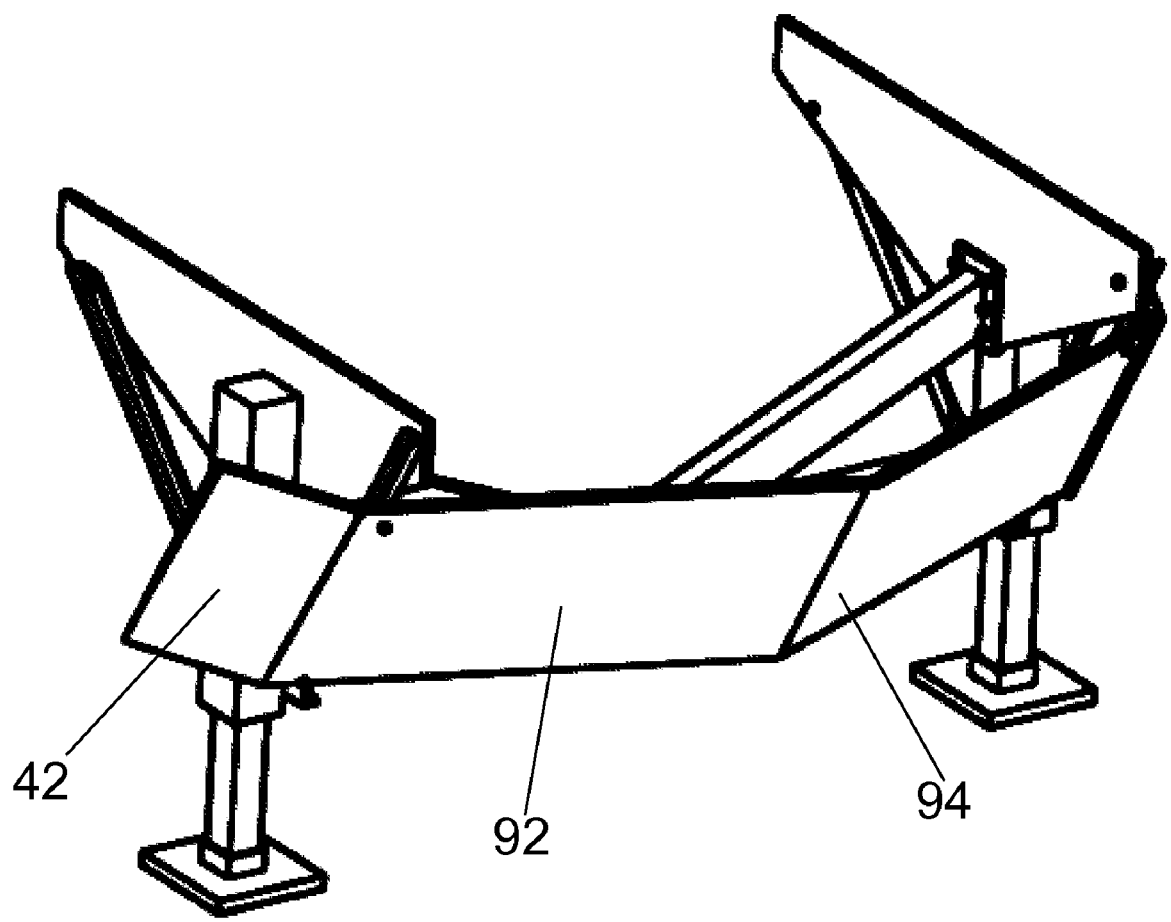
FIG. 9 is a perspective view of a trailer fairing with an angled front surface and side panels.
Figure 10:
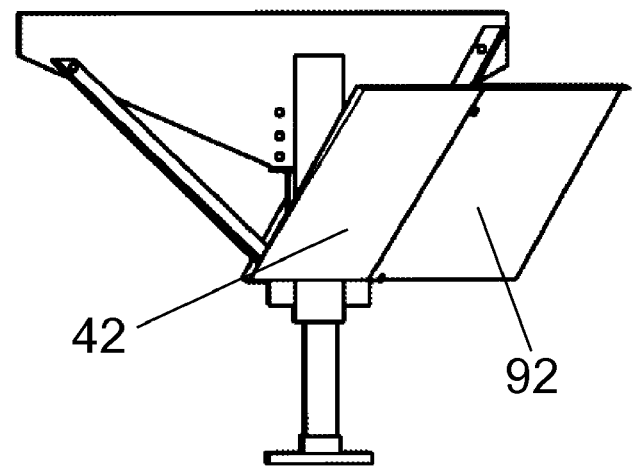
FIG. 10 is a side view of a trailer fairing with an angled front surface and side panels.
Figure 11:
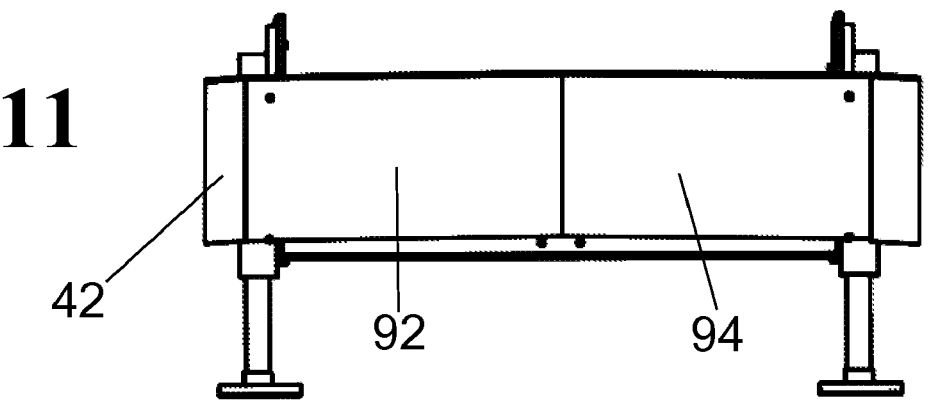
FIG. 11 is a front view of a trailer fairing with an angled front surface and side panels.
Figure 12:
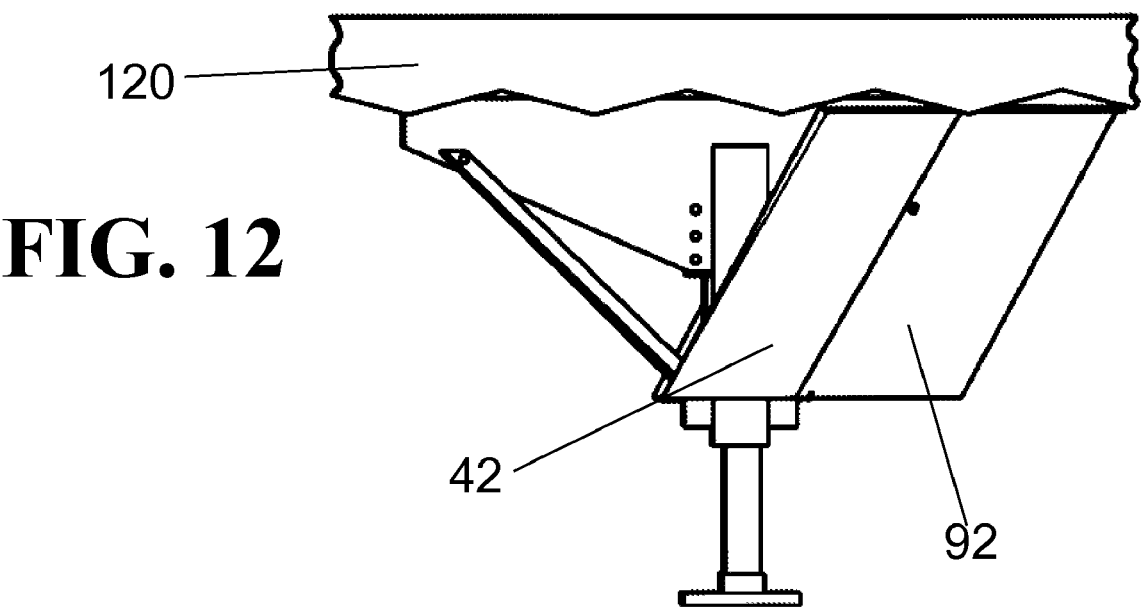
FIG. 12 is a side view of a trailer fairing connected to trailer landing gear and a container, where the fairing includes an angled front surface and side panels.
Figure 13:
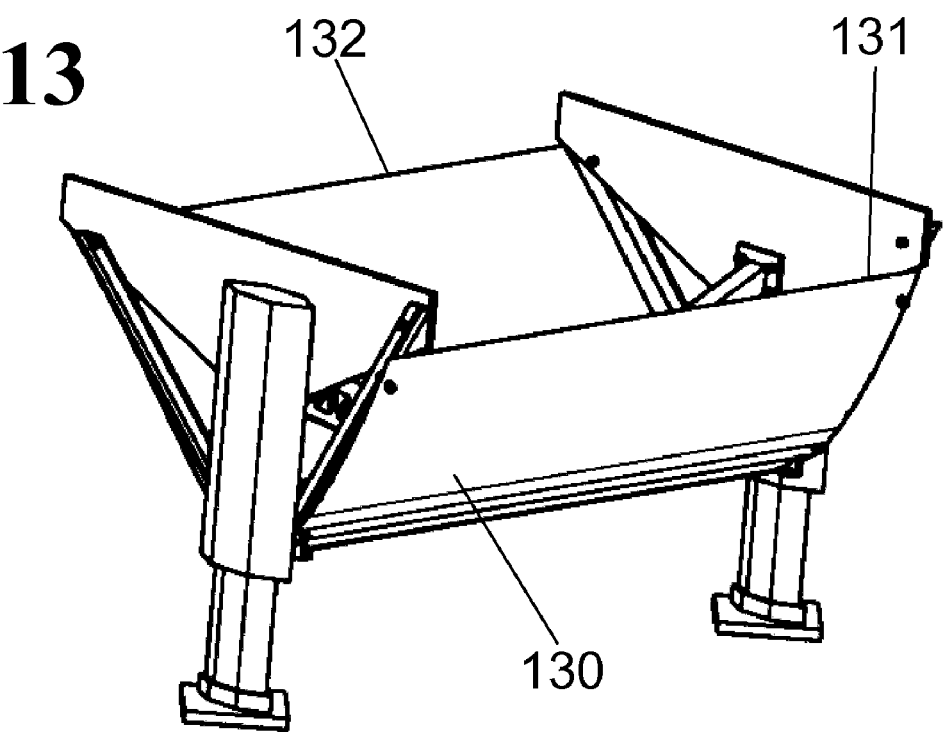
FIG. 13 is a perspective view of a rounded fairing connected to the fore and aft of a landing gear assembly.
Figure 14:
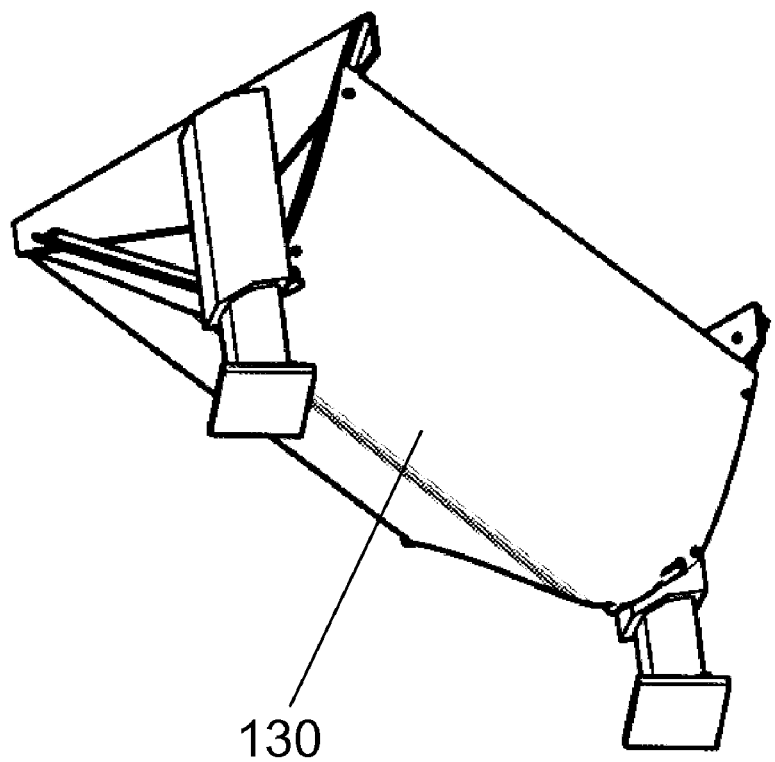
FIG. 14 is a bottom perspective view of a rounded fairing connected to the fore and aft of a landing gear assembly.
Figure 15:
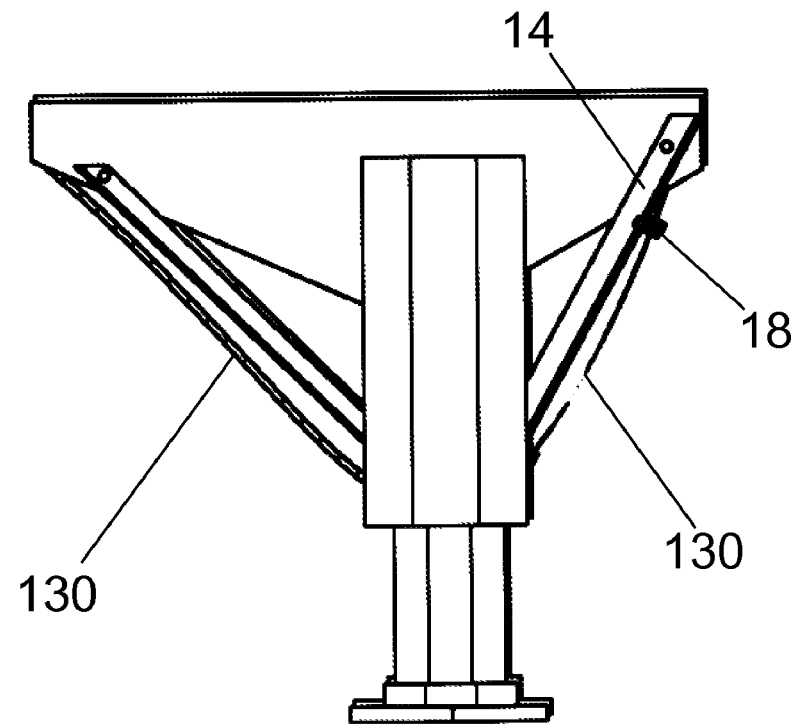
FIG. 15 is a side view of a rounded fairing connected to the fore and aft of a landing gear assembly.
Figure 16:
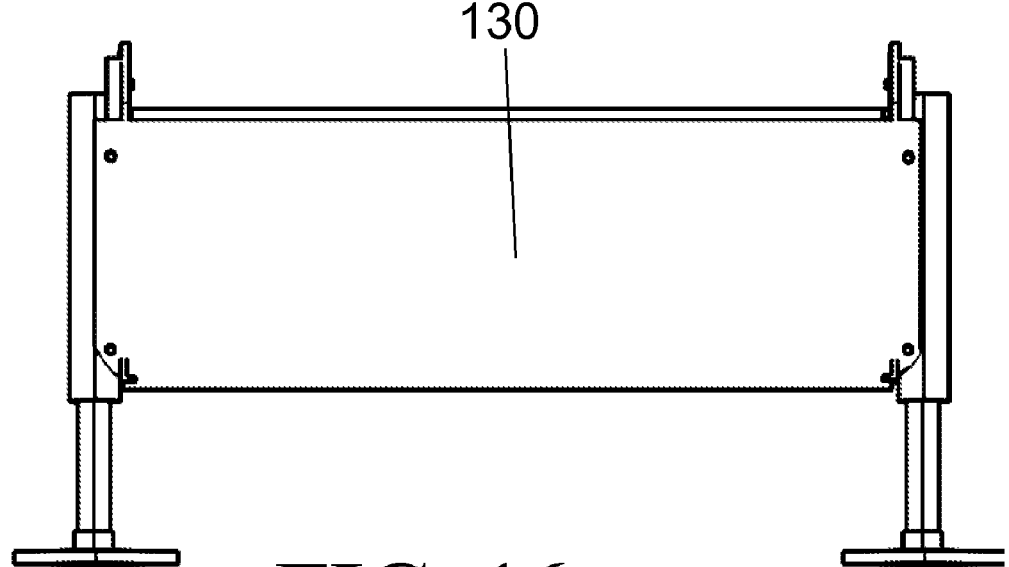
FIG. 16 is a front view of a rounded fairing connected to the fore and aft of a landing gear assembly.
Figure 17:
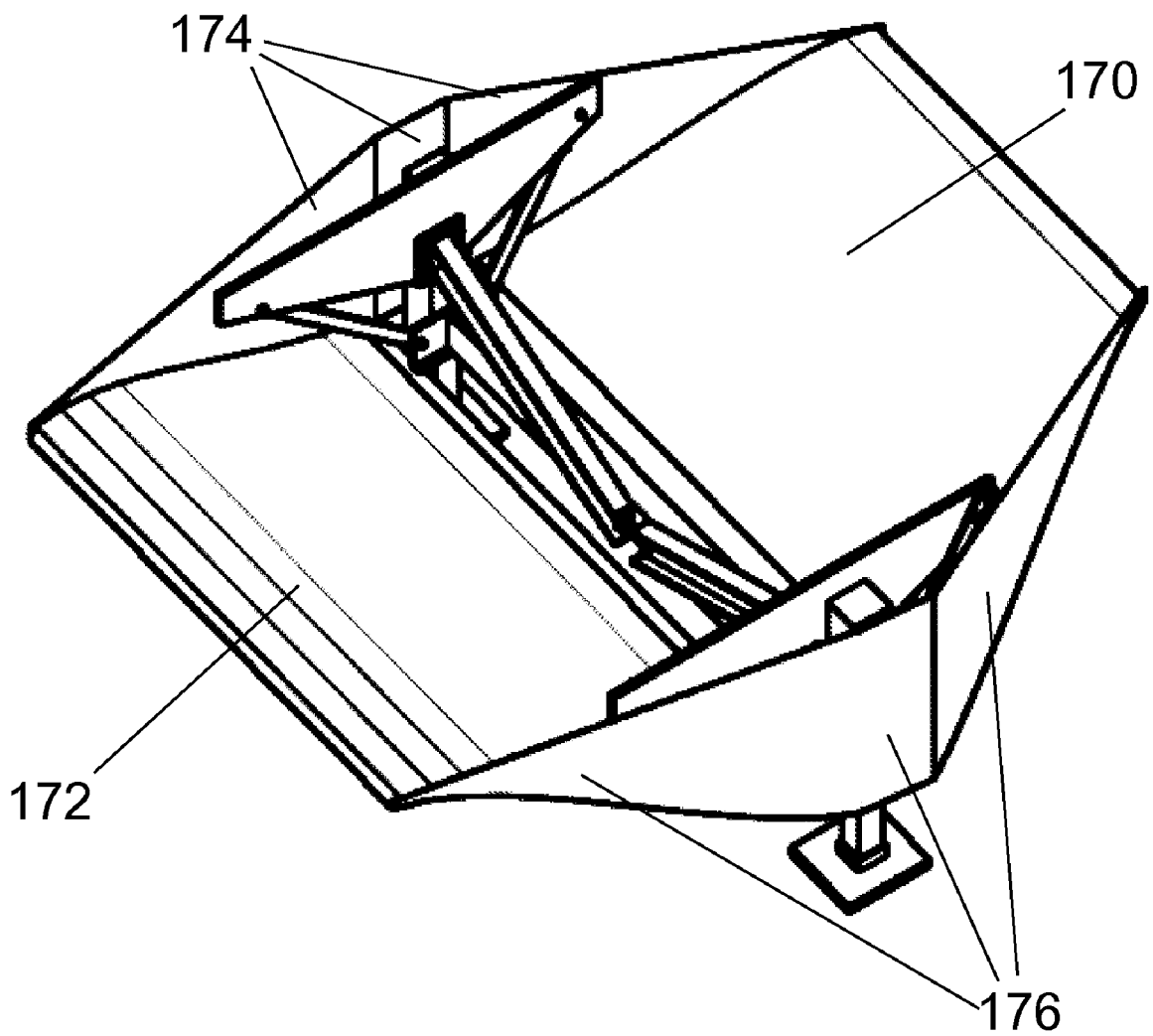
FIG. 17 is a perspective view of an s-curved and tapered fairing substantially enclosing a landing gear assembly.
Figure 18:
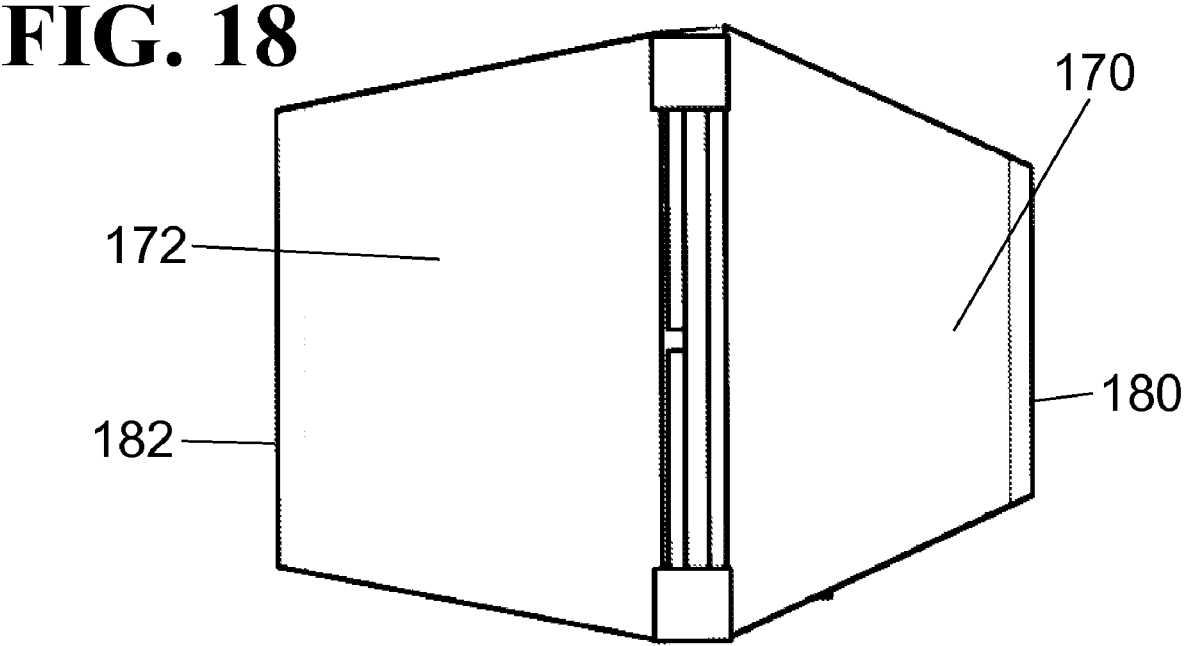
FIG. 18 is a bottom view of an s-curved and tapered fairing substantially enclosing a landing gear assembly.
Figure 19:
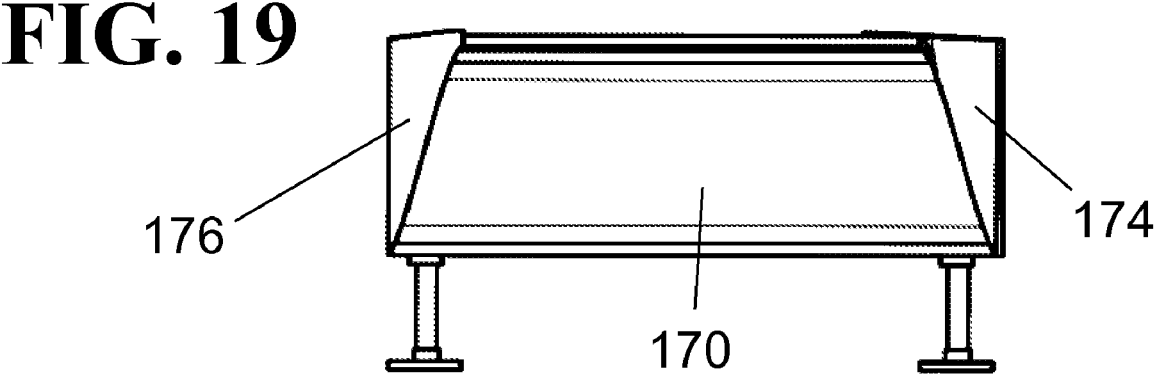
FIG. 19 is a front view of an s-curved and tapered fairing substantially enclosing a landing gear assembly.
Figure 20:
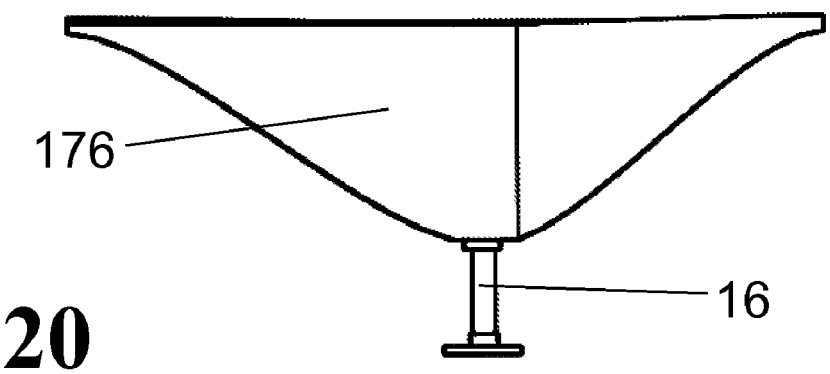
FIG. 20 is a side view of an s-curved and tapered fairing substantially enclosing a landing gear assembly.
Figure 21:
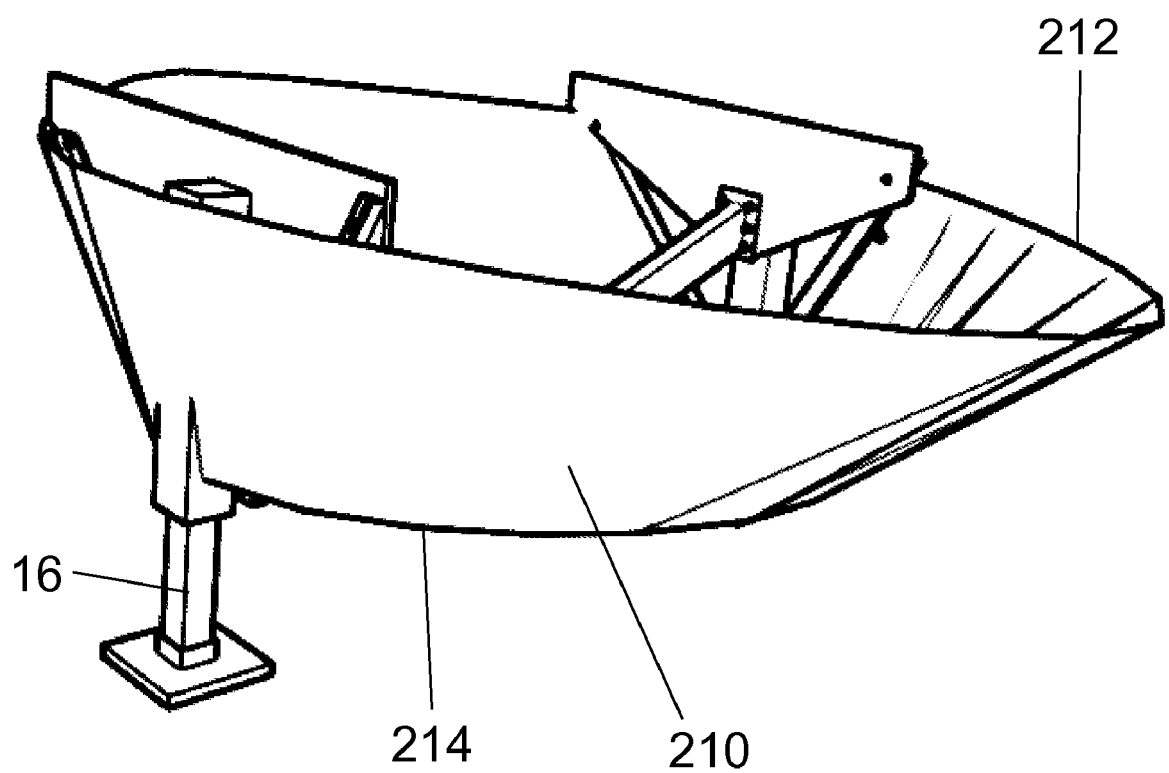
FIG. 21 is a perspective view of an oval shaped fairing substantially enclosing a landing gear assembly.
Figure 22:
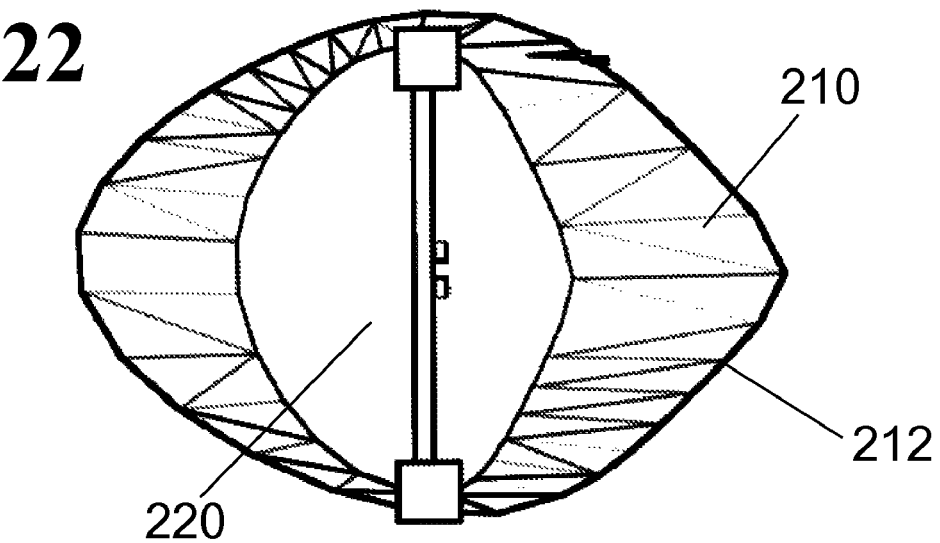
FIG. 22 is a bottom view of a tapered and oval shaped fairing substantially enclosing a landing gear assembly.
Figure 23:
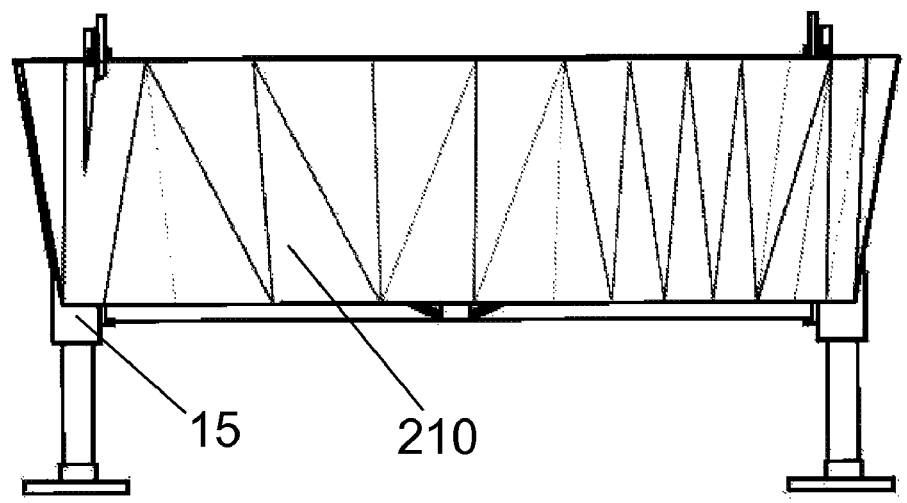
FIG. 23 is a front view of a tapered and oval shaped fairing substantially enclosing a landing gear assembly.
Figure 24:
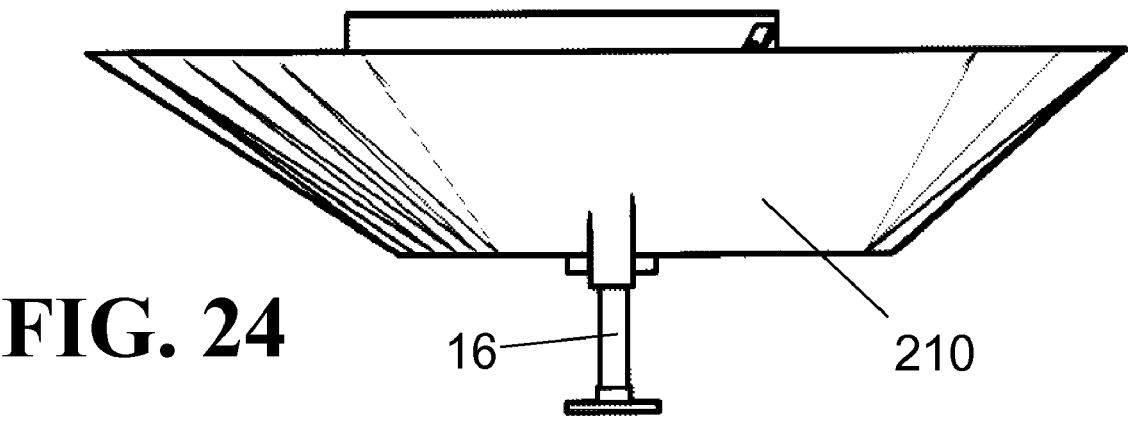
FIG. 24 is a side view of a tapered and oval shaped fairing substantially enclosing a landing gear assembly.
Figure 25:
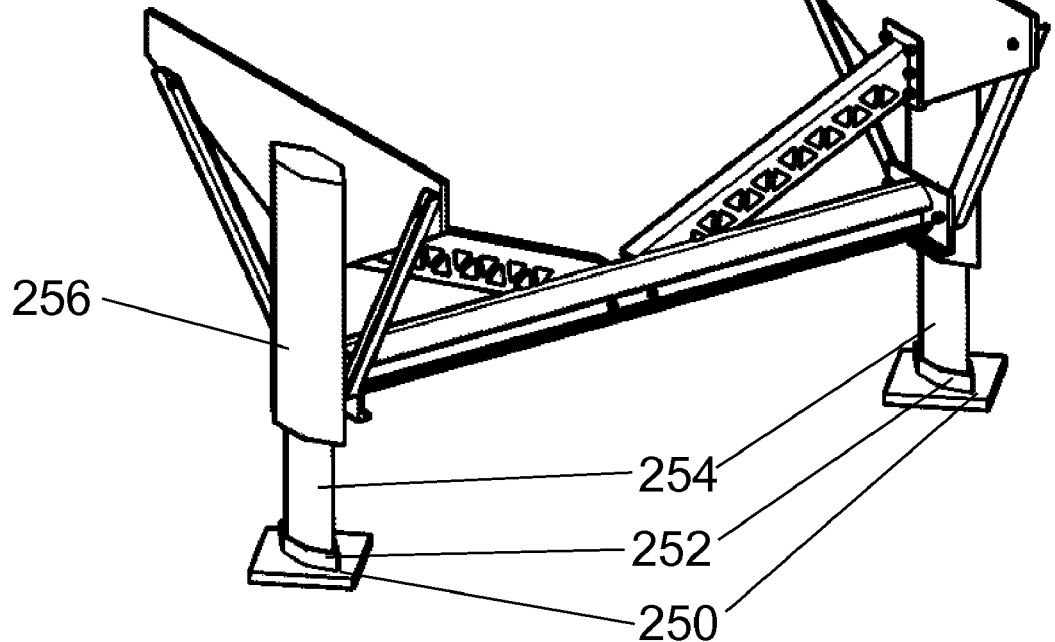
FIG. 25 is a front perspective view of a plurality of fairings integrally formed as part of a landing gear assembly.
Figure 26:
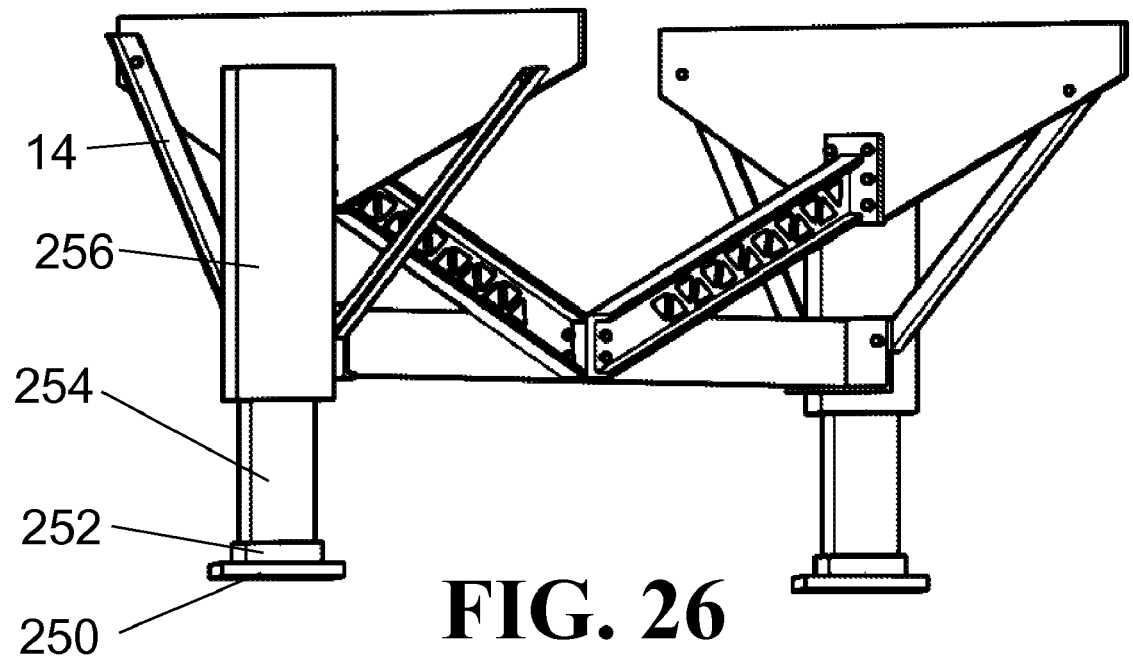
FIG. 26 is a back perspective view of a plurality of fairings integrally formed as part of a landing gear assembly.
Figure 27:
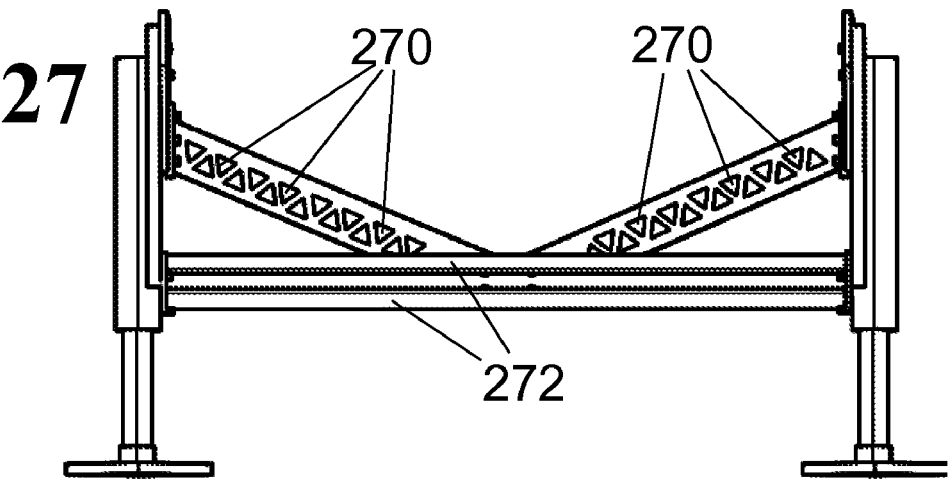
FIG. 27 is a front view of a plurality of fairings integrally formed as part of a landing gear assembly.
Figure 28:
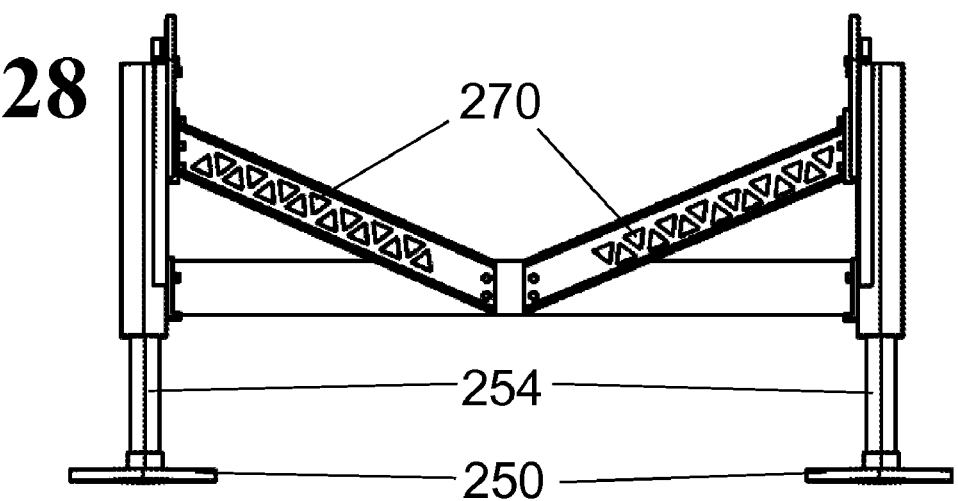
FIG. 28 is a back view of a plurality of fairings integrally formed as part of a landing gear assembly.
Figure 29:
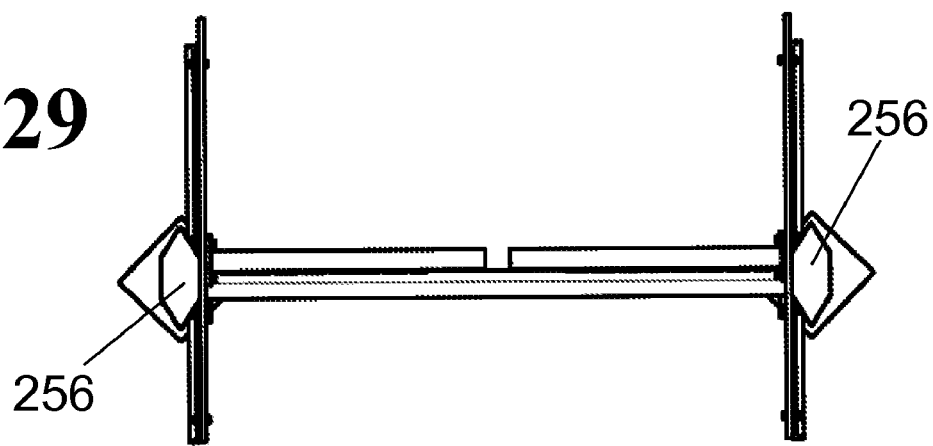
FIG. 29 is a top view of a plurality of fairings integrally formed as part of a landing gear assembly.

FIGS. 1, 2, and 3, respectively illustrate a perspective, front, and side view of a "flat panel" embodiment of a trailer fairing with a front surface 12 defined by a front leading straight edge, a trailing straight edge and two straight side edges. The ends of the trailing and leading straight edges are connected by the straight side edges. The trailer fairing is connected to a fore angled stabilizing trailer landing gear structural support 14 by at least one connection means 18. The fore angled structural supports are typically some of the landing gear components that are closest to the kingpin of the trailer. In one embodiment of the invention, the fore stabilizer has a leading surface angled at 20 to 70 degrees relative to vertical, and the leading surface of the stabilizer is substantially parallel to the front surface of the fairing.

The landing gear, which supports the front of the trailer in the absence of a tractor, includes non-retractable receiver portions 15 and retractable portions 16. Landing gear structural supports include cross, fore angled, aft angled, and laterally angled beams. Connection means may include fasteners, adhesives, hooks, and integral features for connecting the landing gear structural support and trailer fairing. In various embodiments of the invention, the trailer fairing is made of a metal, an alloy, a wood, a mineral, a polymer, a reinforced polymer, and/or a composite material. The fairing may be integrally formed into the landing gear assembly, or it may be easily detachable. If the trailer fairing is integrally formed into the landing gear assembly, it may be used to provide a substantial amount of structural integrity to the landing gear. For example, the fairing could substantially function as the cross-beam between the landing gear receivers. Alternatively, the fairing may provide no appreciable structural benefit to the trailer. For example, the fairing could be constructed of a lightweight flexible plastic so that provides little or no structural benefit to the landing gear. In one embodiment of the invention, as shown in FIG. 1, the heights of the non-retractable receiver portions 15 are similar to the length of straight side edges of the trailer fairing front surface.

In one embodiment of the invention, a trailer fairing is connected to two fore angled trailer landing gear structural supports 14 by at least two connection means 18 per fore angled trailer landing gear structural support 14, and the front surface of the fairing 12 is substantially parallel to the plane defined by the plurality of connection means 18.

The trailer fairing reduces aerodynamic drag by directing air flow in a manner which reduces the relatively positive air pressure ahead of the trailer and the relatively negative air pressure behind the trailer. In addition to improving the aerodynamic characteristics of the landing gear, the trailer fairing can reduce the amount of spray and debris in a moving trailer's wake.

FIGS. 4, 5, 6, 7, and 8, respectively illustrate a top perspective, front perspective, front, side, and top view of a "flat panel with side panel" embodiment of a trailer fairing with a front surface 12 connected to a landing gear structural support by at least one connection means 18. The trailer fairing further comprises at least one angled surface 42 defined by two sets of substantially parallel line segments, whereby the angled surface is connected to an edge of the trailer fairing front surface 12. Each angled surface 42 is not substantially parallel to the front surface 12. The angled surfaces direct airflow around the trailer landing gear and can further reduce aerodynamic drag. In FIGS. 4, 6, 7, and 8 fairings with two side panels are shown. In FIG. 5, a fairing with five side panels is shown (one panel is hidden behind the landing gear). The side panels shown in FIGS. 4, 6, 7, and 8 connect to a full edge of the fairing front face 12, while three of the fairings shown in FIG. 5 only connect to a portion of an edge of the front face 12. The embodiments of the invention illustrated in FIGS. 4, 5, 6, and 7 also illustrate an example of a fairing having a front surface with portions that extend beyond the edges of both fore stabilizing structural supports.

FIGS. 9, 10, 11, and 12, respectively illustrate a perspective, side, front, and side view of an "angled panel with side panel" embodiment of a trailer fairing with a first angled front surface 92, and a second angled front surface 94, where the first and second front surfaces of the trailer fairing are not substantially parallel to each other. In one embodiment of the invention shown in FIG. 12, an angled side surface 42 is connected to an edge of each of the angled front surfaces 92 and 94. In an exemplary embodiment of the invention, the first and second angled front surfaces 92, 94, and at least one angled side surface 42 are connected to the underside of a trailer 120. In one embodiment of the invention a plurality of connection means fasten the fairing to at least two fore angled beams support structures. In another embodiment of the invention, a plurality of connection means fasten the fairing to at least two fore angled support structure beams and/or to a cross beam support structure. Alternate embodiments of the invention may include more than two front angled surfaces. Additional side panels may also be included in the trailer fairing.

FIGS. 13, 14, 15, and 16, respectively illustrate a side perspective, bottom perspective, side, and front view of a "rounded" embodiment of a trailer fairing with a round surface 130 defined by a leading straight edge 131, a trailing straight edge 132, and two rounded side edges. The trailing and leading straight edges of the trailer fairing are substantially parallel. The ends of the trailing and leading straight edges connect to rounded side edges. The connections to the trailer fairing may include connections to the fore, aft, and cross beam support structures. In one exemplary embodiment of the invention, the trailer fairing has connections that include connections to the fore beam structural support and the aft beam structural support 150. Trailer fairings fore and aft of the landing gear improve the aerodynamics by reducing both form and base drag. Base drag is a result of a low pressure region behind a moving object. Form drag is a result of the shape of an object relative to its direction of motion. Alternate variations of the "rounded" embodiment of the invention include sidewalls.

FIGS. 17, 18, 19, and 20, respectively illustrate a perspective, bottom, front, and side view of a "tapered and s-curved" embodiment of a trailer fairing with a front tapered s-curved surface 170 that includes a surface with an s-curve shape, a back tapered s-curved surface 172 that includes a face with an s-curve shape, and two side pieces 174, 176 that connect to the front tapered 170 and back tapered s-curved surfaces 172. The trailer fairing substantially encloses the non-retractable portions of a landing gear assembly. The front and back s-curved piece of the fairing are tapered so that the leading 180 and trailing edges 182 of the fairing are shorter than the separation distance between the outermost surfaces of the two landing gears. In another embodiment of the invention, the front tapered s-curved surface 170 and the back tapered s-curved surface 172 are substantially tapered so that the leading 180 and trailing edges 182 of the fairing are substantially point-like.

FIGS. 21, 22, 23, and 24, respectively illustrate a perspective, bottom, front, and side view of a "standard hull" embodiment of a trailer fairing with a circular oval surface 210 defined by a top edge 212 and a bottom edge 214 where the top edge has a greater length than the bottom edge. The top and bottom edge of the fairing substantially circumscribe the landing gear of the trailer. In one embodiment of the invention, a bottom oval surface 220 defined by the bottom edge 214 is connected to the bottom edge 214 of the circular oval surface. In one embodiment of the invention, the oval surface 210 is rigid, while in another embodiment, the oval surface is made from a flexible material that is taught between two supports at the top and bottom edge of the fairing.

FIGS. 25, 26, 27, 28, and 29, respectively illustrate a top perspective, side perspective, front, back, and top view of an "integrally formed" embodiment of a trailer landing gear fairing. The non-retractable portions of the landing gear 256 may include surfaces angled to direct airflow around the trailer landing gear. The retractable portions of the landing gear may include angled foot portions 250, angled foot-shaft connecter portions 252, and angled shaft portions 254 that divert air flow around the landing gear. The structural supports of the landing gear may include air vents 270 that reduce the cross section of the landing gear thus reducing aerodynamic drag. The structural supports for the landing gear may further include angled faces 272 that reduce aerodynamic drag when the trailer is moved. Integrally formed fairings may be used alone or in combination with other embodiments of the invention.

Figure 30:
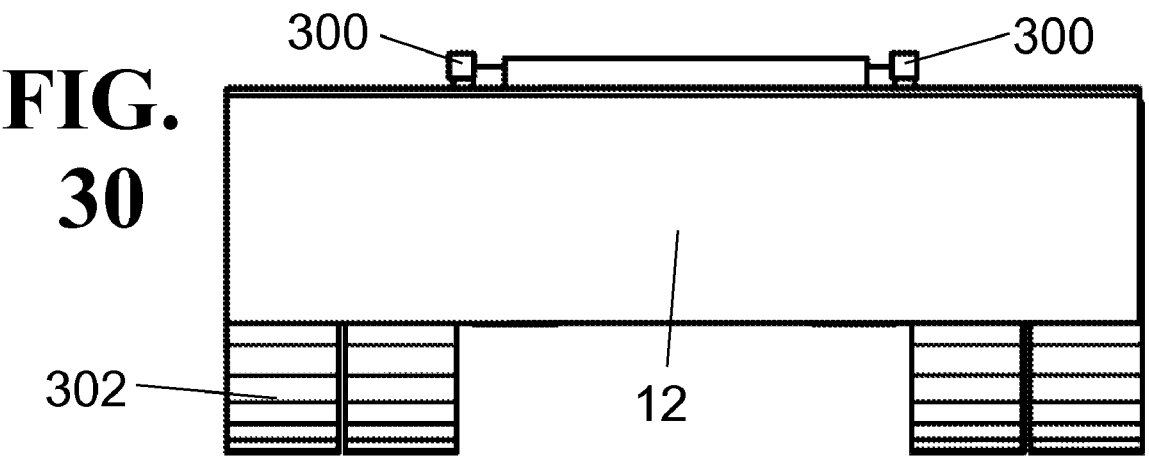
FIG. 30 is a front view of a fairing connected to a slide rail.
Figure 31:
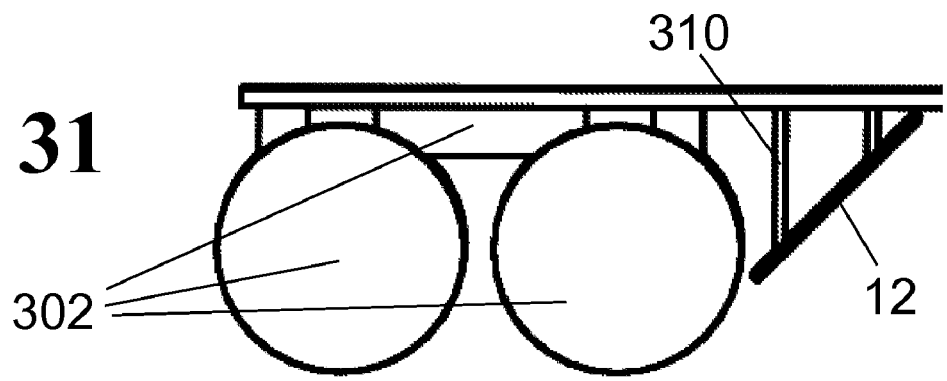
FIG. 31 is a side view of a fairing connected to a slide rail.
Figure 32:
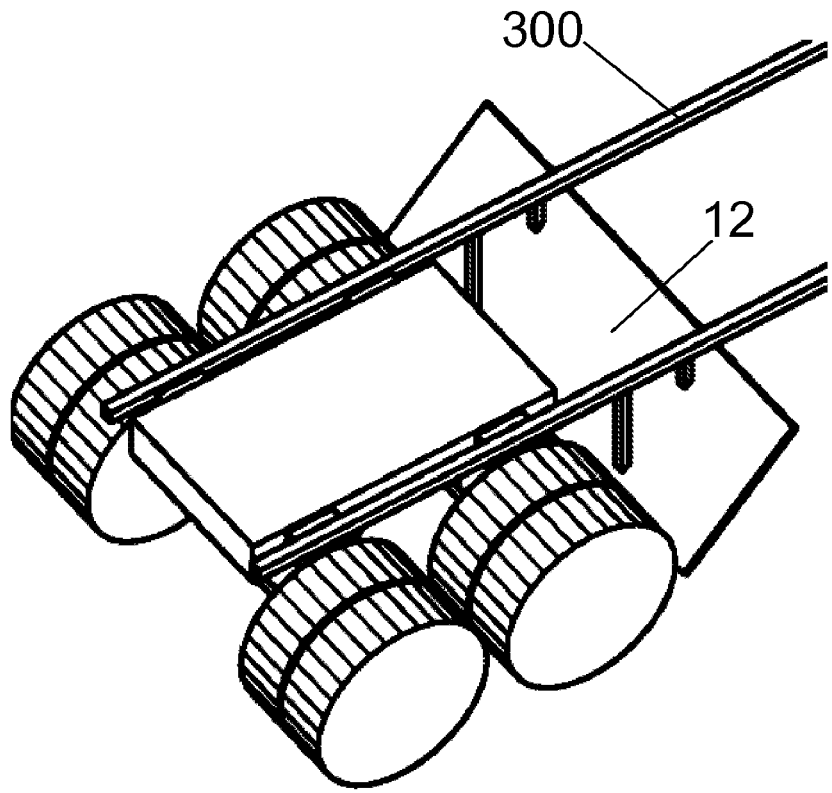
FIG. 32 is a perspective view of a fairing connected to a slide rail.
Figure 33:
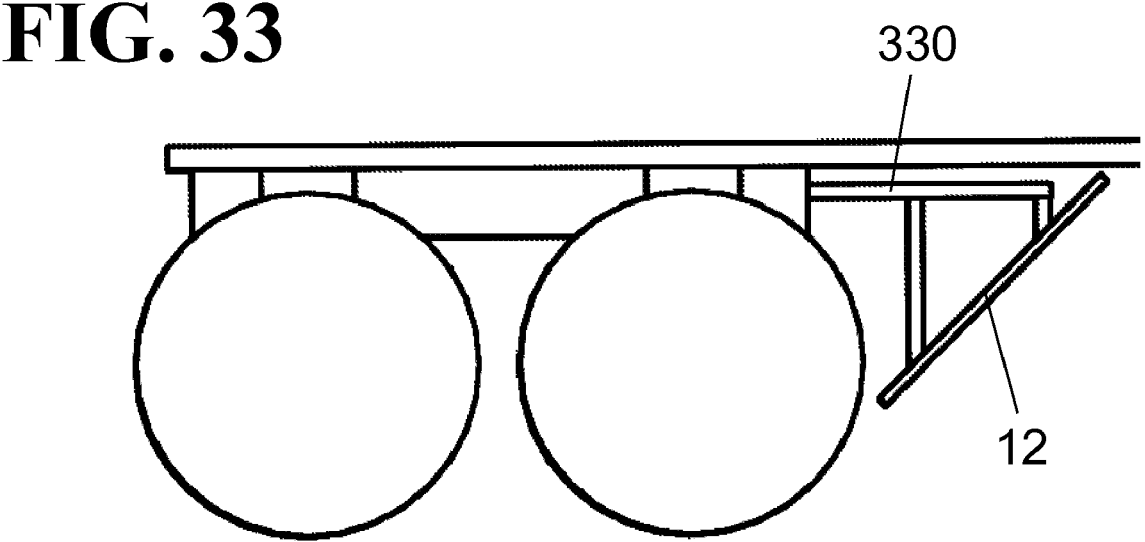
FIG. 33 is a side view of a fairing connected to a wheel assembly.
Figure 34:
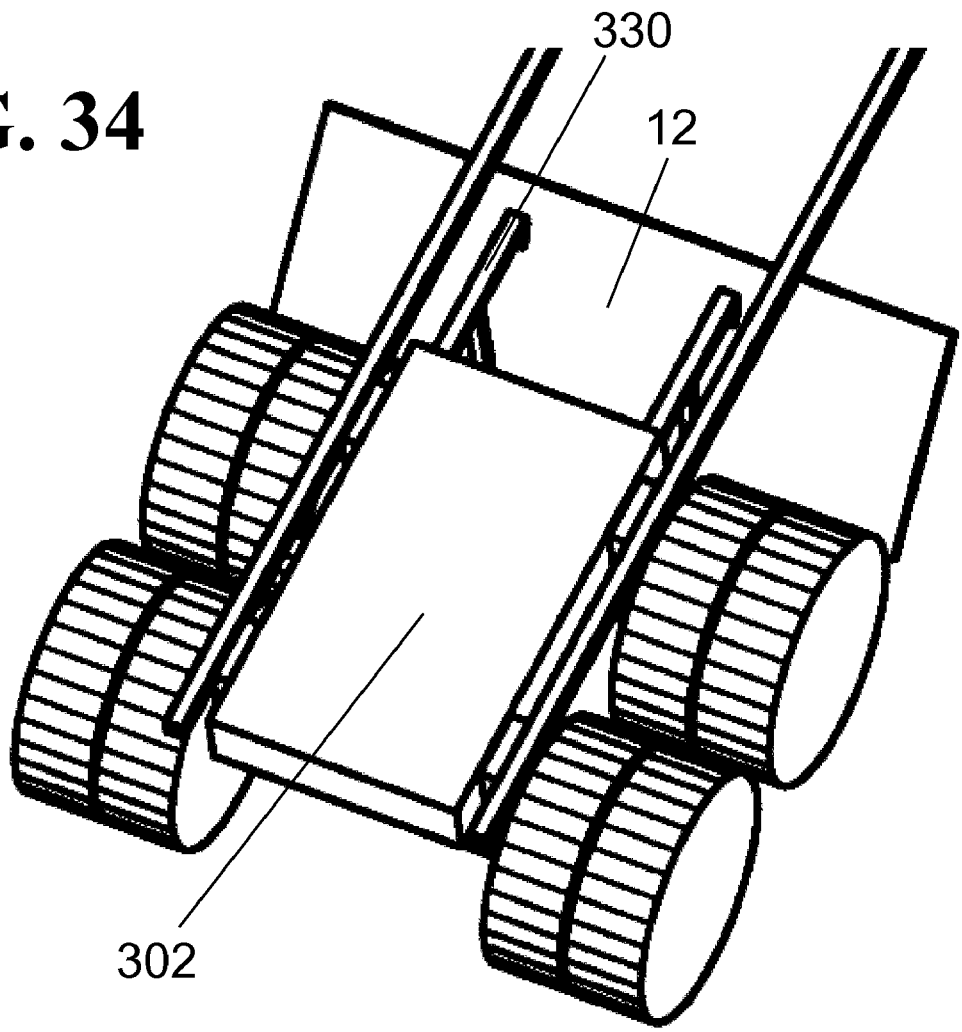
FIG. 34 is a perspective view of a fairing connected to a wheel assembly.
Figure 35:
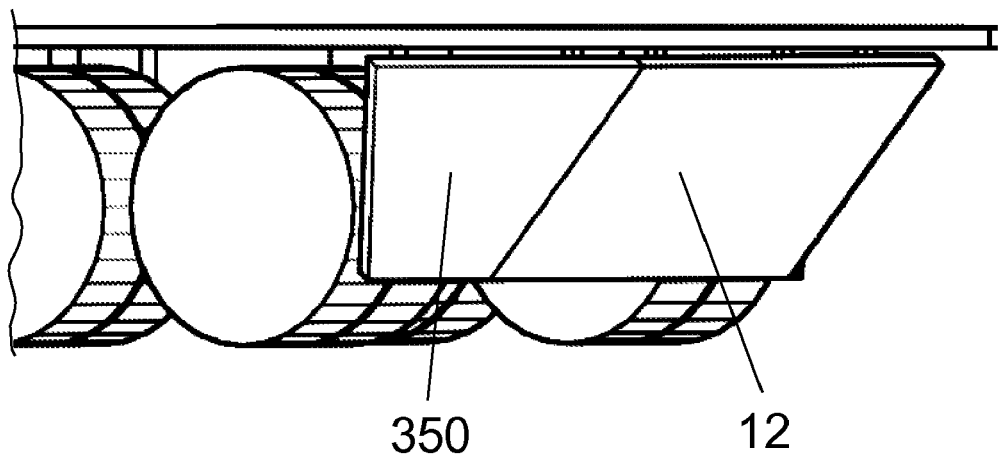
FIG. 35 is a front perspective view of a fairing with sidewalls.
Figure 36:
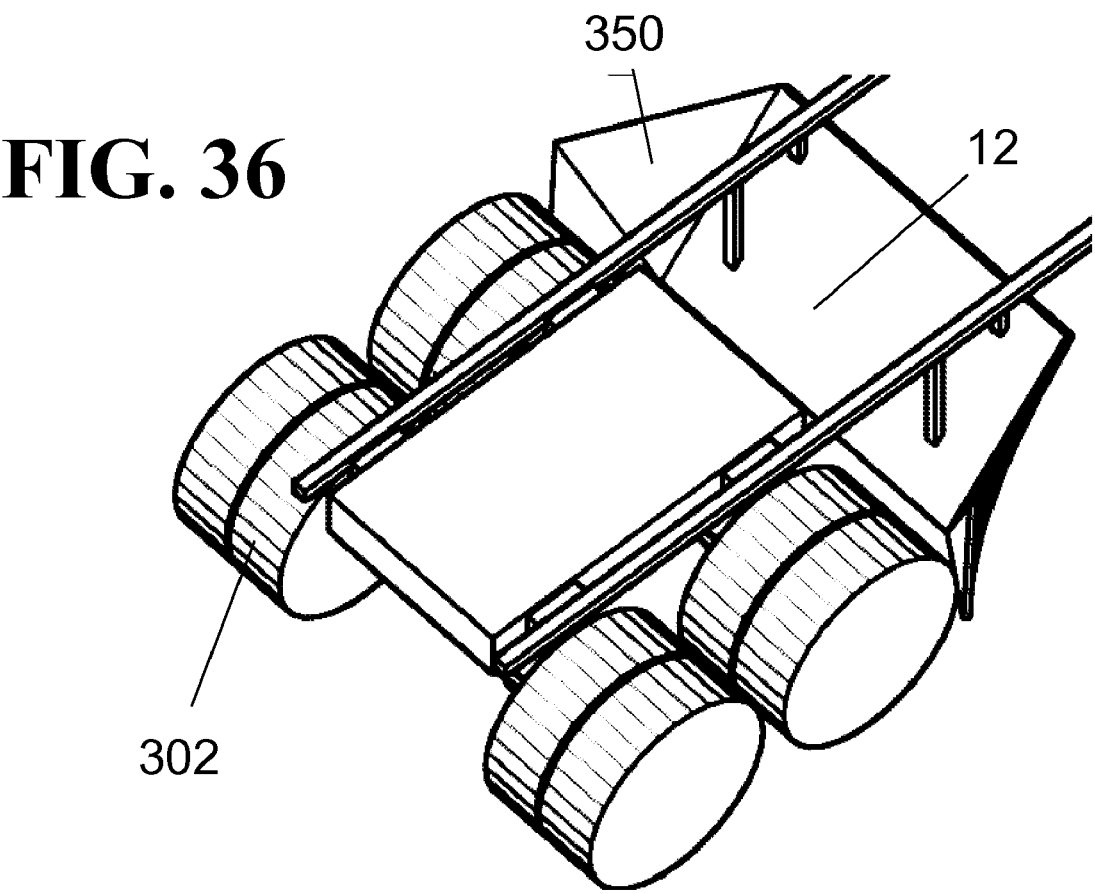
FIG. 36 is a top perspective view of a fairing with sidewalls.
Figure 37:
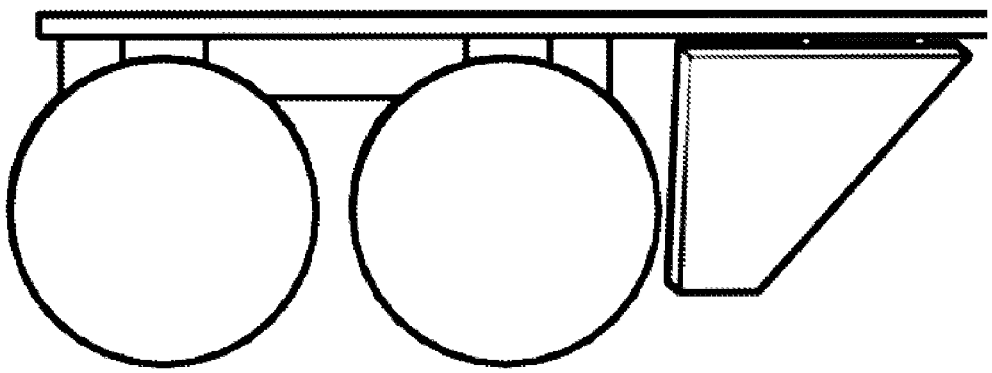
FIG. 37 is a side view of a fairing with sidewalls.
Figure 38:
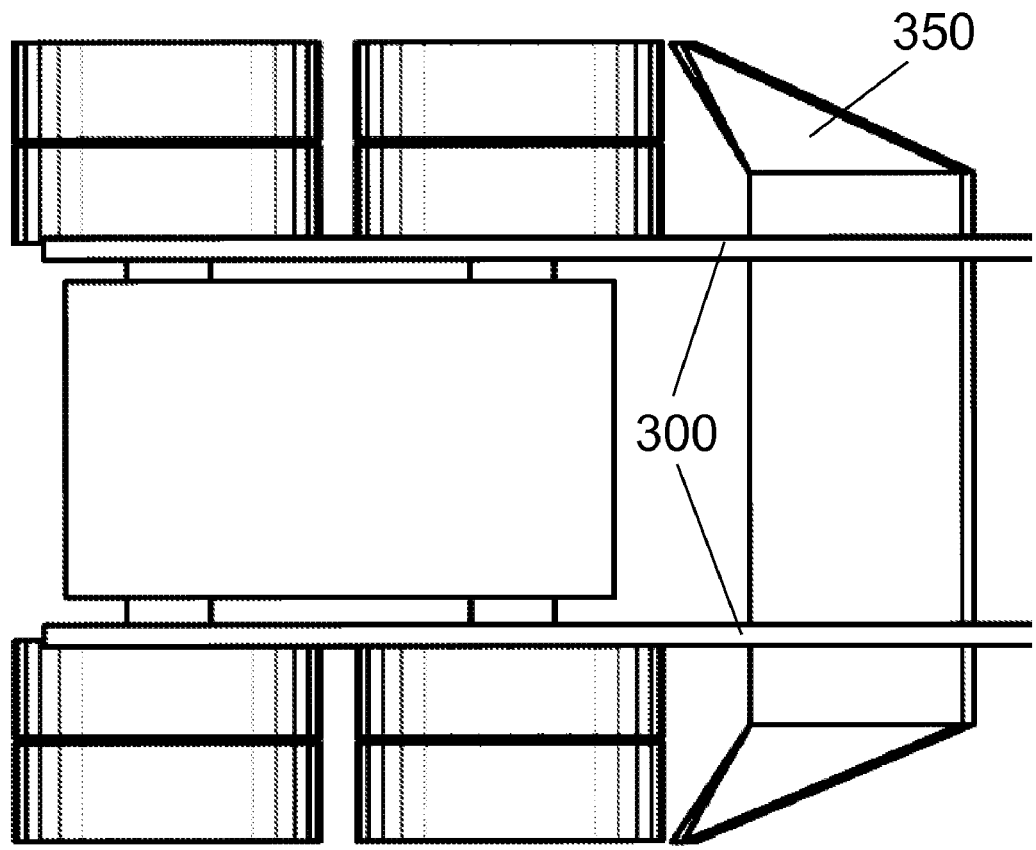
FIG. 38 is a top view of a fairing with sidewalls.

FIGS. 30, 31, and 32, respectively illustrate a front, side, and top perspective view of a "slide rail connected" embodiment of a trailer fairing connected to a slide rail 300 by at least one slide rail support 310. The slide rail 300 is also connected to a wheel assembly 302. In an alternate embodiment of the invention, FIGS. 33 and 34 illustrate a side and top perspective view of a "wheel assembly connected" embodiment of a trailer fairing connected to a trailer wheel assembly 302 by at least one wheel assembly support 330. A trailer with a "slide rail connected" or "wheel assembly connected" fairing may also include a landing gear mounted fairing.

FIGS. 35, 36, 37, and 38, respectively illustrate a side perspective, top perspective side, and top view of a "flat panel with sidewall" embodiment of a trailer fairing with sidewalls 350. The sidewalls connect to the trailer fairing front surface 12. Compared to the angle side surfaces illustrated in FIGS. 13, 14, 15, and 16, each of the four edges of the sidewalls 350 has a different length, and every edge is not substantially parallel to another edge. The use of side panels or sidewalls will depend on the design of the trailer to which the trailer fairing is connected.

Figure 41:
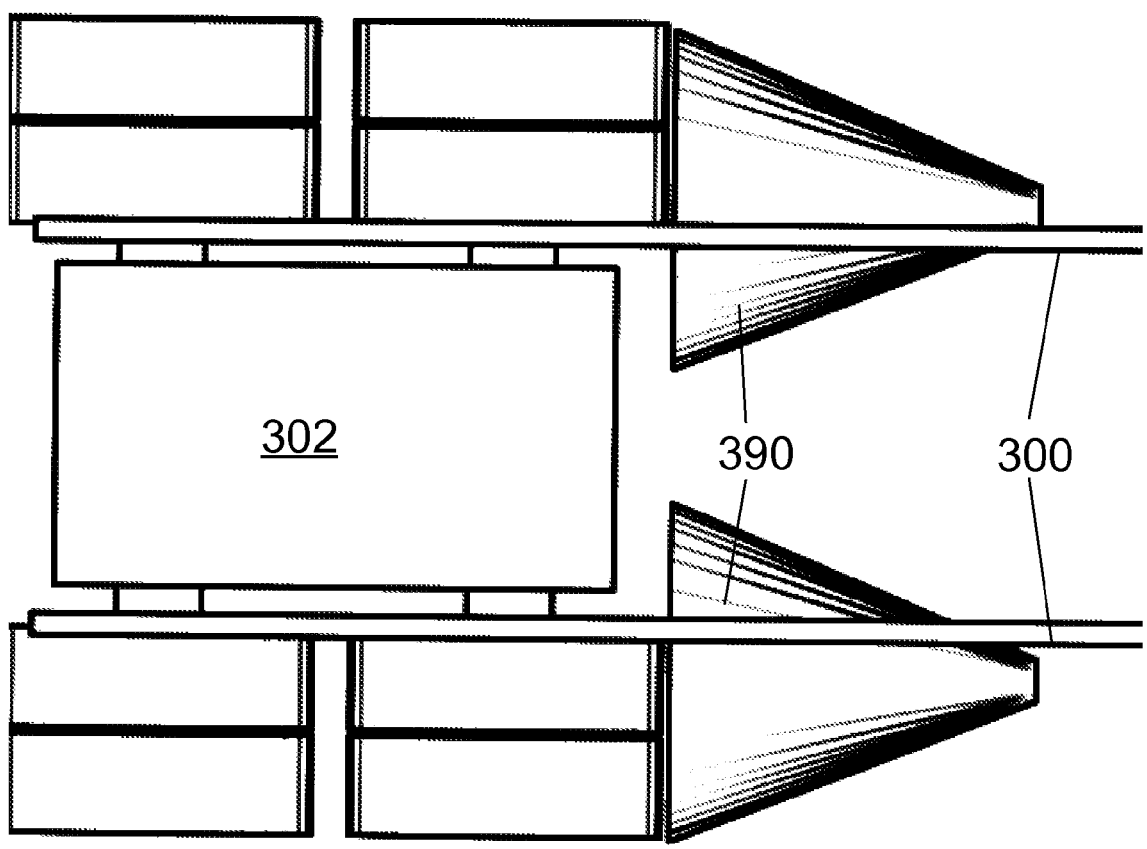
FIG. 41 is a top view of a plurality of fairings connected to a slide rail.
Figure 42:
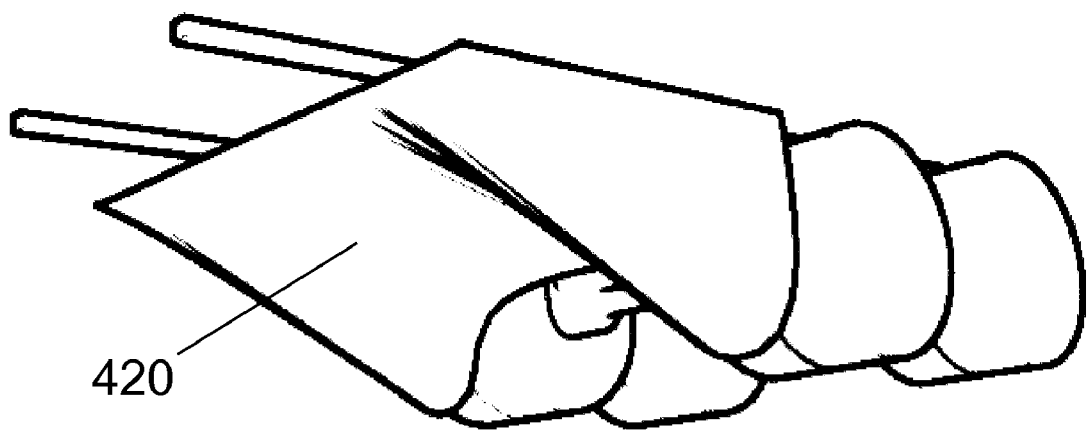
FIG. 42 is a bottom perspective view of a dual-keeled fairing.
Figure 43:
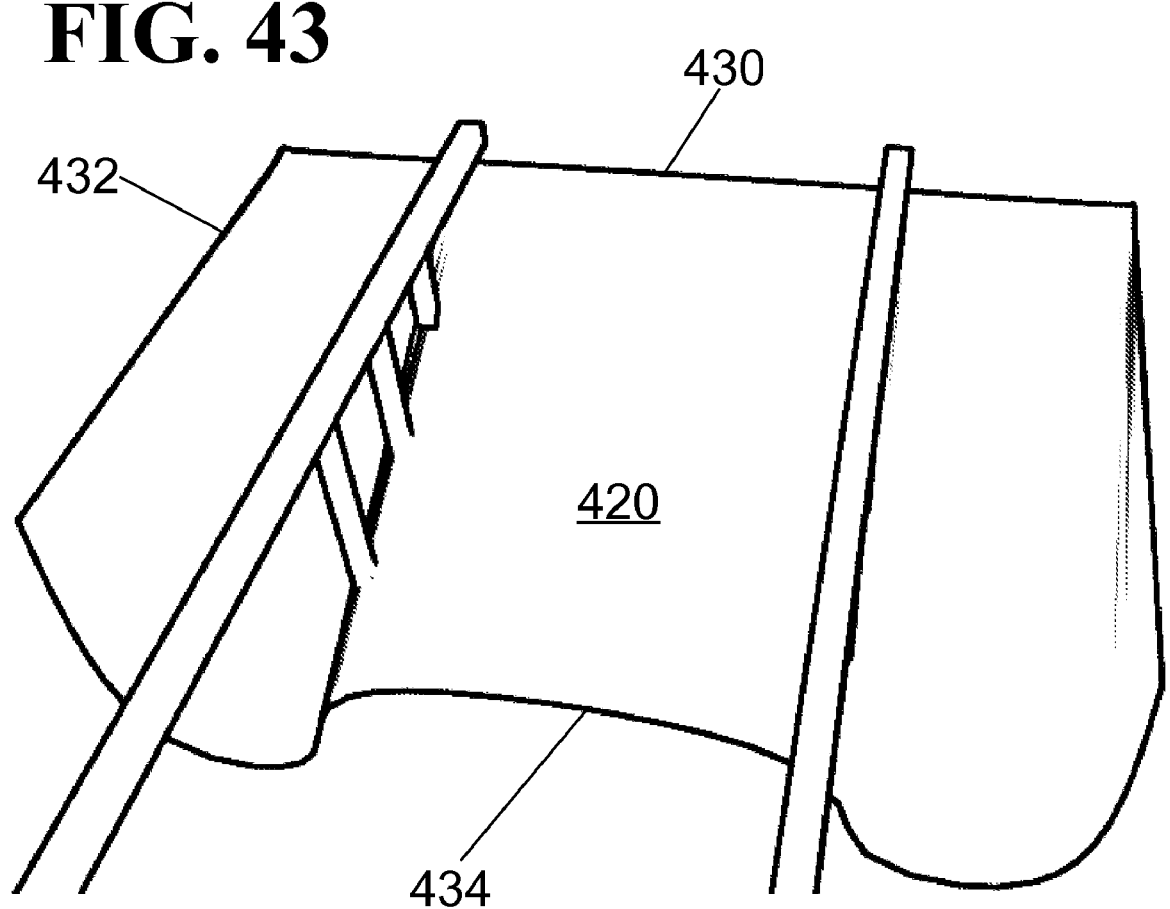
FIG. 43 is a top perspective view of a dual-keeled fairing.
Figure 44:
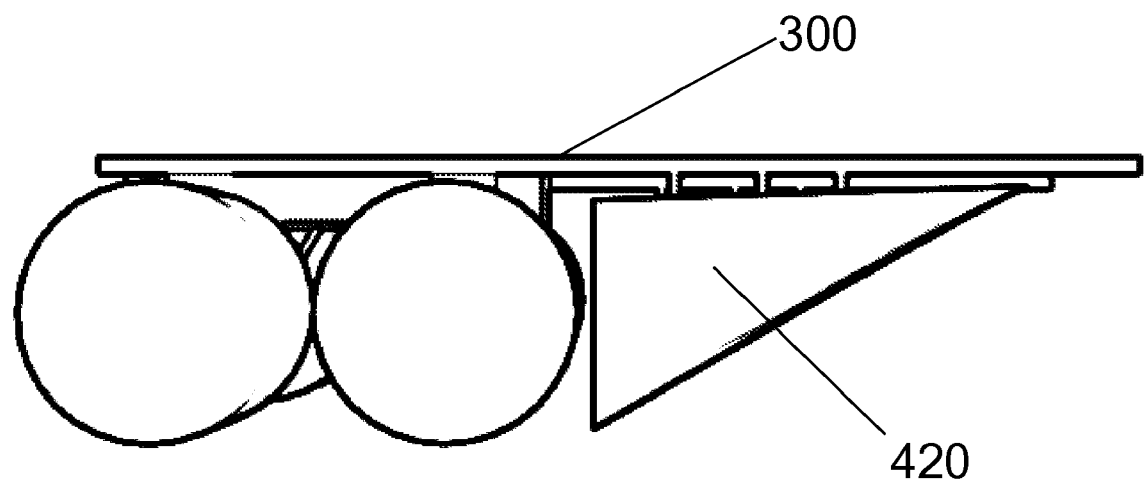
FIG. 44 is a side view of a dual-keeled fairing.
Figure 45:
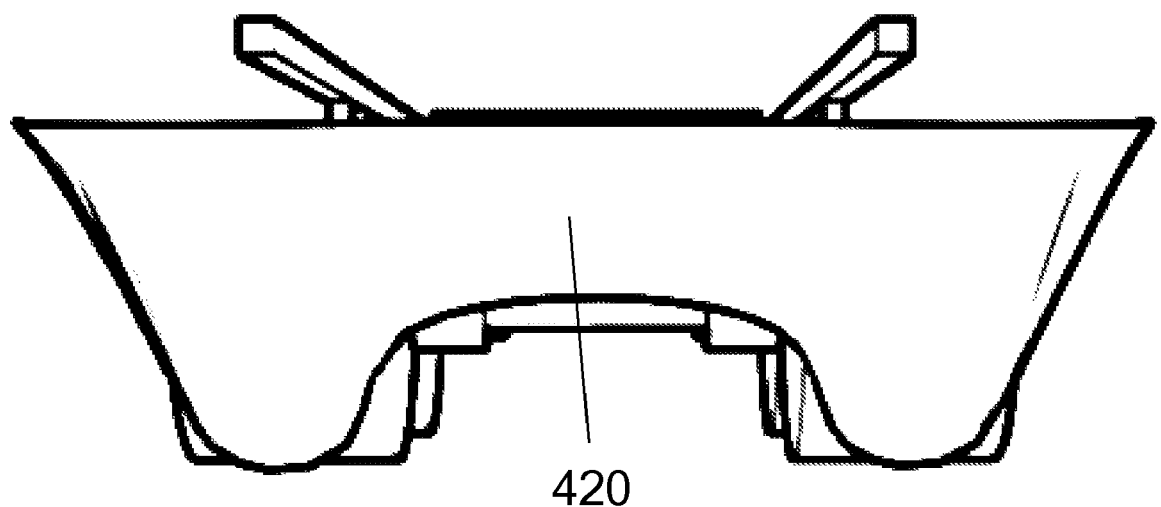
FIG. 45 is a front perspective view of a dual-keeled fairing.
Figure 46:
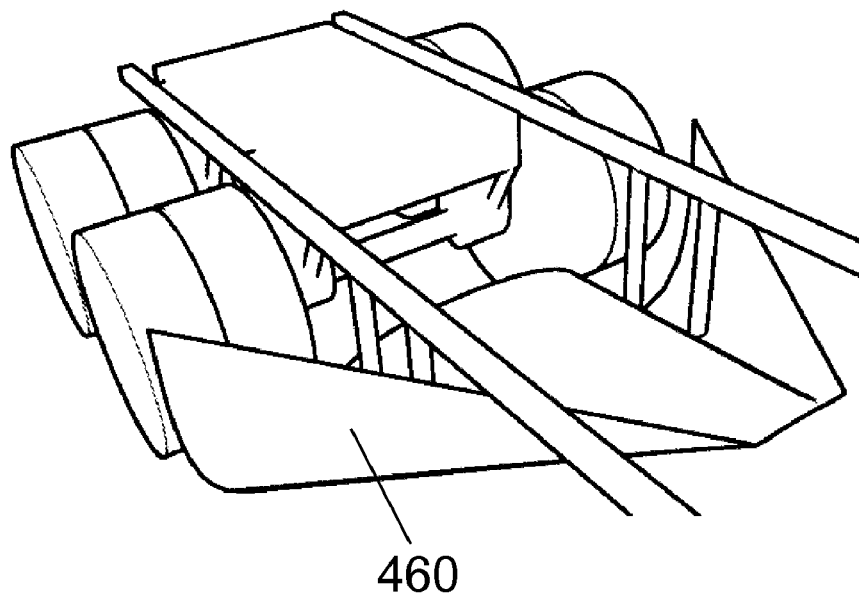
FIG. 46 is a front top perspective view of a tapered dual-keeled fairing.
Figure 47:
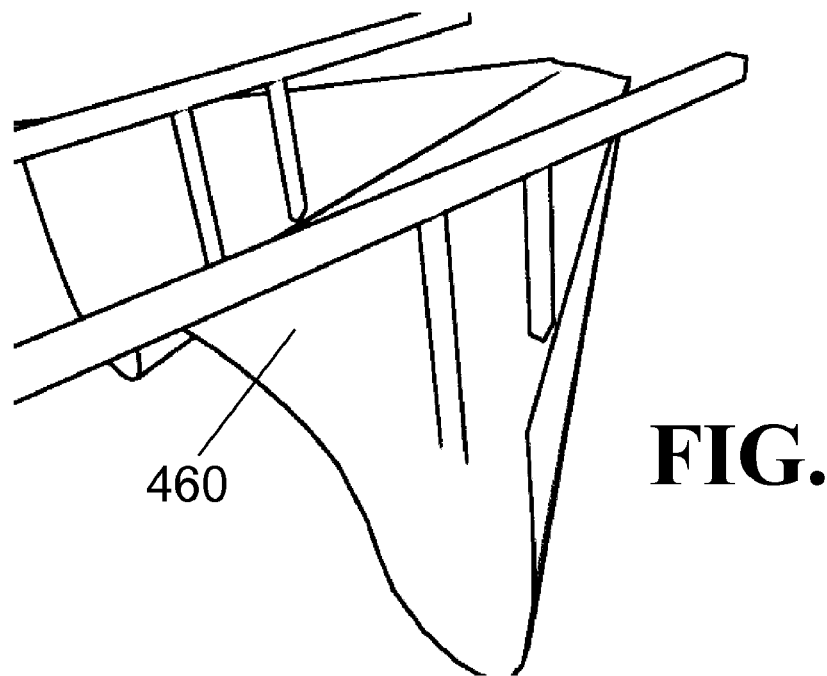
FIG. 47 is a rear top perspective view of a tapered dual-keeled fairing.
Figure 48:
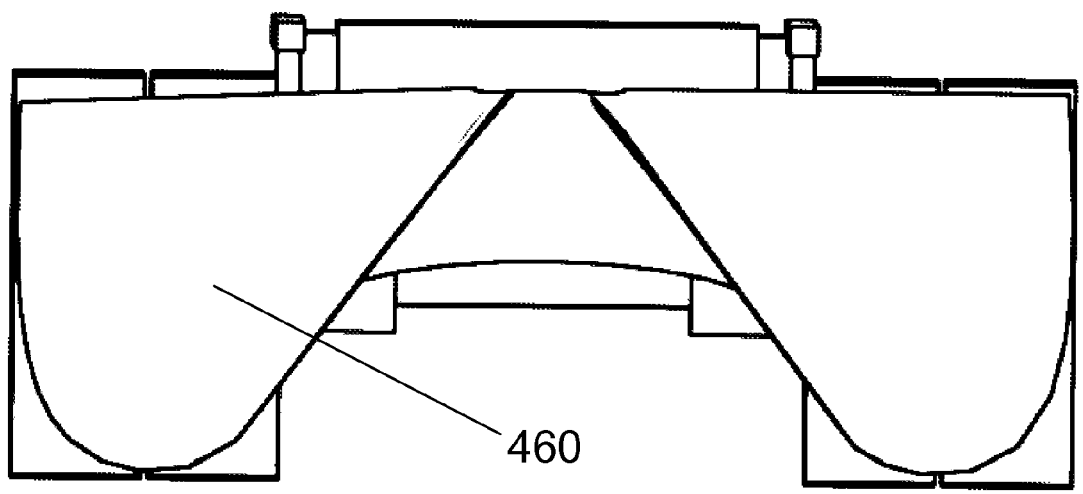
FIG. 48 is a front view of a tapered dual-keeled fairing.
Figure 49:
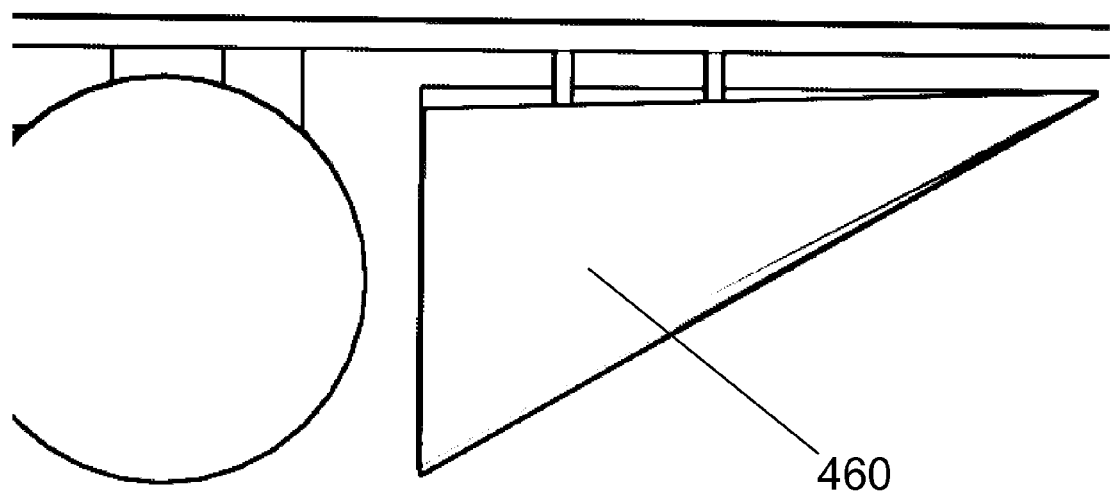
FIG. 49 is a side view of a tapered dual-keeled fairing.
Figure 50:
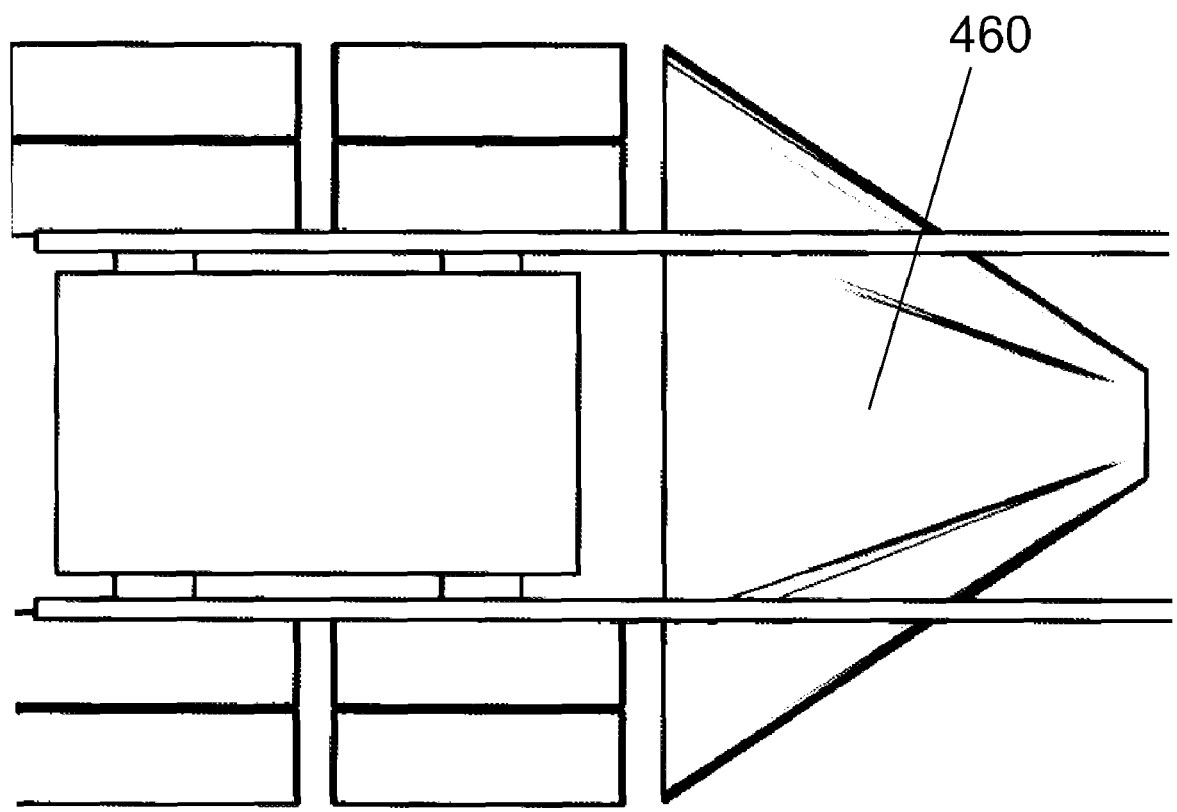
FIG. 50 is a top view of a tapered dual-keeled fairing.

FIGS. 39, 40, and 41, respectively illustrate a front, side perspective, and top view of two "pontoon" embodiments of trailer fairings 390 connected to a trailer slide rail or trailer landing gear. Each of the trailer fairings includes a rounded edge, at least two straight edges, and a surface connected to the rounded edge and the straight edges. The use of many smaller fairings instead of a single larger fairing allows for easier replacement. Using smaller fairings also increases the number of arrangements in which the fairings can be used.

FIGS. 42, 43, 44, and 45, respectively illustrate a bottom perspective, top perspective, side and front perspective view of a "catamaran-type" embodiment of a trailer fairing 420 with a surface defined by a leading straight edge 430, two straight side edges 432, and a curved trailing edge 434. The leading straight edge 430 is connected to each of the straight side edges 432, and the curved trailing edge 434 is connected to each of the straight side edges 432. The curved trailing edge 434 includes two convex sections and a concave section, or a convex section and two concave sections. The two straight side edges and the leading straight edge are of comparable length. The surface connects to the four edges. In an exemplary embodiment of the invention, the curved trailing edge 434 is generally defined by the shape of a trailer landing gear assembly and/or the shape of the wheel assembly.

FIGS. 46, 47, 48, 49, and 50, respectively illustrate a top front perspective, top rear perspective, front, side, and top view of a "tapered catamaran-type" embodiment of a trailer fairing 460 with a surface defined by a leading straight edge, two straight side edges, and a curved trailing edge. The leading straight edge is connected to each of the straight side edges, and the curved trailing edge is connected to each of the straight side edges. The curved trailing edge includes two convex sections and a concave section. The curved trailing edge may alternatively include a convex section and two concave sections. The leading straight edge is shorter than each of the two straight side edges. The tapered front of the fairing helps to reduce wind resistance, and can reduce the weight and amount of material in the fairing.

Figure 51:
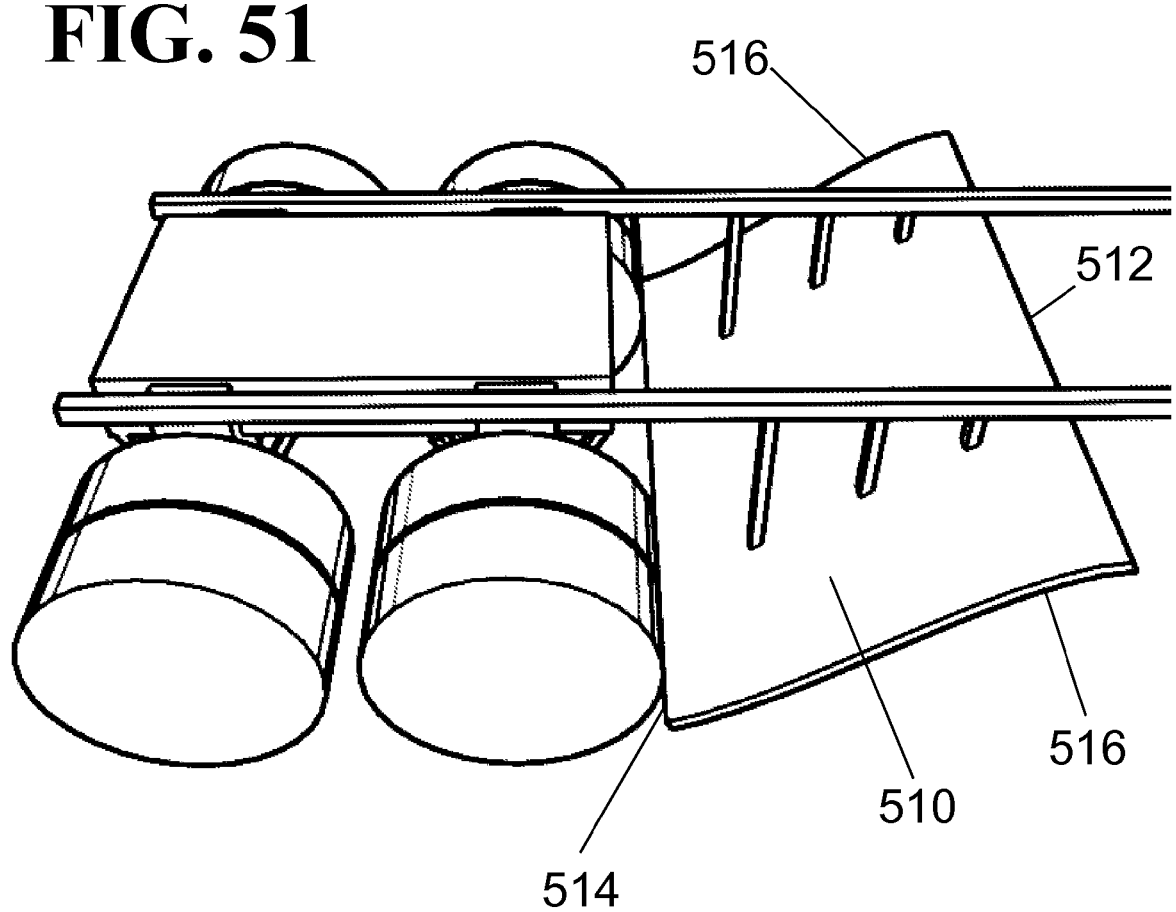
FIG. 51 is a side perspective view of an s-curved fairing.
Figure 52:
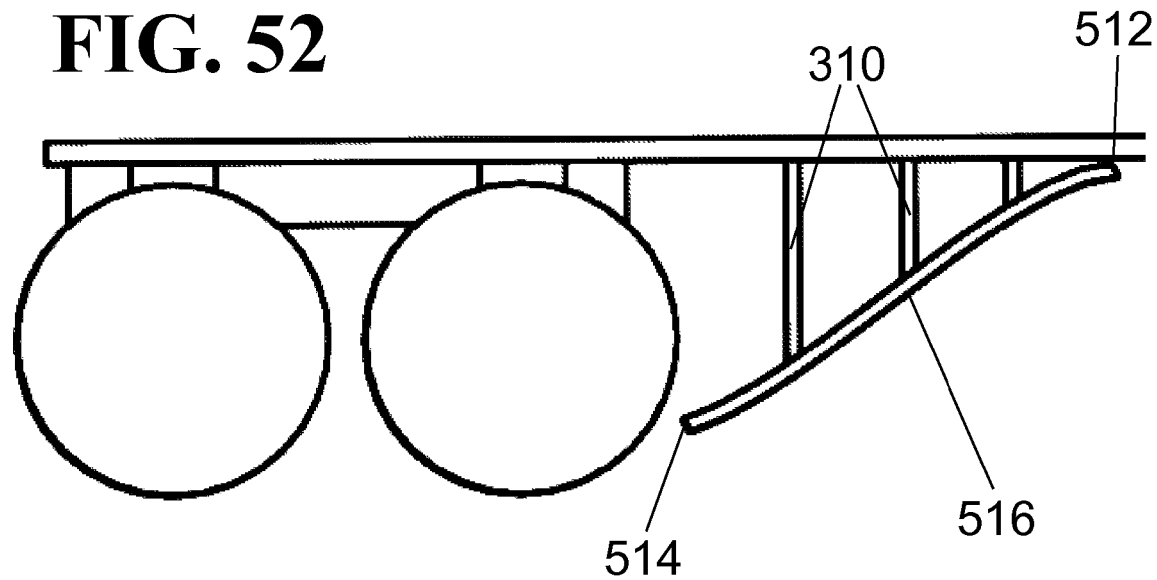
FIG. 52 is a side view of an s-curved fairing.
Figure 53:
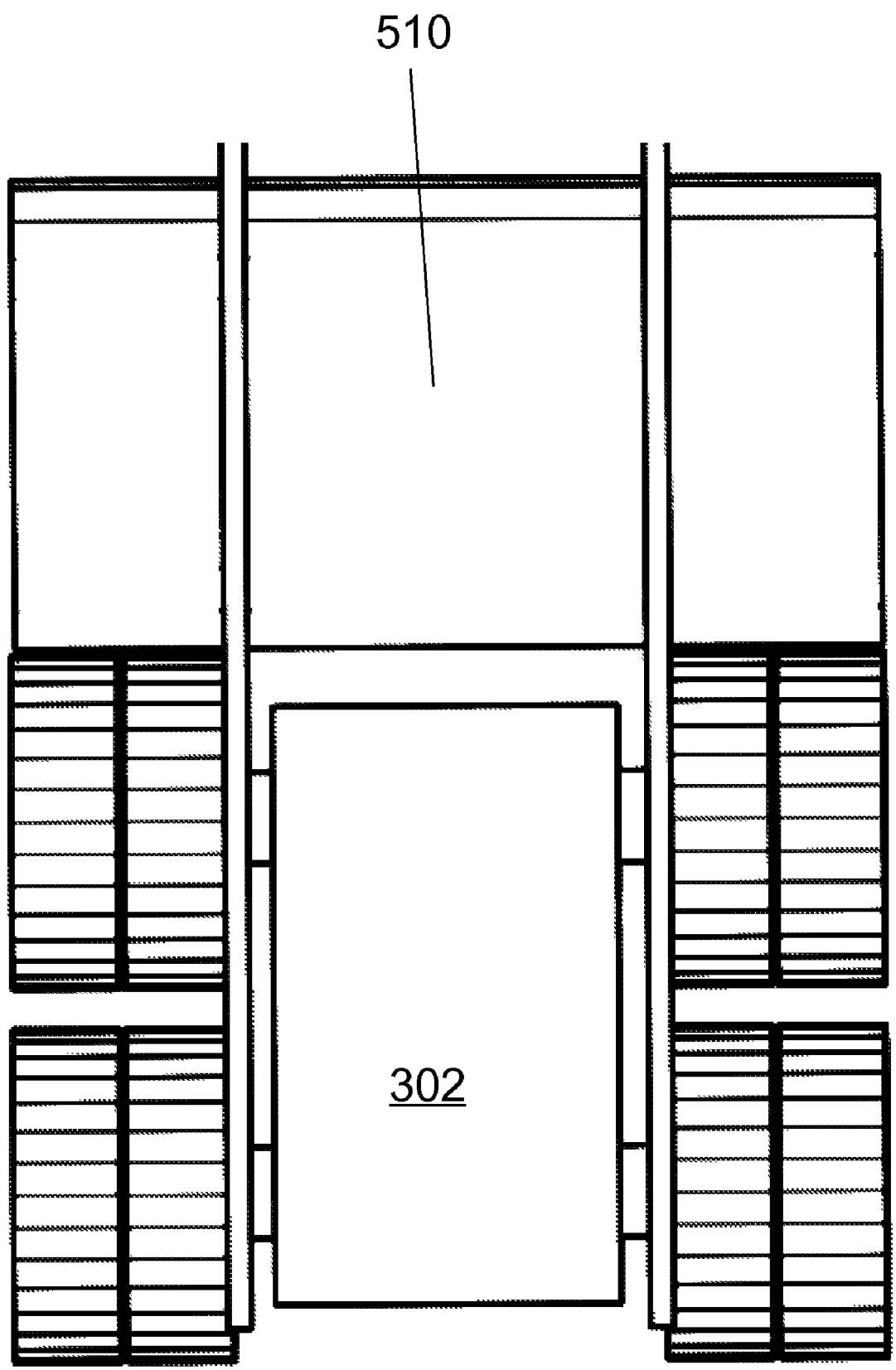
FIG. 53 is a top view of an s-curved fairing.

FIGS. 51, 52, and 53, respectively illustrate top side perspective, side, and top view of a "planing hull" embodiment of a trailer fairing 510 with a surface defined by a leading straight edge 512, a trailing straight edge 514, and two curved side edges 516. Each end of the leading straight edge and trailing straight edge is connected to a curved side edge. The curved side edges include the general shape of an s-curve. The surface is connected to a wheel assembly, slide rail, or landing gear by a connection means. In an exemplary embodiment of the "planing hull" trailer fairing 510, the leading straight edge 512 is in close proximity to the underside of a trailer cargo container.

FIGS. 54 and 55, respectively illustrate a side and top perspective view of a "planing hull with side panels" embodiment of a trailer fairing 510 with a surface defined by a leading straight edge, a trailing straight edge, and two curved side edges. Each end of the leading straight edge and trailing straight edge is connected to a curved side edge. The curved side edges include the general shape of an s-curve. The surface is connected to a wheel assembly, a slide rail, or a landing gear assembly by a connection means. The trailer fairing further includes at least one side surface 540 defined by a horizontal straight edge, a vertical straight edge, and a curved side edge. The horizontal straight edge is connected to, and substantially perpendicular to the leading straight edge. The vertical straight edge is perpendicular to the horizontal edge, and perpendicular to the trailing straight edge, as well as connected to both the horizontal edge and trailing edge.

Figure 56:
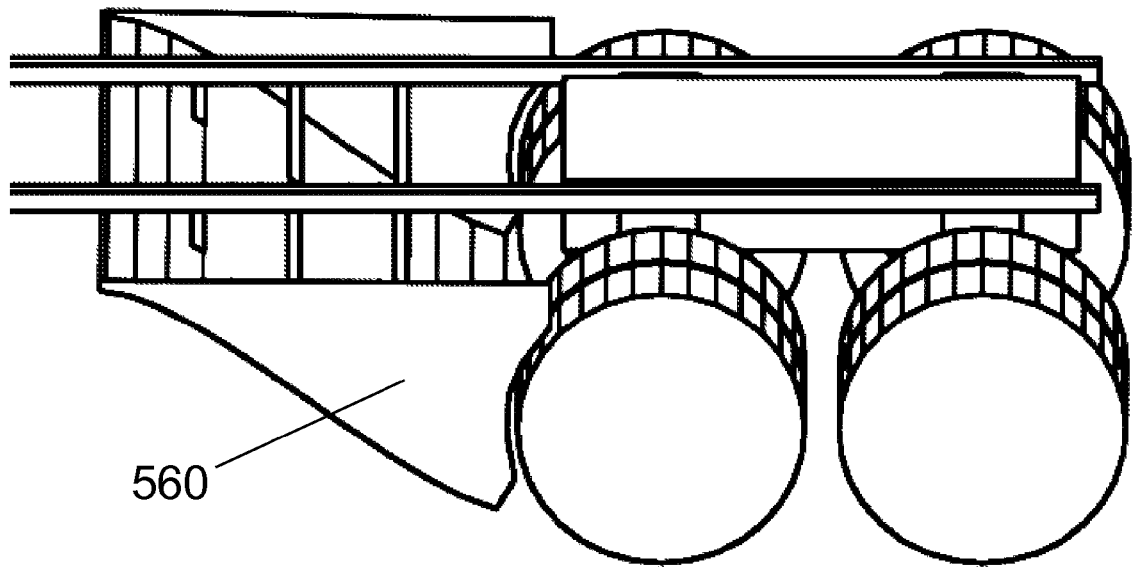
FIG. 56 is a side-top perspective view of an s-curved fairing with wheel contoured sidewalls.
Figure 57:
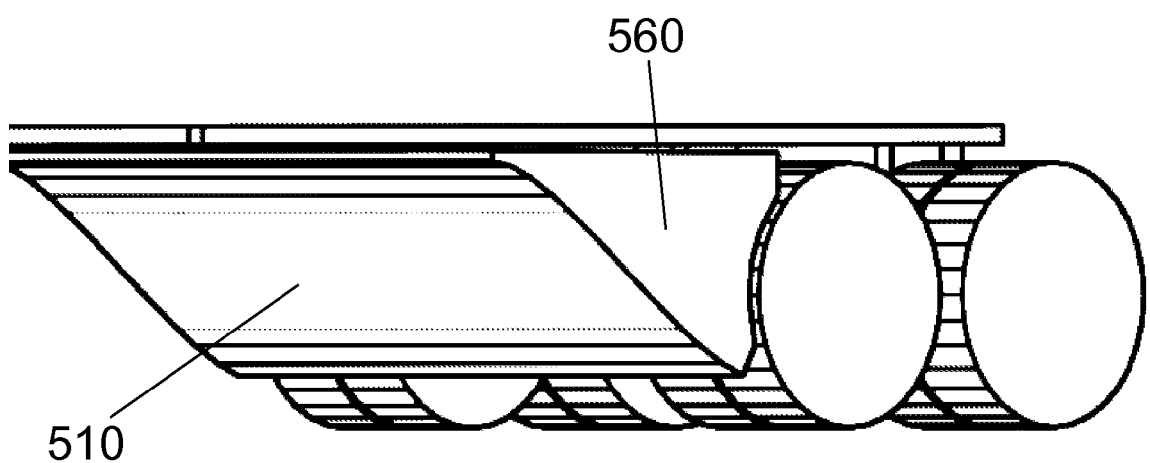
FIG. 57 is a side perspective view of an s-curved fairing with wheel contoured sidewalls.

FIGS. 56 and 57, respectively illustrate a top perspective and a side perspective of a "planing hull with shaped side panels" embodiment of a trailer fairing with a surface defined by a leading straight edge, a trailing straight edge, and two curved side edges. Each end of the leading straight edge and trailing straight edge is connected to a curved side edge. The curved side edges include the general shape of an s-curve. The surface is connected to a wheel assembly, slide rail, or a landing gear assembly by a connection means. The trailer fairing further includes at least one side surface defined by a horizontal straight edge, a vertical curved edge, and a curved side edge 560. The horizontal straight edge is connected to, and substantially perpendicular to the leading straight edge. The vertical curved edge is substantially perpendicular to the trailing straight edge, connected to both the horizontal edge and trailing edge. The vertical curved edge shown includes a curvature similar to that of a wheel.

Figure 60:
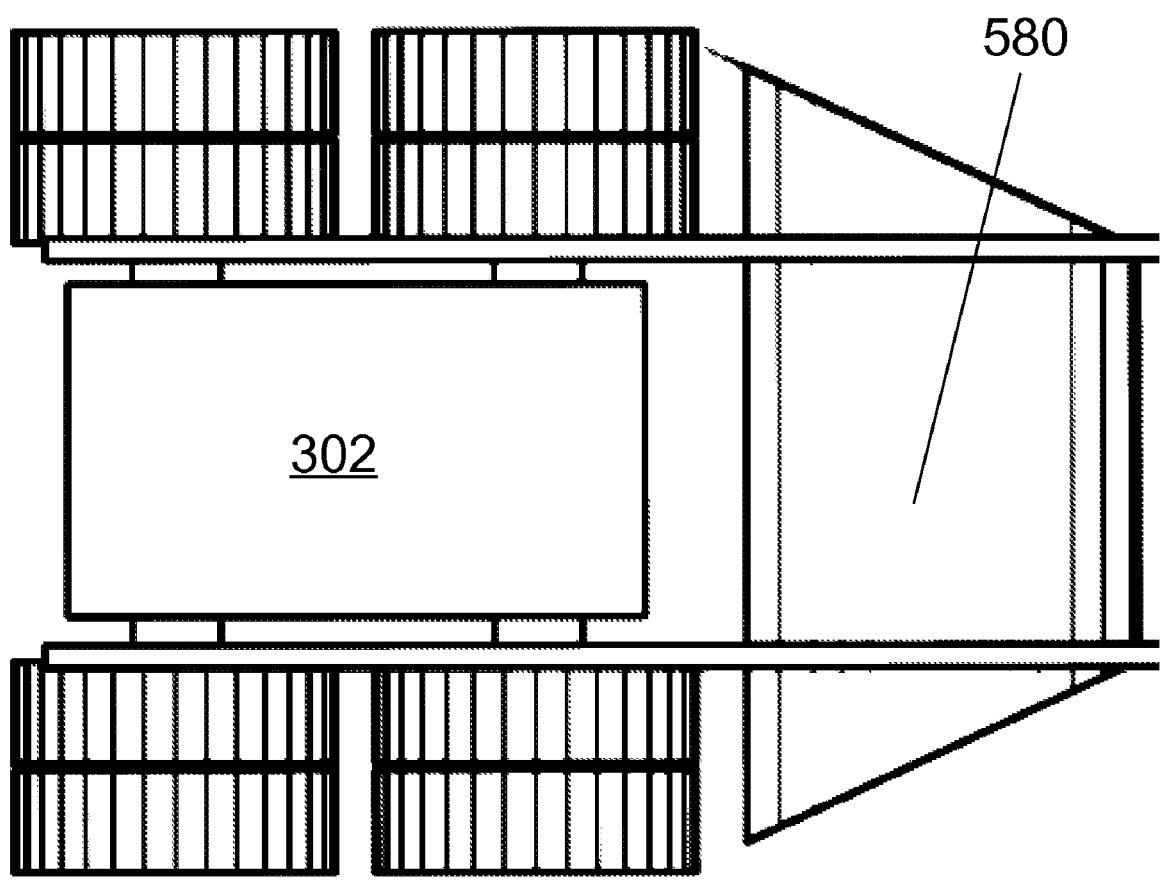
FIG. 60 is a top view of a tapered s-curved fairing with sidewalls.

FIGS. 58, 59, and 60, respectively illustrate a side perspective, front, and top view of a "tapered planing hull with shaped side panels" embodiment of a trailer fairing 580 with a surface defined by a leading straight edge, a trailing straight edge, and two curved side edges. In the embodiment shown, the leading straight edge is shorter than the trailing straight edge. Each end of the leading straight edge and trailing straight edge is connected to a curved side edge. The curved side edges include the general shape of an s-curve. The surface is connected to a wheel assembly, slide rail, or landing gear by a connection means. The trailer fairing further includes at least one side surface defined by a horizontal straight edge, a vertical curved edge, and a curved side edge 582. The horizontal straight edge is connected to the leading straight edge. The vertical curved edge is connected to the horizontal straight edge and the trailing straight edge. The vertical curved edge shown includes a curvature similar to that of a wheel.

Figure 61:
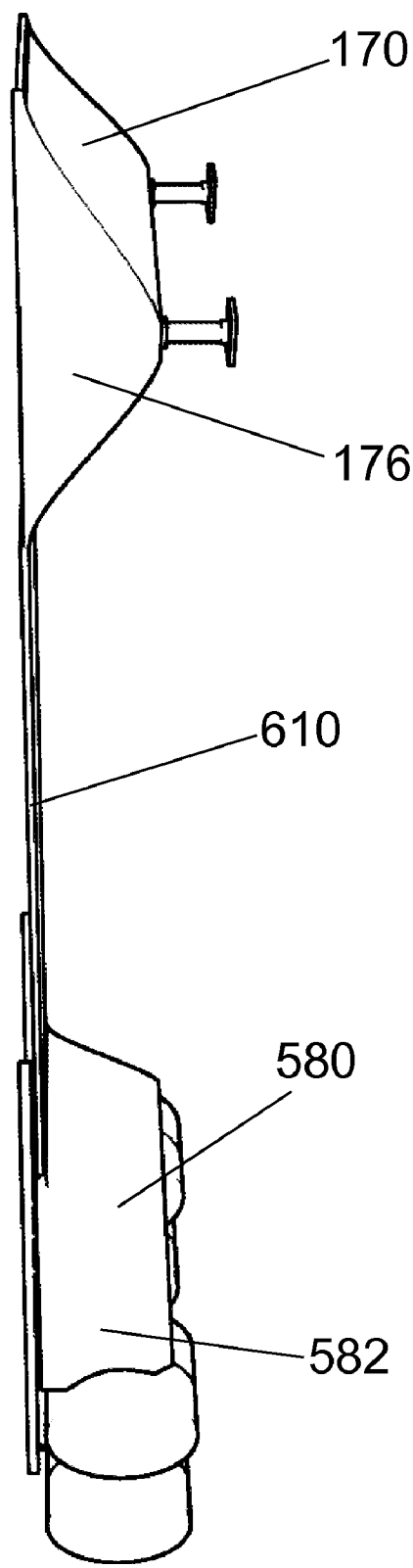
FIG. 61 is a bottom perspective view of a tapered s-curved fairing that substantially encloses a trailer landing gear assembly, covers the underside of a trailer, and has wheel contoured sidewalls.
Figure 62:
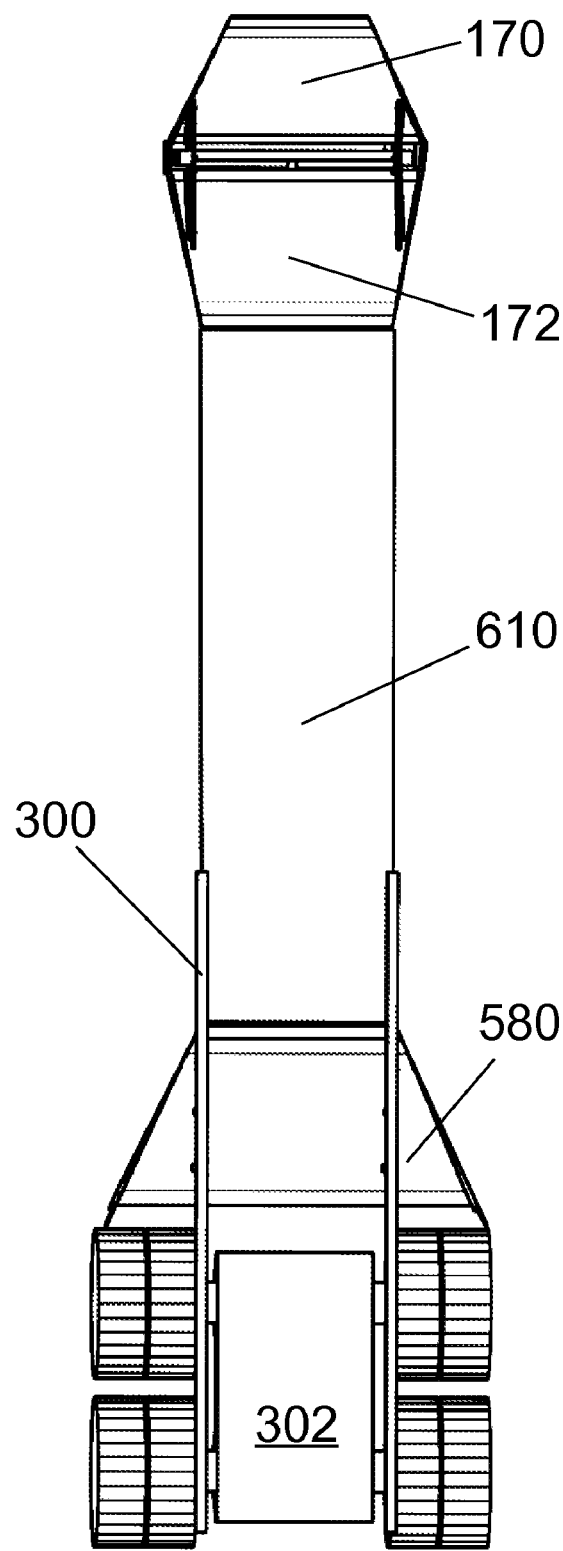
FIG. 62 is a top view of a tapered s-curved fairing that substantially encloses a trailer landing gear assembly, covers the underside of a trailer, and has wheel contoured sidewalls.
Figure 63:
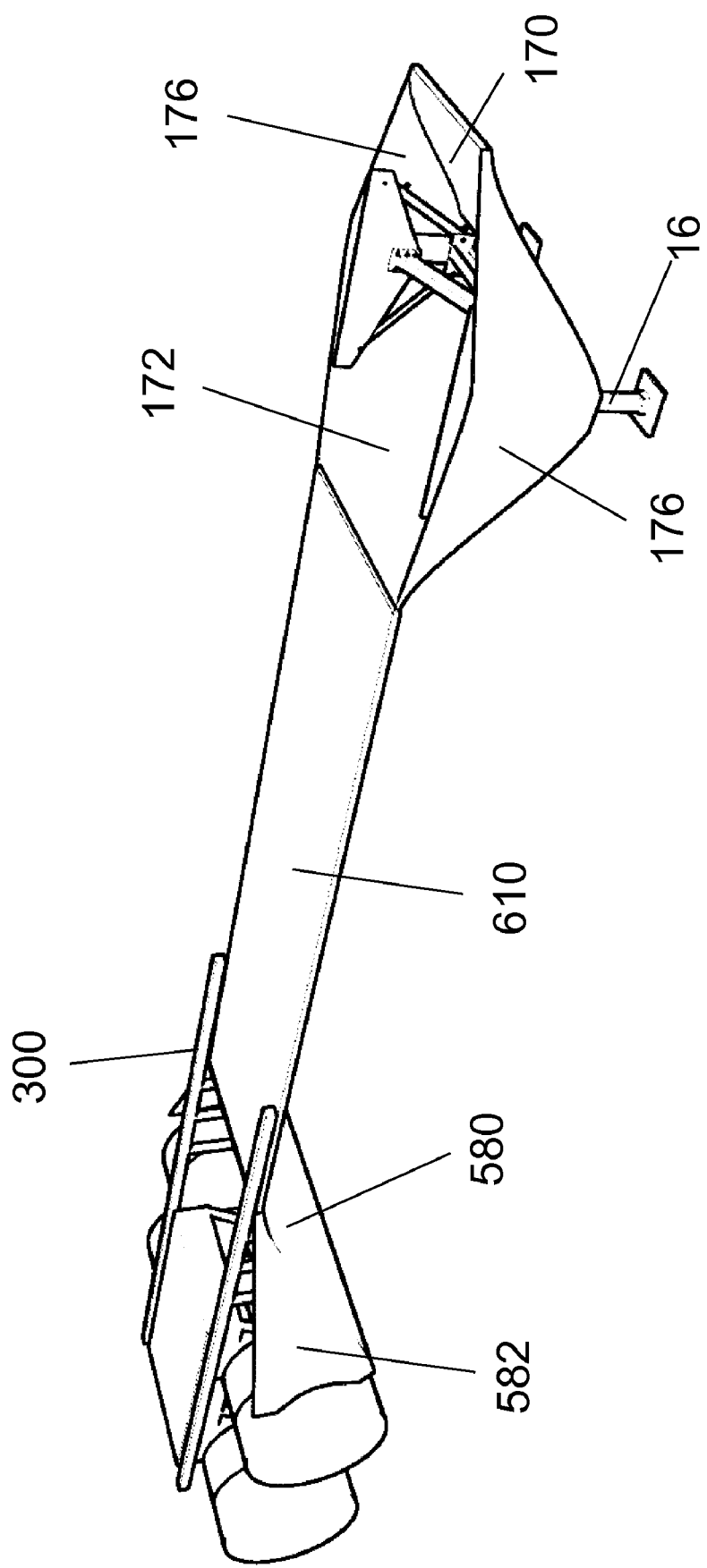
FIG. 63 is a top perspective view of a tapered s-curved fairing that substantially encloses a trailer landing gear assembly, covers the underside of a trailer, and has wheel contoured sidewalls.

FIGS. 61, 62, and 63, respectively illustrate a side perspective, top, and front perspective view of a "bow and stern" embodiment of a trailer fairing comprising a front tapered s-curved surface 170, a side piece 176, a connection panel 610, and a tapered s-curved panel with shaped side panels fairing 580 connected to a slide rail 300. The connection panel 610 reduces aerodynamic drag by helping to control the airflow around the trailer landing gear and wheel assembly.

Figure 64:
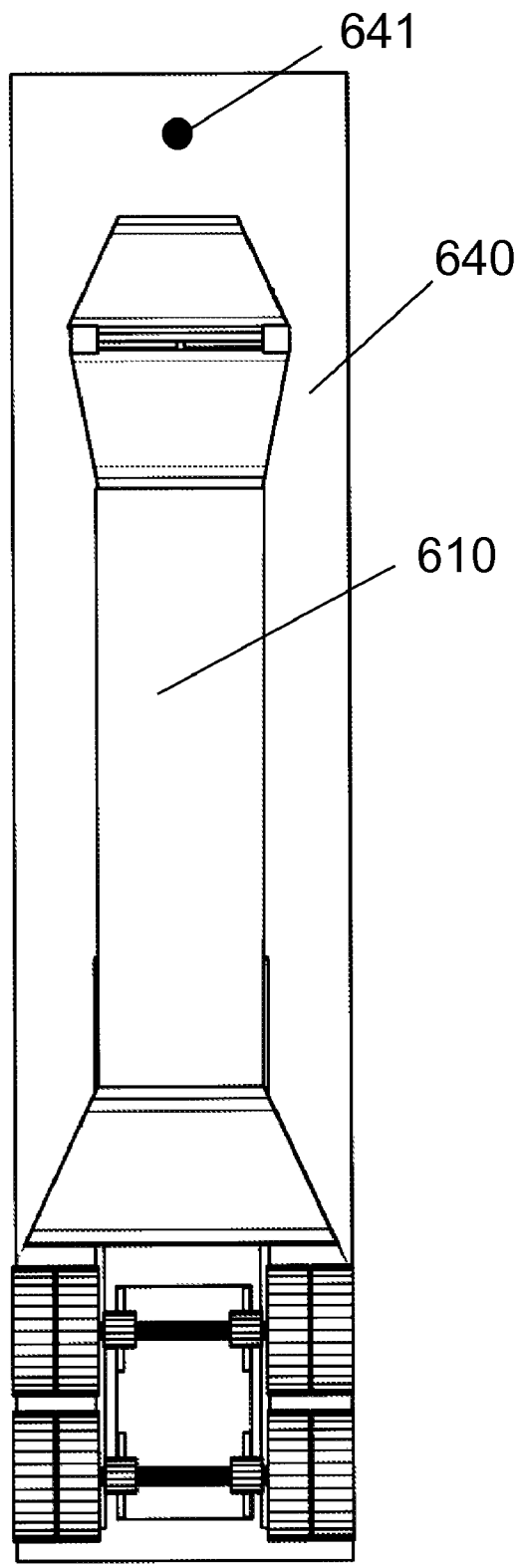
FIG. 64 is a bottom view of a cargo container with a fairing.
Figure 65:
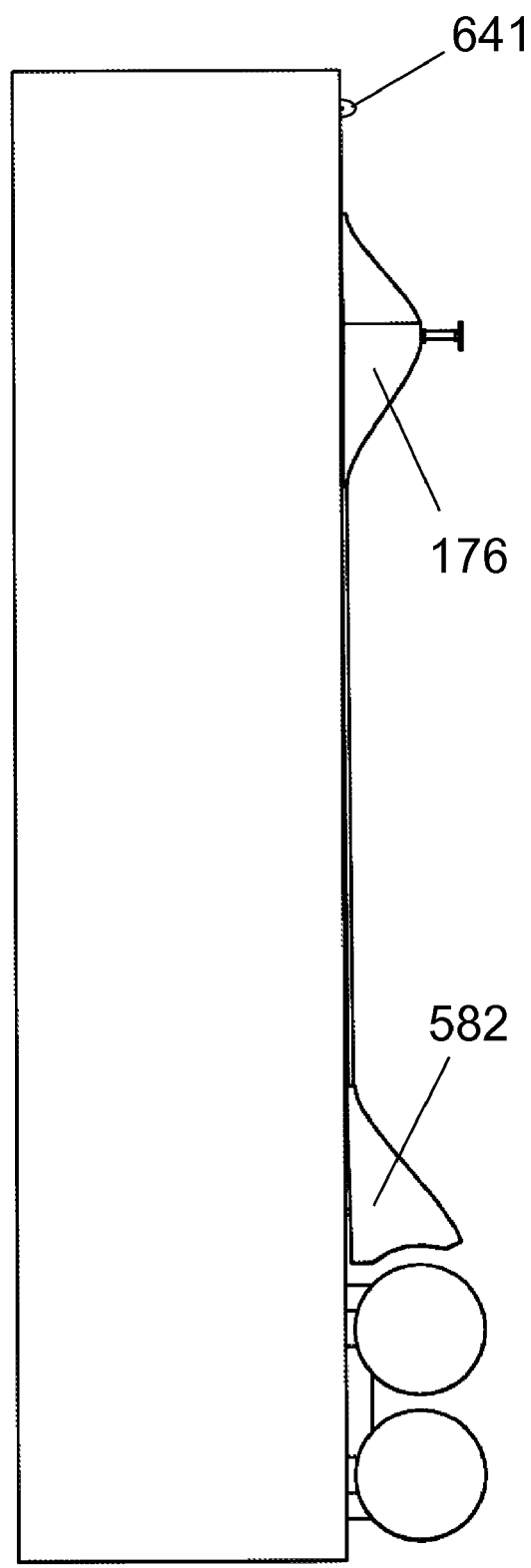
FIG. 65 is a side view of a cargo container with a fairing.
Figure 66:
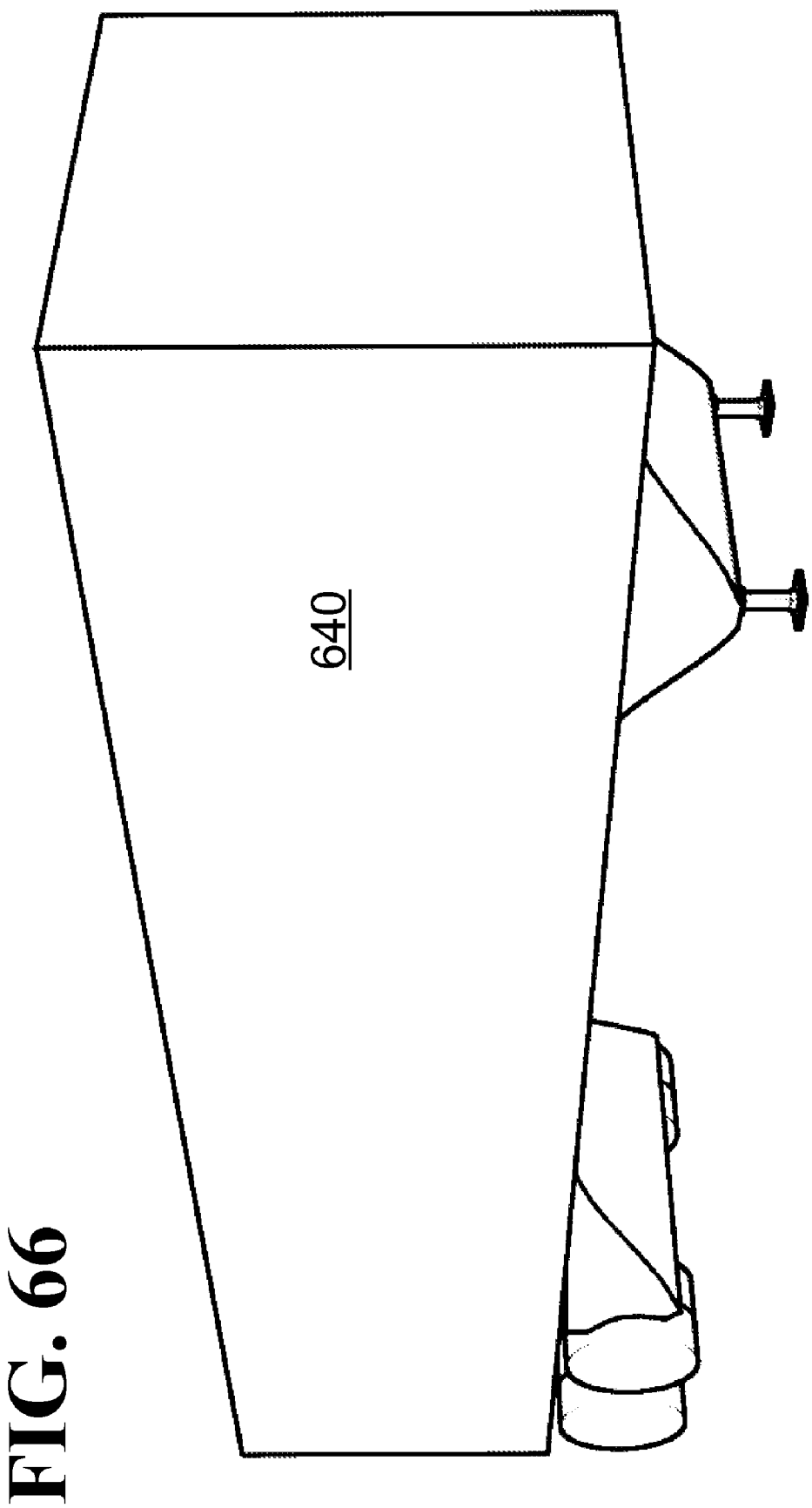
FIG. 66 is a perspective view of a cargo container with a fairing.

FIGS. 64, 65, and 66, respectively illustrate a bottom, side, and side perspective view of a "galleon" embodiment of a trailer fairing that substantially encloses a trailer landing gear assembly and has a connection panel 610. The trailer fairing is connected to a cargo container 640 that supports cargo with a frame assembly located in the floor of the container. The connection panel reduces some of the drag created by non-aerodynamic features of the cargo container underside. Also shown is a kingpin 641 that is used to connect the trailer to a tractor.

Figure 67:
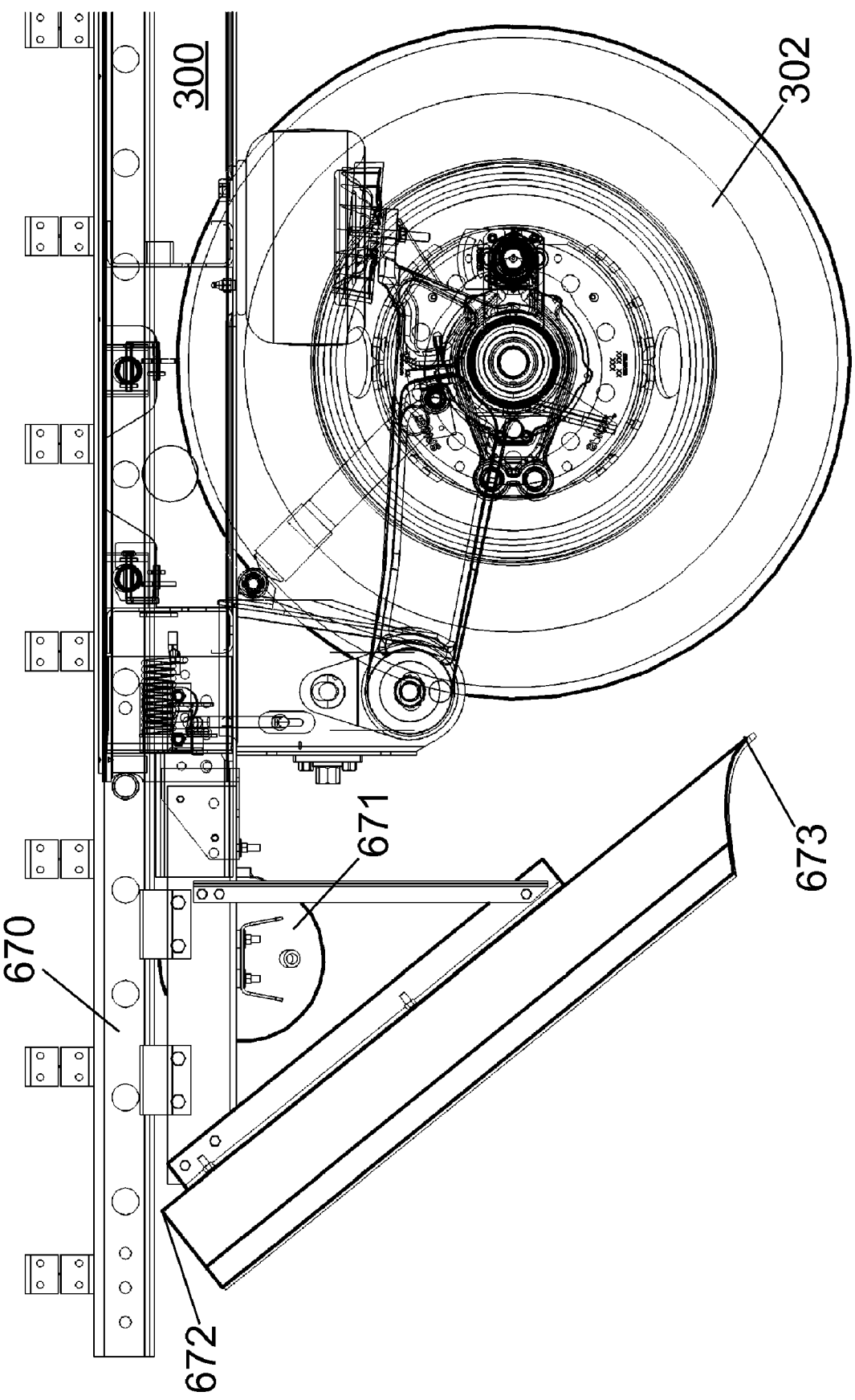
FIG. 67 is a side elevational view of a rear section of a trailer structure frame and wheels with a collector panel and air tank components mounted thereto.

FIG. 67 illustrates a trailer fairing connected to a trailer frame 670 via a slide rail 300. An air tank 671 is located between the trailer fairing 12 and the wheel assembly 302. The air tank is also positioned between the trailer fairing and the trailer frame so as to provide significant protect the air tank from road spray and other debris. The trailer fairing allows the air tank to be located near the wheel assembly to minimize the length of the pressure lines needed to connect the air tank to air brakes in the wheel assembly. The trailer fairing has a top edge 672 and a bottom edge 673. The top edge is located closer to the wheel assembly than the top edge, and a surface connects the top edge to the bottom edge. By having a downward slant, the trailer fairing directs air and road spray away from the air tank and wheel assembly.

Figure 68:
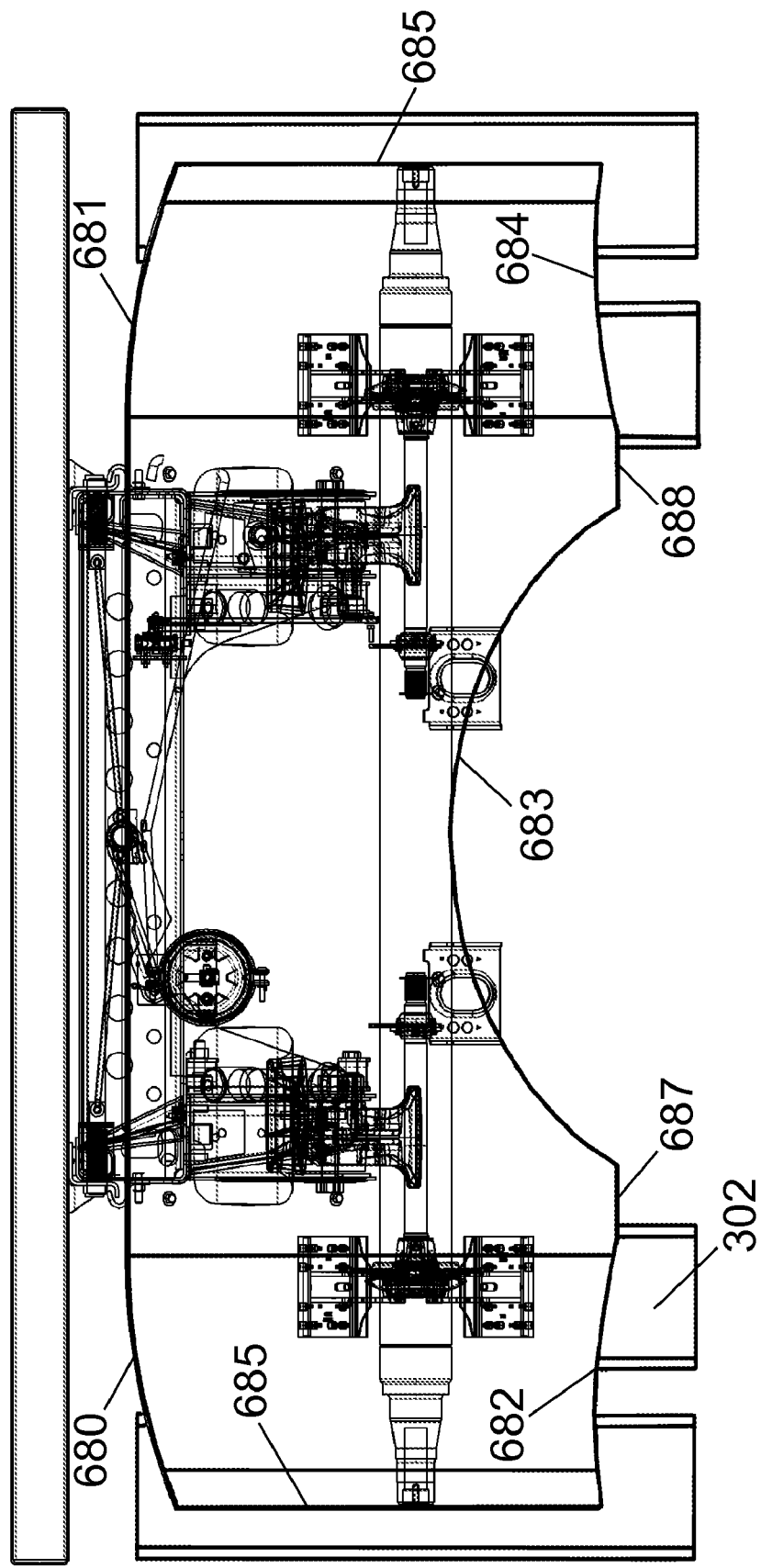
FIG. 68 is a rear elevational view of the components shown in FIG. 67.

FIG. 68 shows a front view of a trailer fairing located near a wheel assembly 12. The top edge of the illustrated fairing has a first and second top concave edge (680 and 681) while the bottom edge has a first, second and third bottom concave edge (682, 683, and 684). Side edges 685 connect some of the top and bottom concave edges. Also connecting between the top and bottom concave edges are surfaces that direct air and road spray downward and inward to a location between the wheels of the wheel assembly. On the leading side of the fairing shown in FIG. 68, concave surfaces extend between the first top concave edge and the first bottom concave edge, and between the second top concave edge and the third bottom concave edge. On the trailing side of the fairing shown in FIG. 68, convex surfaces are complimentary to the leading side concave surfaces. There is a substantially flat surface on the leading and trailing sides of the fairing between the top edge and the second bottom concave edge 683. In another embodiment of the invention, the convex surfaces are located on the leading side of the fairing while the trailing side has concave surface. In the illustrated fairing, the second bottom concave edge 683 is separated from the first and third bottom concave edges by first and second straight edges (687 and 688). The inventors contemplate varying the curvature and lengths of straight sections based on a desired airflow pattern behind the fairing. For example, increasing the curvature of the second bottom edge in order to concentrate airflow into a smaller area would be within the scope of the invention.

Figure 69:
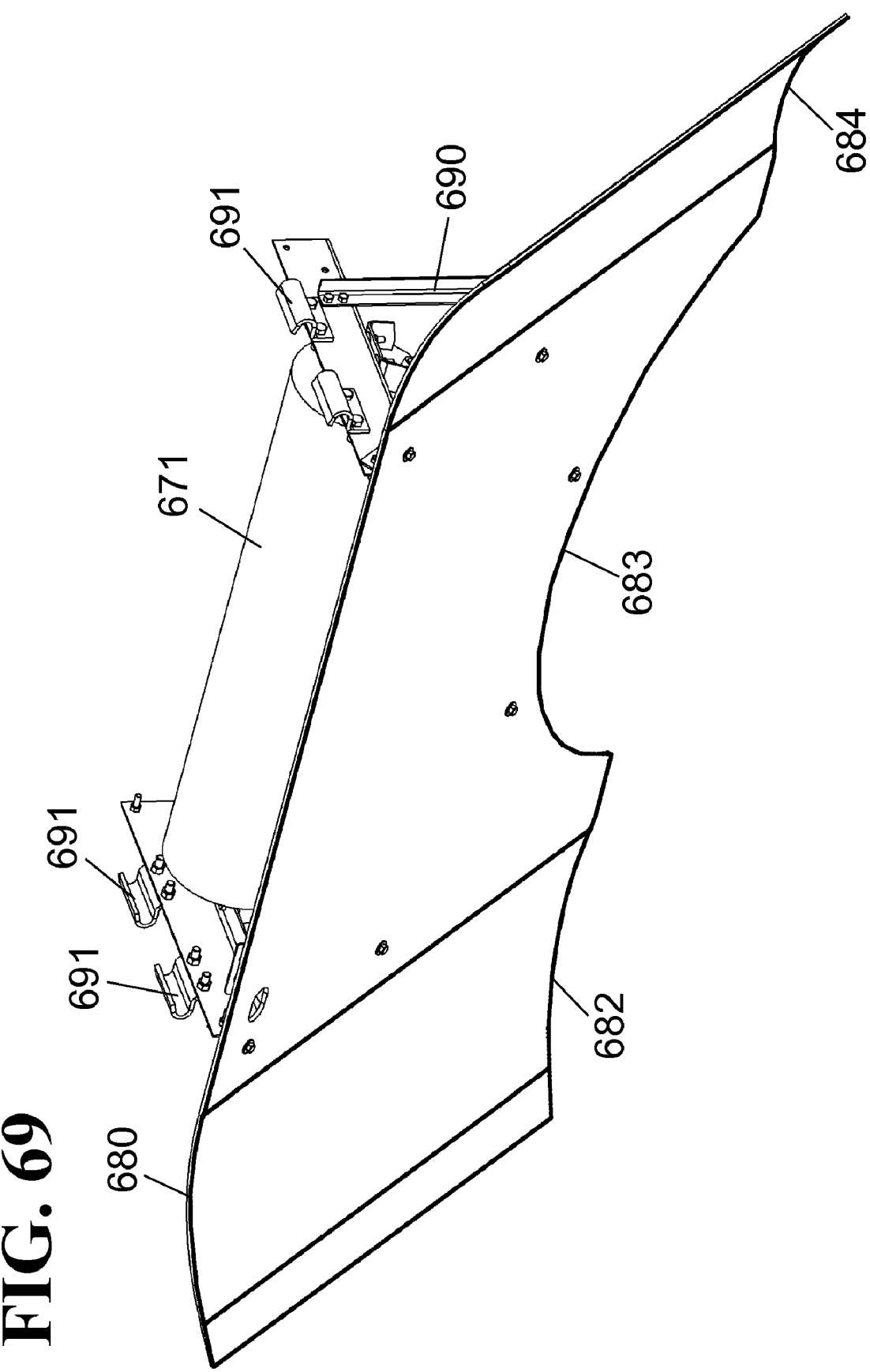
FIG. 69 is a front pictorial view of the air tank and collector panel subassembly shown in FIG. 67.

FIG. 69 shows a perspective view of a trailer fairing and air tank. In the illustrated embodiment of the invention, the fairing and air tank are both connected to a support structure 690 that has clamps 691 designed to secure onto the slide rail of a trailer.

Figure 70:
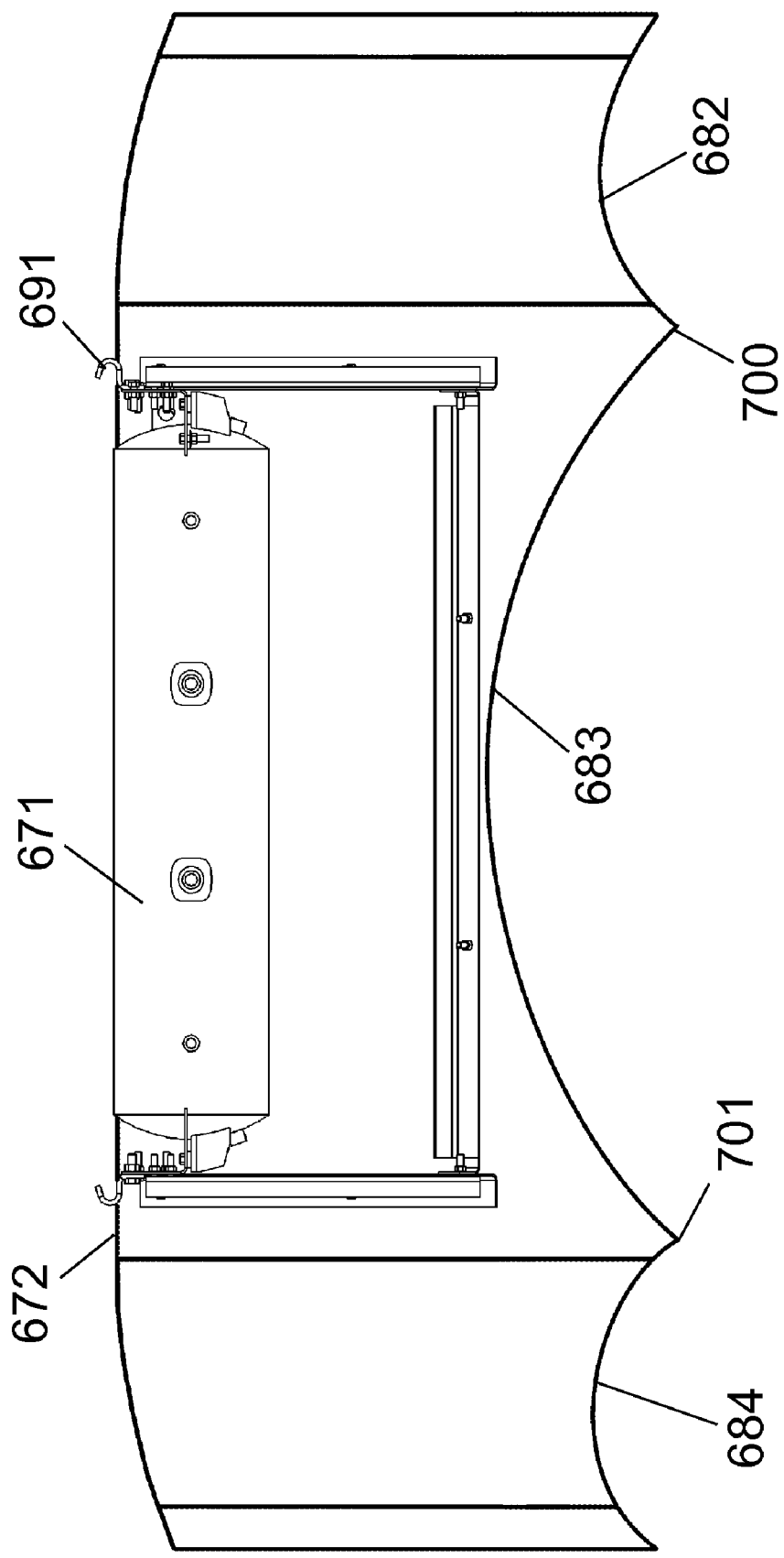
FIG. 70 is a rear elevational view of the air tank and collector panel subassembly shown in FIG. 68.

FIG. 70 shows a rear view of a trailer fairing and air tank. In the preferred embodiment of the invention, the air tank 671 is positioned at an elevation comparable to the top edge of the fairing 672; however the air tank may be positioned at other elevations behind the trailer fairing. For example, the air tank may be positioned closer to the middle of a trailer fairing that had features for directing airflow both above and below the fairing. In the illustrated fairing, the first bottom concave edge 682 is directly connected to the second bottom concave edge 683 at a first end 700. There is no first straight edge separating the two concave edges. Similarly, the second bottom concave edge directly connects to the third bottom concave edge 684 at a second end 701 and there is no second straight edge between the two concave edges.

Figure 71:
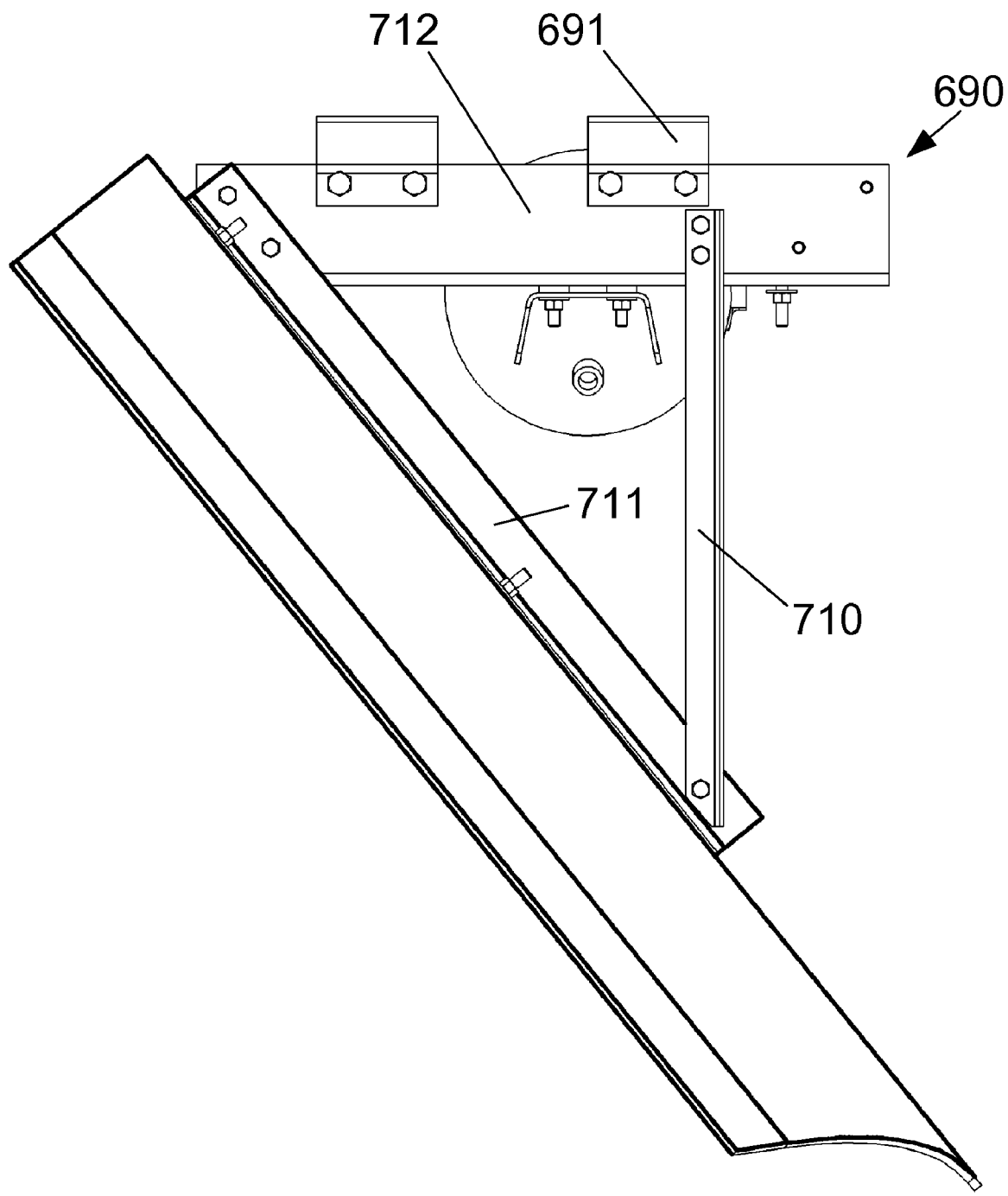
FIG. 71 is a side elevational view of the air tank collector panel subassembly shown in FIGS. 69 and 70.

FIG. 71 shows a side view of the trailer fairing and support structure 690. The support structure has vertical components 710, angled components 711, and horizontal components 712. In a preferred embodiment of the invention, the fairing has a surface substantially defined by the angled components of the support structure.

Figure 72:
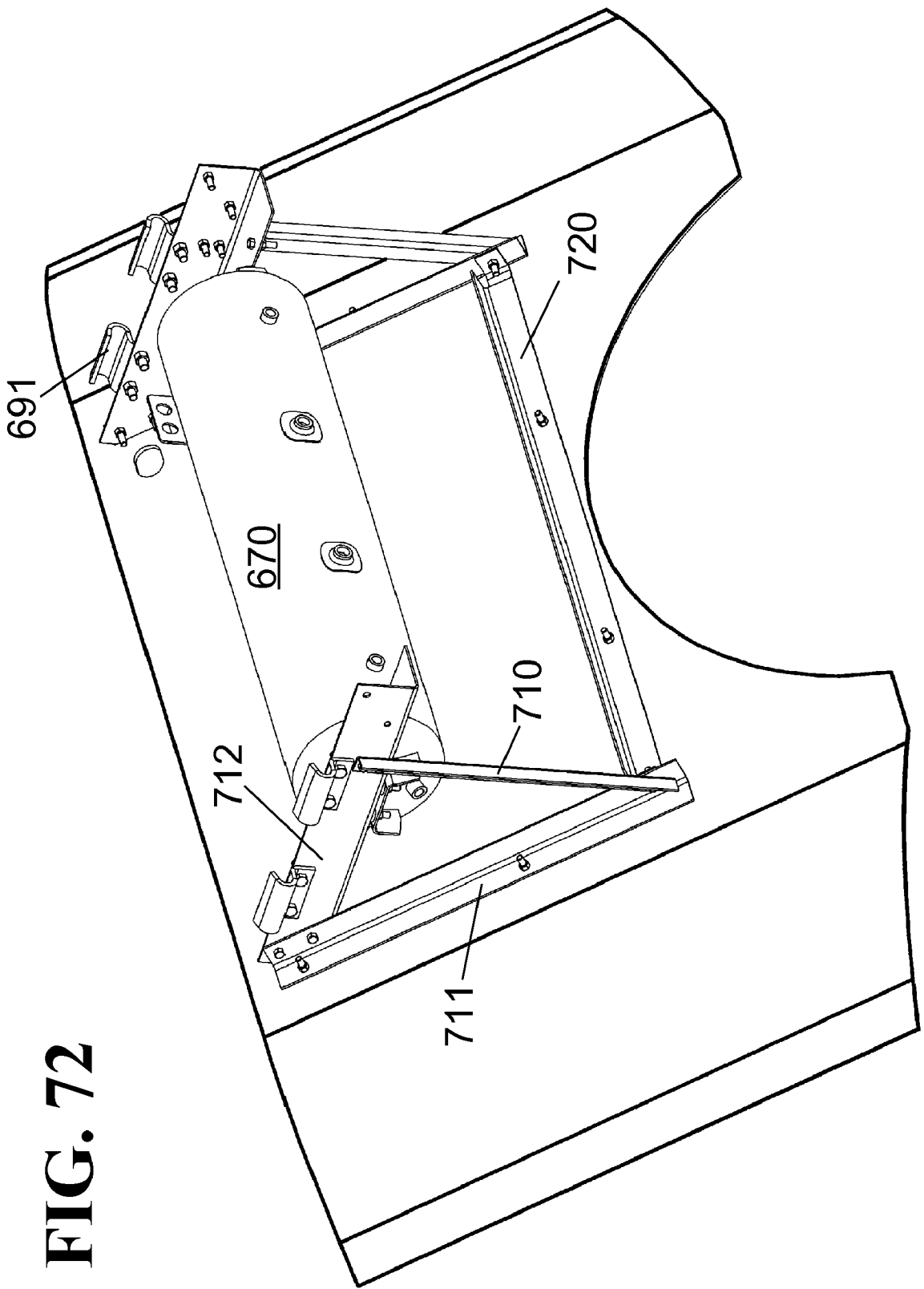
FIG. 72 is a rear pictorial view of the air tank collector panel subassembly shown in FIGS. 69-71.

FIG. 72 shows a rear perspective view of a trailer fairing and air tank. In the illustrated fairing, a lateral component 720 of the support structure connects to two angled components 711. The lateral component 720 extends across the fairing and includes a surface that is substantially parallel to the front surface of the fairing.

Figure 73:
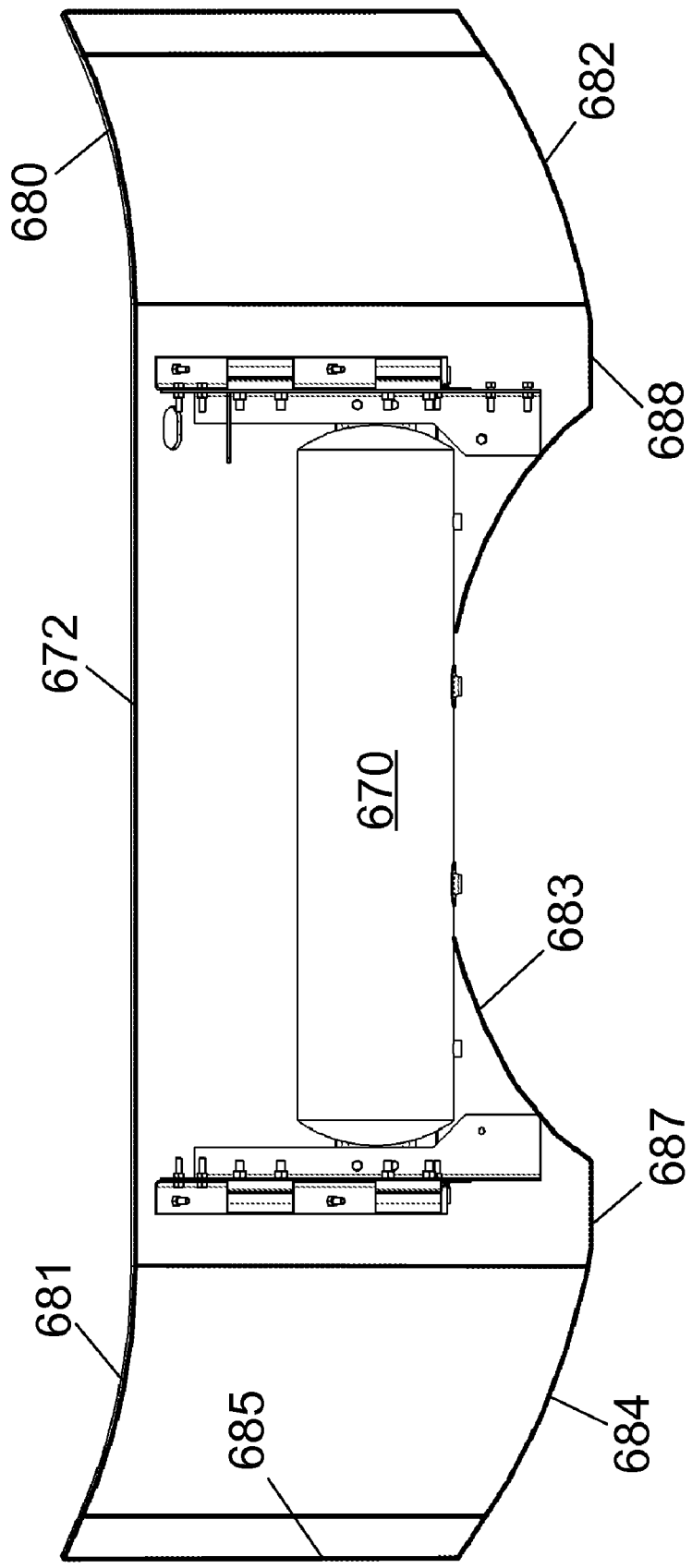
FIG. 73 is a plan view of the air tank collector panel subassembly shown in FIGS. 69-72.
Figure 74:
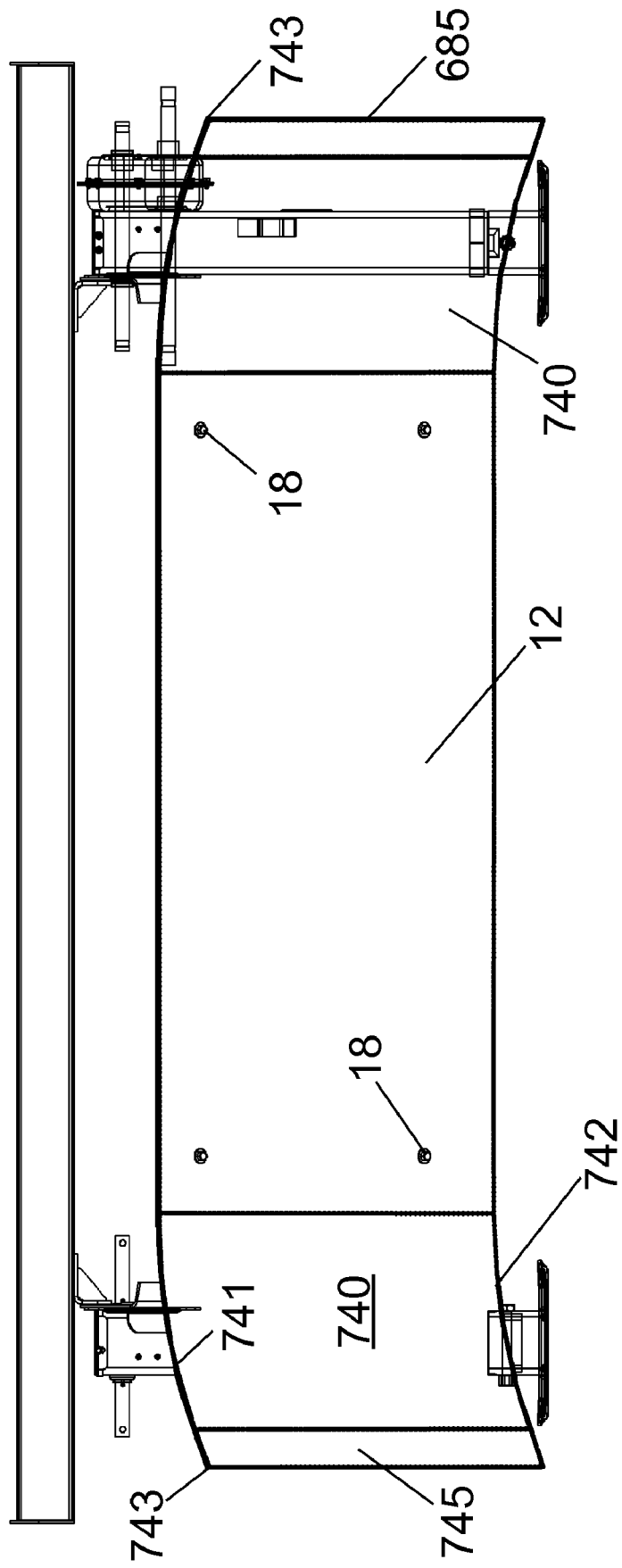
FIG. 74 is a front elevational view of a shortened collector panel installed forward of cargo trailer landing gear.

FIG. 73 shows a top view of an air tank and fairing where the fairing has multiple concave edges and surfaces that are used to direct airflow.

Figure 77:
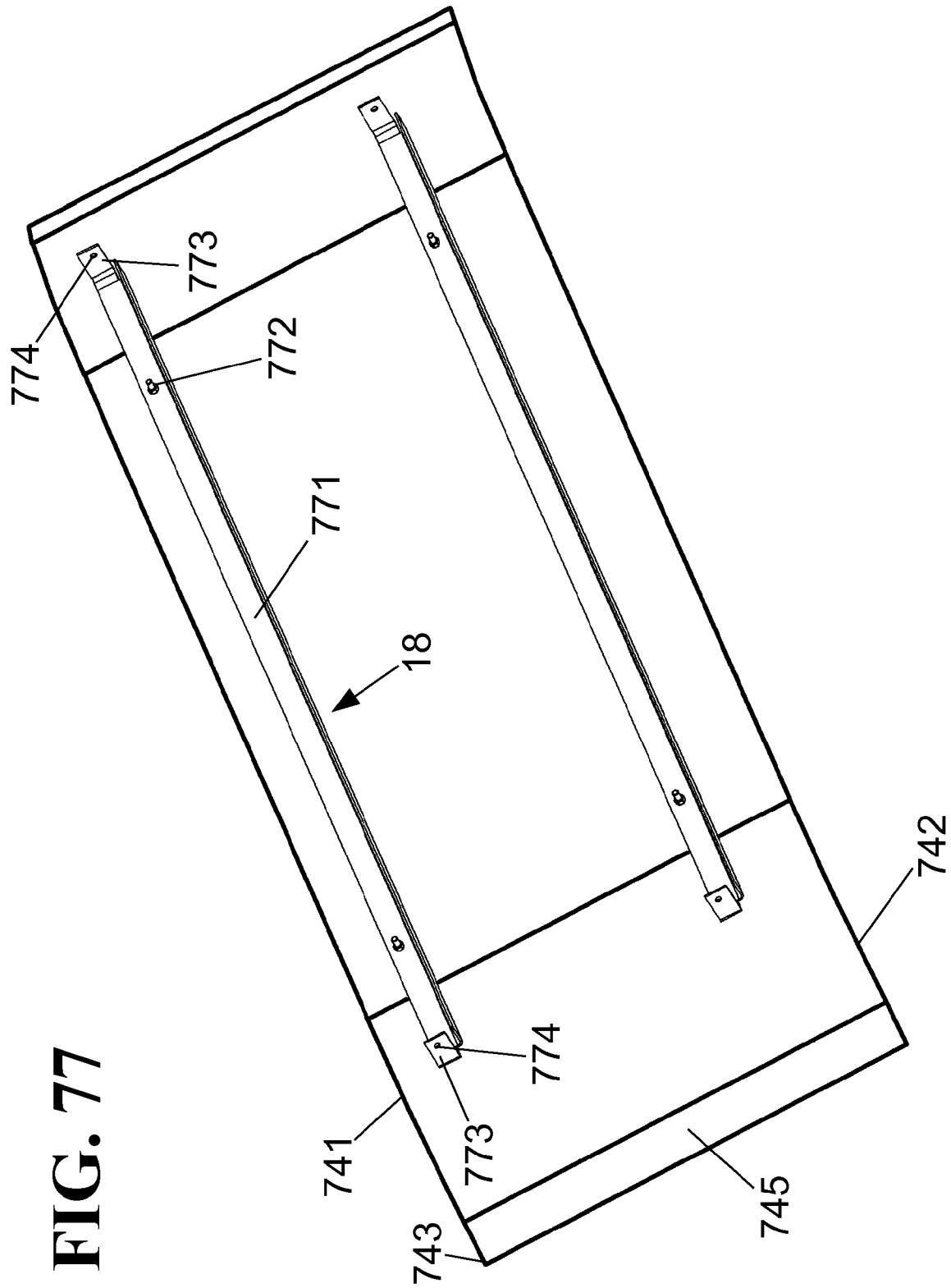
FIG. 77 is a rear pictorial view of the shortened collector panel and brackets shown in FIGS. 74-76.
Figure 78:
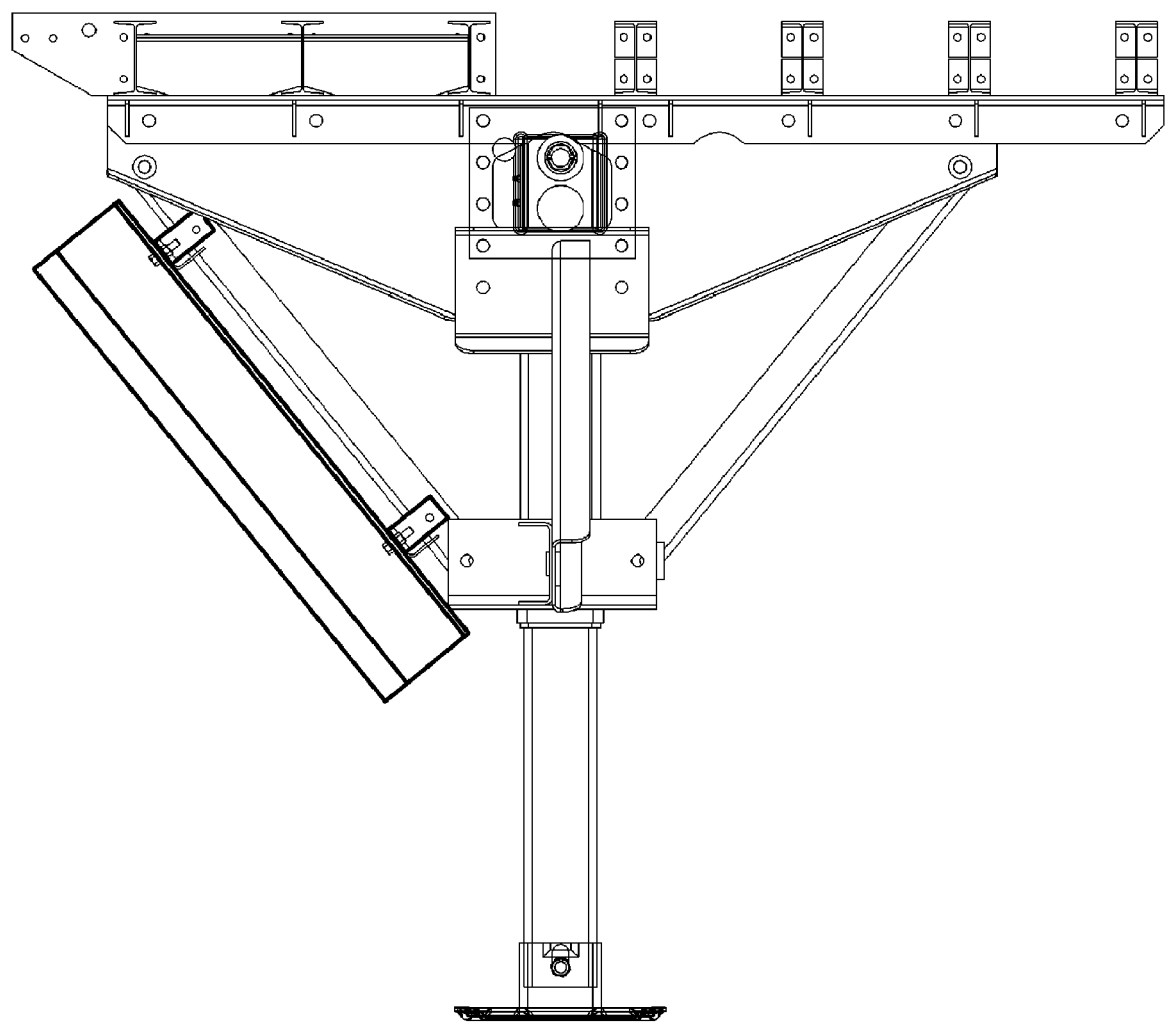
FIG. 78 is a side elevational view of the installation shown in FIG. 76 from the inside.
Figure 79:
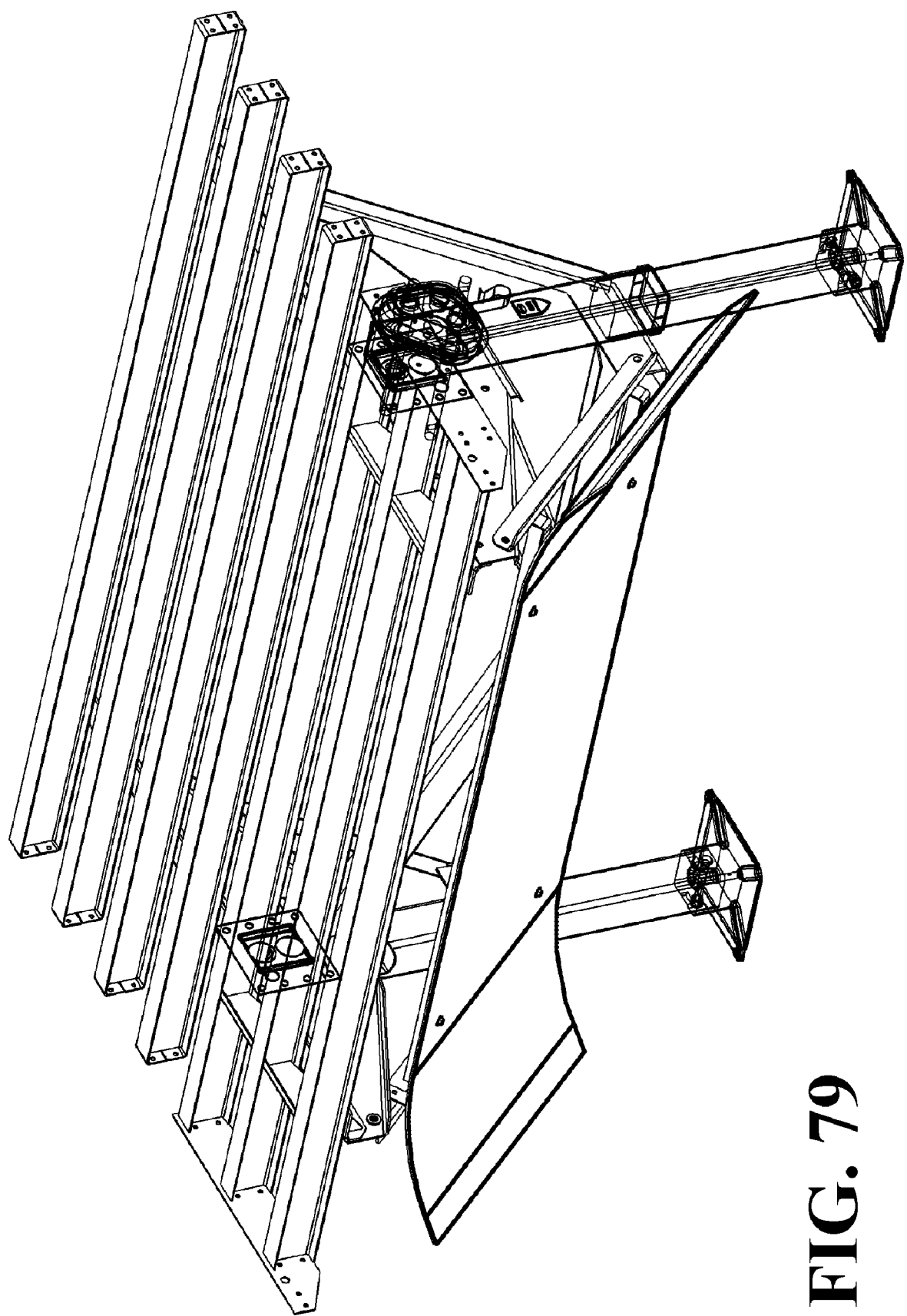
FIG. 79 is a pictorial view of the installation shown in FIGS. 76 and 78 together with some of the trailer floor supports.

FIGS. 74-76, 78, and 79, illustrate a trailer fairing with a front surface 12 connected to a landing gear structural support by at least one connection means 18. FIG. 77 illustrates the trailer fairing isolated from the trailer landing gear. The trailer fairing further comprises at least one curved surface 740 located between a top curved edge and 741 and a bottom curved edge 742. A side edge connects the top and bottom curved edges. The intersection point 743 of the top curved edge and a side edge is located in ahead of the front surface. The fore angled landing gear structural support 14 is located between the intersection point 743 and the cross beam of the landing gear. The curved surfaces direct airflow underneath the trailer to reduce the amount of air that is pushed outward of the trailer. Large airflows outward of the trailer could exert problematic horizontal forces on small nearby objects. For example, outward airflows could exert large horizontal forces on a motorcycle passing in close proximity to the trailer fairing. In the illustrated fairing, a side flat scoop 745 extends beyond the curved surface 740, and acts to direct air towards the curved surface.

Figure 75:
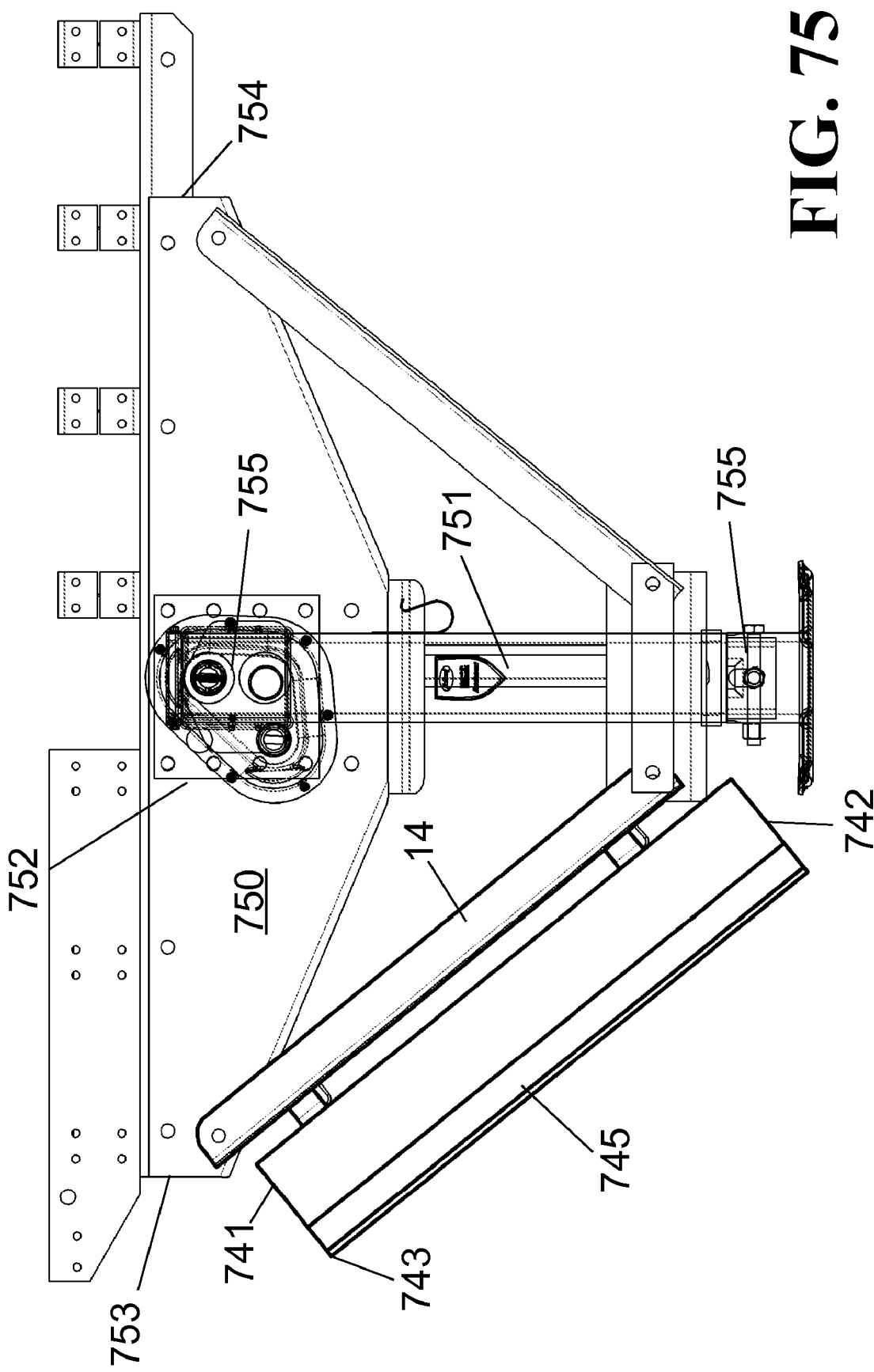
FIG. 75 is a side elevational view of the components shown in FIG. 74 with the landing gear raised.
Figure 76:
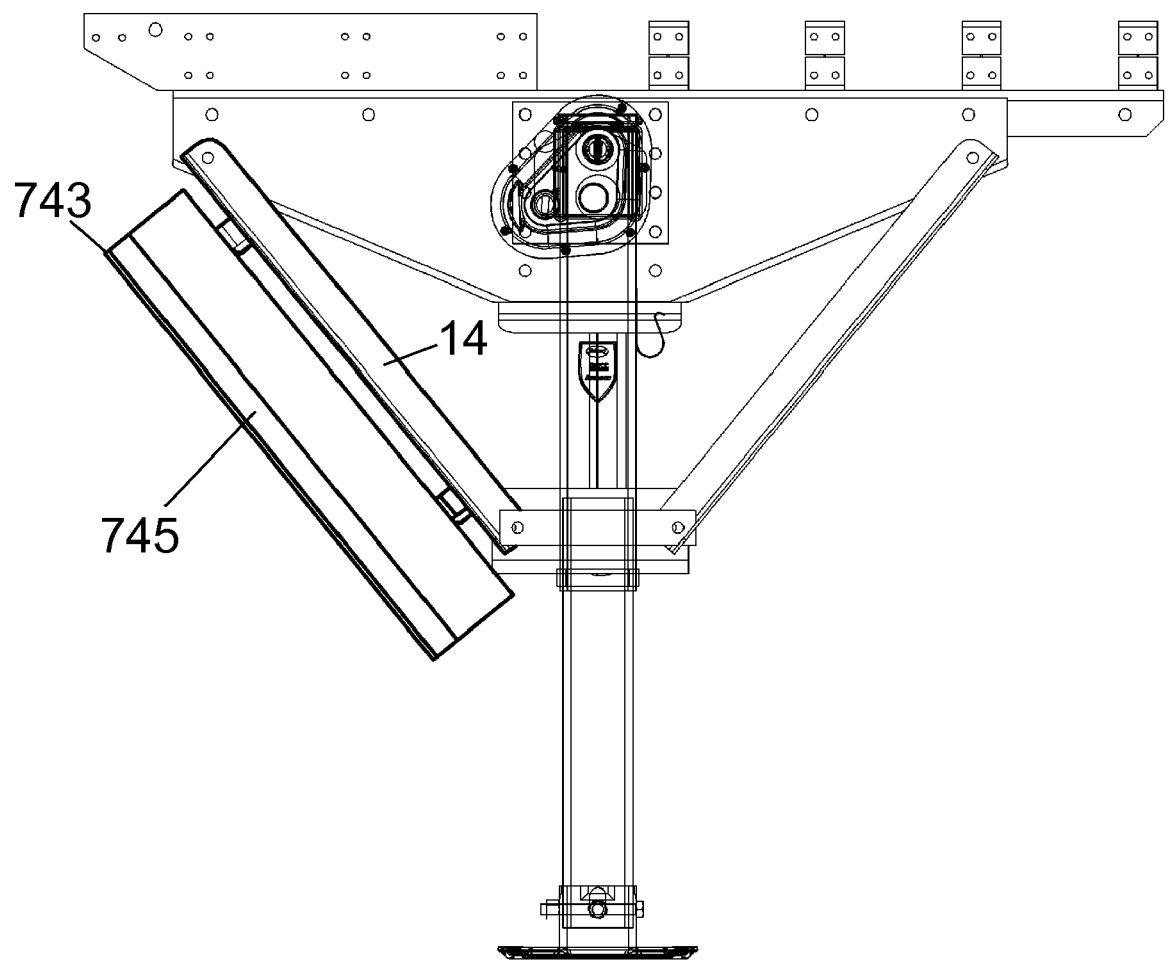
FIG. 76 is a side elevational view of the installation shown in FIG. 75.

FIG. 75 also illustrates a landing gear assembly having a gusset plate 750 connecting to a receiver 751 adapted for vertically moving a trailer leg. The gusset plate has a middle region 752 located between a fore gusset edge 753 and an aft gusset edge 754. The gusset plate helps to distribute the forces exerted by the landing gear on the trailer. Additionally, the gusset plate helps to prevent fore and movement of the receiver relative to the trailer. The receiver has a gusset end 755 and a leg end 756, a movable landing gear leg exits from the leg end of the receiver. The trailer fairing is substantially located between the fore gusset edge and the leg end of the receiver.

FIG. 77 shows a trailer fairing isolated from the landing gear of the trailer. The connection means 18 includes a lateral bar 771 that extends the length of the front panel. The lateral bar includes gaps 772 adapted for receiving bolts that pass through the lateral bar and connect to the front panel. Tabs 773 for securing the lateral bar to the trailer landing gear are located at the ends of the lateral bar. The tabs may include holes 774 that are adapted for receiving bolts or screws that can lock into or around a portion of the trailer landing gear. In an exemplary embodiment of the invention, there are at least two lateral bars connecting the trailer fairing to the landing gear.

It should be understood that the programs, processes, methods and system described herein are not related or limited to any particular type components unless indicated otherwise. Various combinations of general purpose, specialized or equivalent components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, more, fewer or equivalent elements may be used in the embodiments.

We claim:

1. An over-the-road trailer comprising:
a landing gear assembly, a kingpin, and a wheel assembly, each connecting to the bottom of a cargo container;
the landing gear assembly located between the kingpin and the wheel assembly;
the landing gear assembly including a first fore stabilizer distant from a second fore stabilizer,
each fore stabilizer connecting to one of a plurality of receivers adapted for vertically moving a landing gear leg, and
each fore stabilizer substantially located between one of the plurality of receivers and the kingpin; and
a fairing connecting to the plurality of receivers;
wherein each fore stabilizer is located between the fairing and one of the plurality of receivers.

2. The over-the-road trailer of claim 1 further comprising the fairing having a side edge, a top edge, and a bottom edge;
the side edge connecting to both a top edge and a bottom edge;
the side edge having a segment oriented at a 20 to 70 degree angle relative to the vertical movements of the landing gear legs; and
the side edge having a height similar to a height of one of the plurality of receivers.

3. The over-the-road trailer of claim 1 further comprising the fairing having a width substantially equal to the width of the landing gear assembly.

4. The over-the-road trailer of claim 3 further comprising the fairing directly connecting to the first fore stabilizer and the second fore stabilizer,
the landing gear assembly including a rotatable crank connecting to one of the plurality of receivers,
wherein rotation of the crank extends or retracts the landing gear legs; and
the crank is not substantially located between the fairing and any of the receivers.

5. The over-the-road trailer of claim 1 further comprising the fairing spaced at least an inch from the bottom of the cargo container.

6. The over-the-road trailer of claim 1 wherein the fairing provides only a negligible amount of support and rigidity to the over-the-road trailer.

7. The over-the-road trailer of claim 1 wherein
the first fore stabilizer is separated from the second fore stabilizer by a first distance, the fairing includes a first concave surface and a second concave surface.

8. The over-the-road trailer of claim 7 further comprising the fairing including
a first convex surface proximal to the first concave surface, the first concave surface located between the first convex surface and the kingpin, and
a second convex surface proximal to the second concave surface, the second concave surface located between the second convex surface and the kingpin.

9. The over-the-road trailer of claim 7 further comprising the fairing including
a first convex surface proximal to the first concave surface, the first convex surface located between the first concave surface and the kingpin, and
a second convex surface proximal to the second concave surface, the second concave surface located between the second concave surface and the kingpin.

10. The over-the-road trailer of claim 1 further comprising the first fore stabilizer including a first section secured to a first landing gear gusset plate, and
the second fore stabilizer including a second section secured to a second landing gear gusset plate.

11. An over-the-road trailer comprising:
a frame adapted for carrying cargo;

a wheel assembly and a landing gear assembly, each connecting to the frame;

a fairing interconnected with and located below the frame, the fairing including a bottom edge having a bottom portion located a first distance from the wheel assembly, a top edge having a top portion located a second distance from the wheel assembly, the second distance being greater than the first distance, and a fairing surface connecting the top edge to the bottom edge.

12. The over-the-road trailer of claim 11 further comprising the fairing surface having a concavely curved surface and a convexly curved surface, the concavely curved surface located between the convexly curved surface and the top edge.

13. The over-the-road trailer of claim 12 further comprising the fairing surface having a substantially planar surface extending between the wheel assembly and the landing gear assembly.

14. The over-the-road trailer of claim 12 further comprising the fairing having a first side surface connecting to both the concavely curved surface and the convexly curved surface a second side surface connecting to both the concavely curved surface and the convexly curved surface.

15. The over-the-road trailer of claim 1 further comprising the fairing including a front surface having both a curved first portion and a curved second portion the front surface of the fairing having a substantially flat third portion, the third portion connecting to and extending between the first portion and the second portion.

16. The over-the-road trailer of claim 15 further comprising the fairing further including a first curved surface connecting to the front surface near the first portion, and a second curved surface connecting to the front surface near the second portion.

17. The over-the road trailer of claim 16 wherein the first curved surface is substantially concave, and the second curved surface is substantially concave.

18. The over-the-road trailer of claim 11 further comprising:

the landing gear assembly including a first gusset plate having a first fore end, a first aft end, and a first middle region, the first middle region located between the first fore end and the first aft end;

a first vertical receiver having both a first gusset end and a first leg end, a first movable landing gear leg exiting from the first leg end of the first vertical receiver, the first gusset end connecting to the first middle region of the first gusset plate;

a second gusset plate having a second fore end, a second aft end, and a second middle region, the second middle region located between the second fore end and the second aft end;

a second vertical receiver having both a second gusset end and a second leg end, a second movable landing gear leg exiting from the second leg end of the second vertical receiver, the second gusset end connecting to the second middle region of the second gusset plate; and a bar connecting between the first vertical receiver and the second vertical receiver.

19. The over-the-road trailer of claim 1 further comprising the fairing having a first side edge, a first side surface, a second side edge, a second side surface, a top edge, and a bottom edge;

each side edge connecting to both the top edge and the bottom edge, the first side surface extending from the first side edge towards the bottom of the cargo container;

the second side surface extending from the second side edge towards the bottom of the cargo container; and each fore stabilizer is located between the first side surface and the second side surface.

20. The over-the-road-trailer of claim 19 further comprising the fairing including a front surface bounded by the first side edge, the second side edge, the top edge, and the bottom edge;

the front surface having a concave portion and a convex portion, the concave portion located between the convex portion and the top edge.

21. The over-the-road trailer of claim 14 wherein the length of the top edge is shorter than the length of the bottom edge.

22. The over-the-road trailer of claim 14 further comprising a lower edge located a third distance from the wheel assembly, an upper edge located a fourth distance from the wheel assembly, the fourth distance being less than the third distance, the third distance being less than the second distance; and the fairing surface connecting the upper edge to the lower edge.

23. The over-the-road trailer of claim 22 wherein the length of the top edge is shorter than the length of the bottom edge, and the length of the upper edge is shorter than the length of the lower edge.

* * * * *